(12) United States Patent
Hosoda et al.

(10) Patent No.: US 6,914,687 B1
(45) Date of Patent: Jul. 5, 2005

(54) DATA PROCESSING APPARATUS AND IMAGE RECORDING APPARATUS, METHOD FOR CONTROLLING DATA PROCESSING APPARATUS AND METHOD FOR CONTROLLING IMAGE RECORDING APPARATUS, AND STORAGE MEDIUM

(75) Inventors: Yuichi Hosoda, Yokohama (JP); Nobuyoshi Kakigi, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 953 days.

(21) Appl. No.: 09/662,134

(22) Filed: Sep. 14, 2000

(30) Foreign Application Priority Data

Sep. 17, 1999 (JP) ............................................ 11-264647

(51) Int. Cl.[7] .............................................. G06F 15/00
(52) U.S. Cl. ......................... 358/1.1; 358/1.4; 358/1.13
(58) Field of Search ........................... 358/1.1, 1.4, 1.9, 358/1.12, 1.13, 1.14, 1.15, 1.16, 1.17

(56) References Cited

U.S. PATENT DOCUMENTS

| | | | | |
|---|---|---|---|---|
| 5,255,908 A | * | 10/1993 | Hiroi et al. | .................. 271/293 |
| 5,265,855 A | * | 11/1993 | Kimura et al. | ........... 270/58.15 |
| 5,358,238 A | | 10/1994 | Mandel et al. | ............... 271/298 |
| 5,699,493 A | | 12/1997 | Davidson, Jr. et al. | ..... 395/114 |
| 5,815,764 A | * | 9/1998 | Tomory | ........................... 399/1 |
| 5,971,383 A | * | 10/1999 | Horikawa et al. | ........ 270/58.11 |
| 6,141,111 A | * | 10/2000 | Kato | ........................... 358/1.15 |
| 6,292,267 B1 | * | 9/2001 | Mori et al. | ................. 358/1.15 |

* cited by examiner

Primary Examiner—Mark Wallerson
(74) Attorney, Agent, or Firm—Fitzpatrick, Cella, Harper & Scinto

(57) ABSTRACT

An image recording apparatus is shared by a plurality of users. A host computer obtains information concerning a sheet discharge bin of discrimination names and the like registered in the image recording apparatus by requested it to the image recording apparatus. A mail box sheet discharge designation screen, based on the obtained information concerning a sheet discharge bin, allows each user to designate a plurality of sheet discharge addresses for each page of printing data and the number of sheet discharge copies via the mail box sheet discharge designation screen. The host computer prepares a printing job by including instructions based on operations from users including each designation in one printing job and transmits the printing job to the image recording apparatus. The image recording apparatus prepares page information for a plurality of discrimination names designated by a page unit of printing data included in one printing job received from the host computer and, at the same time, retrieves a sheet discharge port in which a same discrimination name as the plurality of discrimination names to designate each retrieved sheet discharge port, and discharges the designated number of sheet discharge copies corresponding to each prepared page information.

32 Claims, 37 Drawing Sheets

FIG. 3

REGISTRATION OF SHEET DISCHARGE PORT NAME

| | SHEET DISCHARGE PORT (DISTRIBUTION ADDRESS) NAME: | THE NUMBER OF GROUP MEMBERS: |
|---|---|---|
| BIN 1: | 1ST PERSONNEL DEPT. | 7 |
| BIN 2: | 2ND PERSONNEL DEPT. | 9 |
| BIN 3: | 3RD PERSONNEL DEPT. | 7 |
| BIN 4: | 1ST SECRETARY DEPT. | 10 |
| BIN 5: | 2ND SECRETARY DEPT. | 10 |
| BIN 6: | 3RD SECRETARY DEPT. | 9 |
| BIN 7: | ADMINISTRATION DEPT. | 9 |

501 — 502 — 503

504 — OK    CANCEL — 505

FIG. 5

DESIGNATION OF DISTRIBUTION ADDRESS

SELECTED DOCUMENT: CONTACT ADDRESS IN VACATION.doc
DISTRIBUTION PAGE: PAGE 1

DISTRIBUTION:    DISTRIBUTION ADDRESS:

601:
- [✓] 1ST PERSONNEL DEPT.
- [✓] 2ND PERSONNEL DEPT.
- [✓] 3RD PERSONNEL DEPT.
- [ ] 1ST SECRETARY DEPT.
- [ ] 2ND SECRETARY DEPT.
- [ ] 3RD SECRETARY DEPT.
- [ ] ADMINISTRATION DEPT.

602

THE NUMBER OF DISTRIBUTION COPIES: 1 (603)    [ ] FOR ALL MEMBERS (604)

[ OK ] (605)    [ CANCEL ] (606)

FIG. 14A

| JOB ID |
|---|
| 1 |
| 2 |
| 3 |
| 4 |

FIG. 14B

| JOB ID |
|---|
| 1 |
| 2 |
| 3 |
| 4 |
| 5 ← ADD JOB 5 |

FIG. 14C

| JOB ID |
|---|
| 2 |
| 3 → END OR CANCEL JOB 1 PRINTING |
| 4 |
| 5 |

FIG. 18

VC ··· VIDEO CONTROLLER
EC ··· ENGINE CONTROLLER

| SIGNAL NAME | DIRECTION | CONTENTS |
|---|---|---|
| /CPRDY | VC→EC | SIGNAL REPRESENTING THAT VIDEO CONTROLLER 103 IS IN STATE CAPABLE OF COMMUNICATING WITH ENGINE CONTROLLER 105 |
| /PPRDY | VC←EC | SIGNAL REPRESENTING THAT ENGINE CONTROLLER 105 IS IN STANDBY STATE CAPABLE OF COMMUNICATING WITH VIDEO CONTROLLER 103 |
| /RDY | VC→EC | SIGNAL REPRESENTING THAT ENGINE CONTROLLER 105 IS IN STANDBY STATE CAPABLE OF PERFORMING PRINTING |
| /PRNT | VC→EC | SIGNAL CAUSING VIDEO CONTROLLER 103 TO ISSUE PRINTING REQUEST TO ENGINE CONTROLLER 105 |
| /VSREQ | VC←EC | SIGNAL CAUSING ENGINE CONTROLLER 105 TO REQUEST VERTICAL SYNC SIGNAL TO VIDEO CONTROLLER 103 |
| /VSYNC | VC→EC | VERTICAL SYNC SIGNAL OUTPUT FROM VIDEO CONTROLLER 103 TO ENGINE CONTROLLER 105 |
| /BD | VC←EC | HORIZONTAL SYNC SIGNAL OUTPUT FROM ENGINE CONTROLLER 105 TO VIDEO CONTROLLER 103 |
| /CCRT | VC←EC | SIGNAL INFORMING VIDEO CONTROLLER 103 OF STATE CHANGE BY BECOMING "TRUE" WHEN CONTENT OF STATUS NOT DIRECTLY CONCERNING RDY SIGNAL CHANGES |
| /SCLK | VC→EC | SYNC CLOCK SIGNAL FOR SERIAL COMMUNICATION |
| /CMD | VC→EC | COMMAND SIGNAL CAUSING VIDEO CONTROLLER 103 TO ISSUE INSTRUCTION TO ENGINE CONTROLLER 105 |
| /CBSY | VC→EC | STROBE SIGNAL FOR COMMAND OUTPUT |
| /STS | VC←EC | SIGNAL REPRESENTING STATUS IN ENGINE UNIT OUTPUT FOR COMMAND FROM VIDEO CONTROLLER 103 |
| /SBSY | VC←EC | SIGNAL FOR STATUS OUTPUT |

FIG. 19

VC ··· VIDEO CONTROLLER
OC ··· OPTION CONTROLLER
EC ··· ENGINE CONTROLLER

| SIGNAL NAME | DIRECTION | CONTENTS |
|---|---|---|
| SERIAL COMMUNICATION I/F | VC↔OC | I/F PERFORMING SHEET FEED DESIGNATION TO SHEET FEED OPTION, SHEET DISCHARGE BIN DESIGNATION TO SHEET DISCHARGE OPTION, COMMAND DESIGNATION, ETC. THROUGH SHARED MEMORY |
| /OPTRDY | VC←OC | SIGNAL REPRESENTING READY STATE FOR FUNCTION GIVEN IN DESIGNATED OPTION DEVICE |
| /POUTT | EC→OC | TIMING SIGNAL USED WHEN PRINTER BODY DISCHARGES RECORDING SHEET |
| /PFEDT | EC→OC | TIMING SIGNAL USED WHEN PRINTER BODY RECEIVES RECORDING SHEET FROM OPTION UNIT |
| /SPCNG | EC→OC | SIGNAL TO SLOW DOWN RECORDING SHEET HIGH-SPEED CARRIED IN OPTION DEVICE TO MATCH IT WITH CARRYING SPEED OF PRINTER BODY |

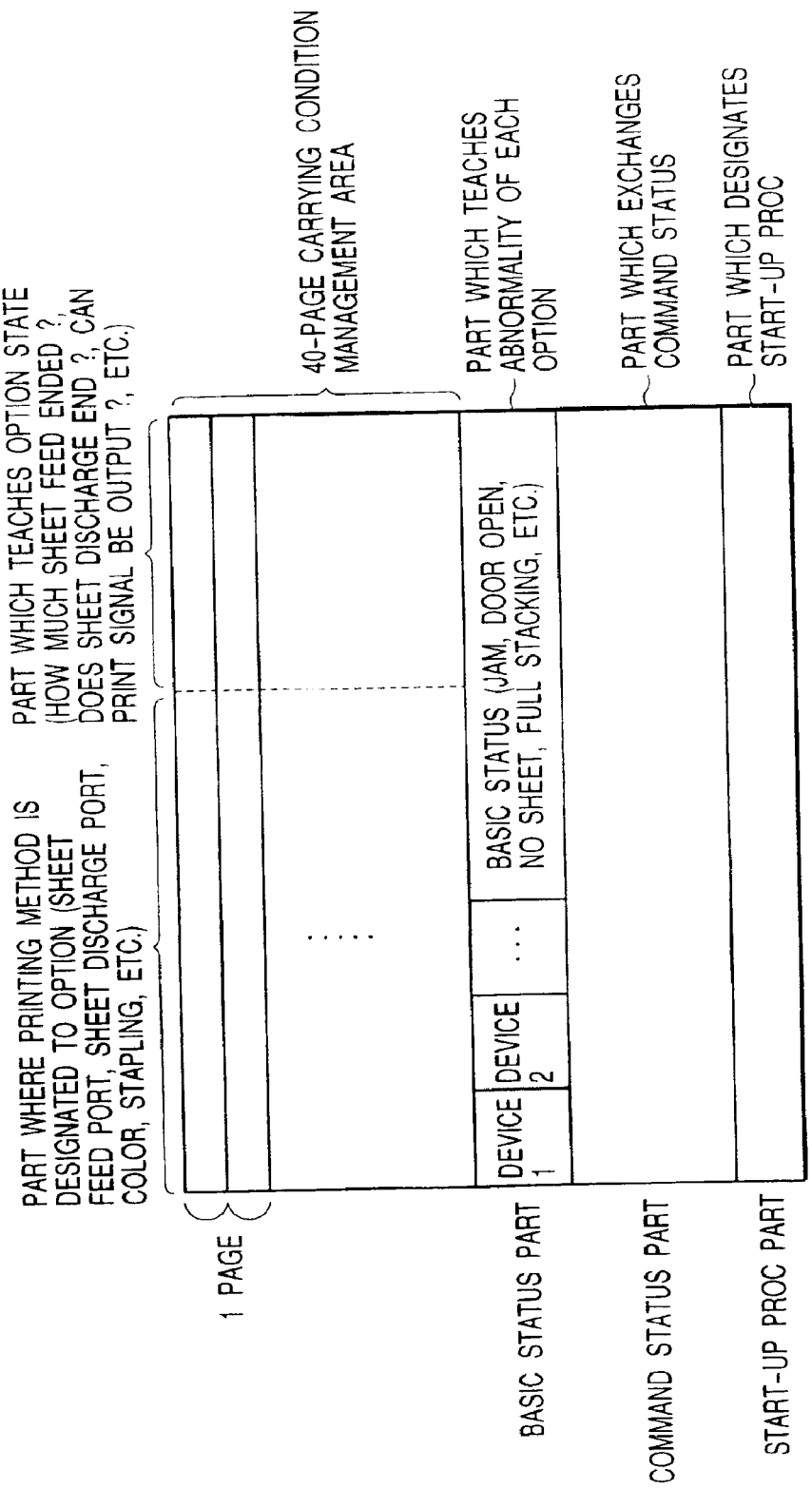

FIG. 32

```
┌─────────────────────────────────────────────────────┐
│ DESIGNATION OF MAIL BOX SHEET DISCHARGE             │
├─────────────────────────────────────────────────────┤
│                    3201      3202                   │
│  SELECTED     ┌──────────┬──────────┐     2703      │
│  DOCUMENT:    │TIMETABLE.bmp│REFERENCE│              │
│                                    ┌──────────────┐ │
│  DISTRIBUTION   [1▼] - [2▼]        │DISTRIBUTION  │ │
│  PAGES:                            │ADDRESS       │ │
│                  3203              │DESIGNATION   │ │
│                                    └──────────────┘ │
├─────────────────────────────────────────────────────┤
│  DISTRIBUTION ADDRESS DESIGNATION SITUATION:  2704  │
│  ┌───────────────────────────────────────────────┐  │
│  │ CONTACT ADDRESS IN      DISTRIBUTION ADDRESS  │  │
│  │ VACATION.doc/PAGE 1     DESIGNATION END       │  │
│  │ CONTACT ADDRESS IN      DISTRIBUTION ADDRESS  │  │
│  │ VACATION.doc/PAGE 2     DESIGNATION END       │  │
│  │ CONTACT ADDRESS IN      DISTRIBUTION ADDRESS  │  │
│  │ VACATION.doc/PAGE 3     DESIGNATION END       │  │
│  │ CONTACT ADDRESS IN      DISTRIBUTION ADDRESS  │  │
│  │ VACATION.doc/PAGE 4     DESIGNATION END       │  │
│  │ COMMUNICATION           DISTRIBUTION ADDRESS  │  │
│  │ TABLE.doc/PAGES 1-3     DESIGNATION END       │  │
│  │ TIMETABLE.bmp/PAGES 1-2 DISTRIBUTION ADDRESS  │  │
│  │                         DESIGNATION END       │  │
│  └───────────────────────────────────────────────┘  │
│                                                     │
│   2705 ─┤REFER TO DESIGNATED CONTENT OF SELECTED PAGE│
├─────────────────────────────────────────────────────┤
│                 ┌──────┐        ┌────────┐          │
│                 │  OK  │        │ CANCEL │          │
│                 └──────┘        └────────┘          │
│                   2706             2707             │
└─────────────────────────────────────────────────────┘
```

FIG. 34

REGISTRATION OF SHEET DISCHARGE PORT NAME

SHEET DISCHARGE PORT
(DISTRIBUTION ADDRESS) NAME:

501 {
- BIN 1: 1ST PERSONNEL DEPT.
- BIN 2: 2ND PERSONNEL DEPT.
- BIN 3: 3RD PERSONNEL DEPT.
- BIN 4: 1ST SECRETARY DEPT.
- BIN 5: 2ND SECRETARY DEPT.
- BIN 6: 3RD SECRETARY DEPT.
- BIN 7: ADMINISTRATION DEPT.
} 502

504 — OK     CANCEL — 505

FIG. 35

| DESIGNATION OF DISTRIBUTION ADDRESS | | |
|---|---|---|
| SELECTED DOCUMENT: TIMETABLE.bmp | | |
| DISTRIBUTION PAGE: 1-2 | | |
| DISTRIBUTION: | DISTRIBUTION ADDRESS: | THE NUMBER OF DISTRIBUTION COPIES: |
| ✓ | 1ST PERSONNEL DEPT. | 7 |
| ✓ | 2ND PERSONNEL DEPT. | 9 |
| ✓ | 3RD PERSONNEL DEPT. | 7 |
| ✓ | 1ST SECRETARY DEPT. | 10 |
| ✓ | 2ND SECRETARY DEPT. | 10 |
| ✓ | 3RD SECRETARY DEPT. | 9 |
| ☐ | ADMINISTRATION DEPT. | 9 |

605 — OK    606 — CANCEL

FIG. 36

STORAGE MEDIUM SUCH AS FD, CD-ROM, ETC.

| DIRECTORY INFORMATION |
|---|
| 1ST DATA PROC PROGRAM<br>PROGRAM CODE GROUP CORRESPONDING TO STEPS IN FLOW CHARTS OF FIGS. 8 AND 9 |
| 2ND DATA PROC PROGRAM<br>PROGRAM CODE GROUP CORRESPONDING TO STEPS IN FLOW CHARTS OF FIG. 10 |
| 3RD DATA PROC PROGRAM<br>PROGRAM CODE GROUP CORRESPONDING TO STEPS IN FLOW CHARTS OF FIG. 13 |
| 4TH DATA PROC PROGRAM<br>PROGRAM CODE GROUP CORRESPONDING TO STEPS IN FLOW CHARTS OF FIG. 22 |
| 5TH DATA PROC PROGRAM<br>PROGRAM CODE GROUP CORRESPONDING TO STEPS IN FLOW CHARTS OF FIG. 23 |
| 6TH DATA PROC PROGRAM<br>PROGRAM CODE GROUP CORRESPONDING TO STEPS IN FLOW CHARTS OF FIG. 28 |
| 7TH DATA PROC PROGRAM<br>PROGRAM CODE GROUP CORRESPONDING TO STEPS IN FLOW CHARTS OF FIG. 29 |
| 8TH DATA PROC PROGRAM<br>PROGRAM CODE GROUP CORRESPONDING TO STEPS IN FLOW CHARTS OF FIG. 30 |
| 9TH DATA PROC PROGRAM<br>PROGRAM CODE GROUP CORRESPONDING TO STEPS IN FLOW CHARTS OF FIG. 31 |

MEMORY MAP OF STORAGE MEDIUM

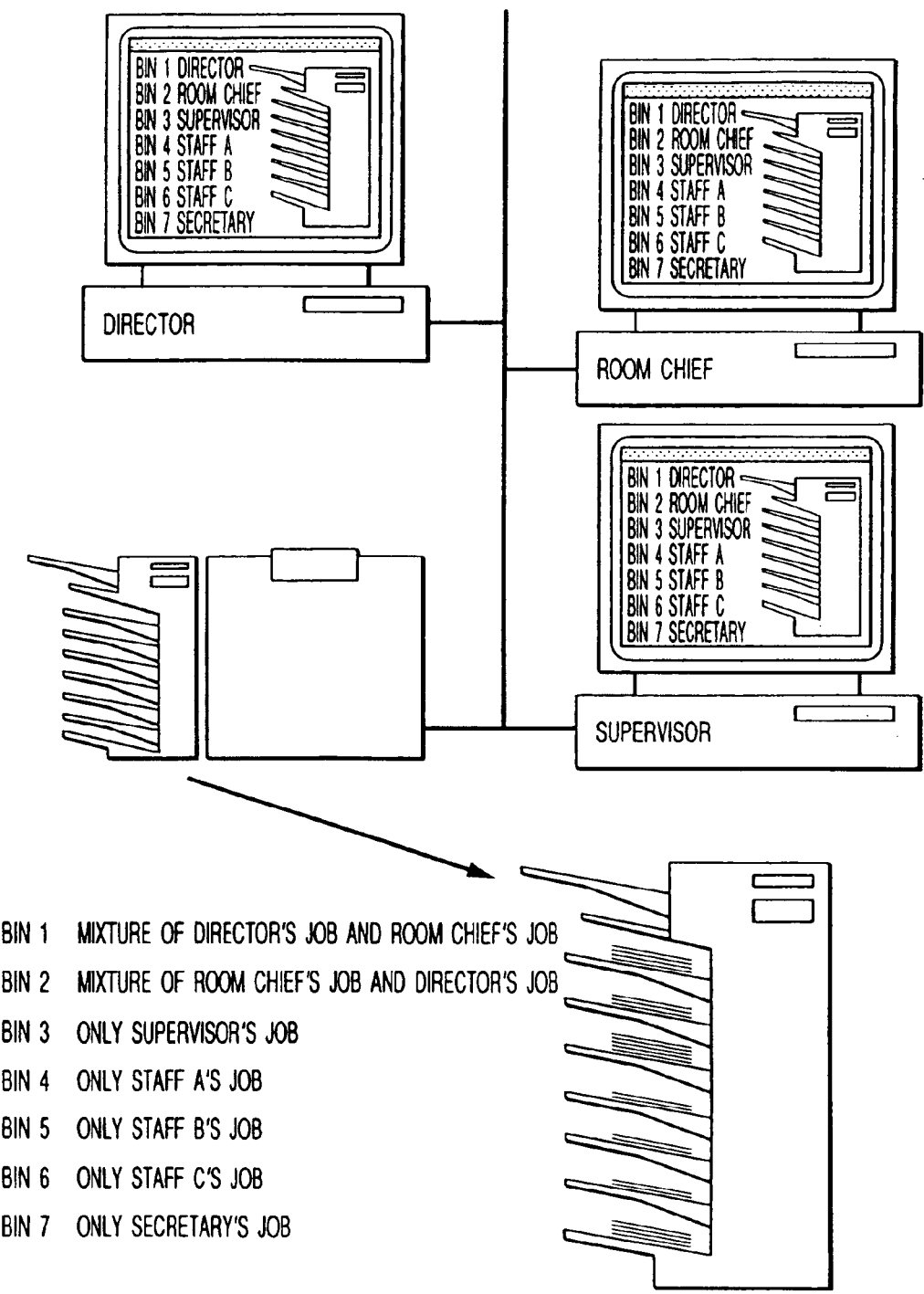

DATA PROCESSING APPARATUS AND IMAGE RECORDING APPARATUS, METHOD FOR CONTROLLING DATA PROCESSING APPARATUS AND METHOD FOR CONTROLLING IMAGE RECORDING APPARATUS, AND STORAGE MEDIUM

BACKGROUND OF THE INVENTION

1. Field of the Invention

The present invention relates to a data processing apparatus capable of transmitting a printing job to an image recording apparatus having a plurality of storing units for storing sheets on which images are formed, or an image recording apparatus to which an option apparatus having a plurality of storing units can be connected, and a image recording apparatus as well as a method for controlling a data processing and a method for controlling an image recording apparatus, and a storage medium.

2. Related Background Art

In recent years, computers are connected to each other by a LAN (Local Area Network), and a LAN connection is possible not only for printers but also for various peripheral equipment such as a multi-function image processing apparatus equipped with the copying and facsimile functions.

In a conventional image recording apparatus, a sheet discharge port of an image recording apparatus is, in most cases, utilized as a place for temporarily storing discharged sheets of a user that are printed even in a case in which the image recording apparatus is connected by a LAN and used in a network environment, and when a document is actually distributed to a department requiring the document, the necessary number of printed documents printed by a printer are sorted and copied by a copying machine and are brought to a box in which respective items to be distributed are placed, and are then distributed.

FIG. 37 is a view illustrating a utilized form of a conventional printer, and corresponds to a case in which copied documents are distributed to each department such as "First Personnel Department," "Second Personnel Department," "Third Personnel Department," "First Secretary Department," "Second Secretary Department," "Third Secretary Department" and "Administration Department."

In the drawing, the printer is only used for outputting a part of original documents prepared by a host computer, and the necessary number of documents corresponding to the number of departments to which copies are distributed are copied by a copying machine based on the original document outputted by the printer and are distributed to a box for items to be distributed by a user manually.

In addition, even in a case in which a single printer is shared by a plurality of users and printed documents are sorted only by a printer without using a copying machine as done in a mail box (a conventional pseudo-mail box sheet discharge), in some cases, a printer driver in a host computer registers and stores in advance a name corresponding to each sheet discharge port registered by a user over a printer driver U1 (a user interface) as information on the host computer in a memory inside the printer itself, and the printer documents are sorted to a sheet discharge port designated by name by a user as a pseudo-mail box sheet discharge by designating a fixed sheet discharge port for the printer instead of designating the name of the sheet discharge port.

FIG. 38 is a view schematically illustrating conversion processing of a sheet discharge distribution address of a conventional printer driver with respect to the sheet discharge distribution address by name by a user.

In the drawing, if a sheet discharge distribution address "first Personnel Department" among the names of the sheet discharge distribution address registered in the printer driver in advance, is designated by a user, the printer driver converts the sheet discharge distribution address to a fixed sheet discharge port "bin 1" registered as "first Personnel Department" and notify the printer that the designation of the sheet discharge port is made to "bin 1" thereby to realize the designation of sheet discharge port by a pseudo-name.

However, the above-mentioned conventional example has the following problems.

In a case such as to distribute an identical document to departments requiring the document, since the necessary number of documents must be printed and distributed by a user sorting them manually, or one document is printed as an original and the necessary number of which is copied and distributed, a user consumed substantial time for sorting or distributing the documents.

In addition, in the above-mentioned conventional pseudo-mail box sheet discharge, since a method employed is to register the name of a sheet discharge port of an image recording apparatus on a host computer and the sheet discharge distribution address is converted to a fixed designation to a sheet discharge port with the name (i.e., in the case of an environment in which a single image recording apparatus is shared by plural host computers, the names of storage units are independently registered respectively for each host computer by an original setting of a user of the host computer), documents cannot be completely sorted in an actual implementation unless an identical name is registered and used for all the host computer sharing the image recording apparatus. There is also a problem that it is highly troublesome to make a setting the same for all the host computer sharing the image recording apparatus, and, without this operation, a document is discharged to a sheet discharge port that is not intended by a user.

Problems of the above-mentioned conventional pseudo-mail box sheet discharge will be hereinafter described with reference to FIG. 39.

FIG. 39 is a view illustrating problems in the conventional pseudo-mail box sheet discharge, and corresponds to a case in which a setting on a host computer for conducting a sheet discharge by the conventional pseudo-mail box sheet discharge is not standardized.

In the illustrated example, a sheet discharge is implemented by setting a bin 1 for a director, a bin 2 for the room chief, a bin 3 for a supervisor, a bin 4 for a staff member A, a bin 5 for a staff member B, a bin 6 for a staff member C and a bin 7 for a secretary. In line with the implementation form in-this office, the director, the room chief and the supervisor register the names of storage units by themselves on host computers they own respectively, and when printing, by designating a name, performs a fixed designation with respect to a sheet discharge port corresponding to the name and have the sheet discharge port to sort simulatively.

However, as shown in the drawing, although the director and the supervisor correctly set the name registrations respectively in their own computers in accordance with the implementation form in this office, since the room chief make a wrong setting by setting a bin of the director and the bin of the room chief wrongly and register the setting in their own apparatus (i.e., due to the state in which the setting of the computer of the room chief among each computer for the director, the room chief and the supervisor is different from that of the others and is a wrong setting), a problem easily occur that a job of the director and a job of the room chief are mixed in the bin 1 and the bin 2 in the printer side.

In addition, even if a sorting is performed by a designation from the host computer, if a printed document is distributed to a plurality of users, since printed data are required to be transmitted to a printer several times (the number of times equal to the number of people the document is distributed to), there is a problem that a load on a network is increased, and overall performance is deteriorated not only in printing but also in all the transmissions and receptions via the network.

SUMMARY OF THE INVENTION

The present invention has been devised in view of the above-mentioned problems, and it is an object of the present invention to provide a data processing apparatus and an image recording apparatus as well as a method for controlling a data processing apparatus and a method for controlling an image recording apparatus, and a storage medium which have solved the above-mentioned problems.

It is an object of the present invention to provide a data processing apparatus and an image recording apparatus as well as a method for controlling a data processing apparatus and a method for controlling an image recording apparatus, and a storage medium capable of easily controlling implementation of a utilization form of an image recording apparatus and providing a system environment in which a high-speed desired distribution processing can be performed without increasing a load on a network for one job transmission under such an environment in which an image recording apparatus is shared by a plurality of users with a user's own printing data being made distributable to a plurality of users without bothering the user and, at the same time, the user's own printing data being made distributable to those who requiring them and by necessary amount in such a case that the user distributes the user's own printing data to the plurality of users.

Other objects and features of the present invention shall be clear through the following description of the specification and drawings.

BRIEF DESCRIPTION OF THE DRAWINGS

FIG. 3 is a view schematically illustrating an example of a sheet discharge port name registration screen to the printer shown in FIG. 1;

FIG. 5 is a view schematically illustrating an example of a distribution address designation screen for designating the distribution of the page selected in the distribution page selection area shown in FIG. 4;

FIGS. 14A, 14B and 14C are explanatory views schematically illustrating the job reading table shown in FIG. 12;

FIG. 18 is a view schematically illustrating signals exchanged among a video controller (VC) and an engine controller (EC);

FIG. 19 is a view schematically illustrating signals exchanged between a video controller (VC), an engine controller (EC) and an option controller (OC);

FIG. 21 is a schematic illustration of a common memory shared with a video controller secured in a RAM provided in the option controller unit shown in FIG. 15;

FIG. 32 is a view schematically illustrating an example of a mail box sheet discharge designation screen for performing a printing instruction of a mail box sheet discharge designation to a printer of a second embodiment of the present invention;

FIG. 34 is a view schematically illustrating an example of a sheet discharge port name registration screen to a printer of a third embodiment of the present invention;

FIG. 35 is a view schematically illustrating an example of a mail box sheet discharge designation screen for performing a printing instruction of a mail box sheet discharge designation to a printer of the third embodiment of the present invention;

FIG. 36 is a view schematically illustrating a memory map of a storage medium storing various kinds of control processing programs that can be read out by the data processing apparatus and the image recording apparatus in accordance with the present invention;

FIG. 39 is a view schematically illustrating a problem in a conventional pseudo-mail box sheet discharge.

DESCRIPTION OF THE PREFERRED EMBODIMENTS

[First Embodiment]

Hereinafter, one embodiment of the present invention will now be described.

Figure 1:
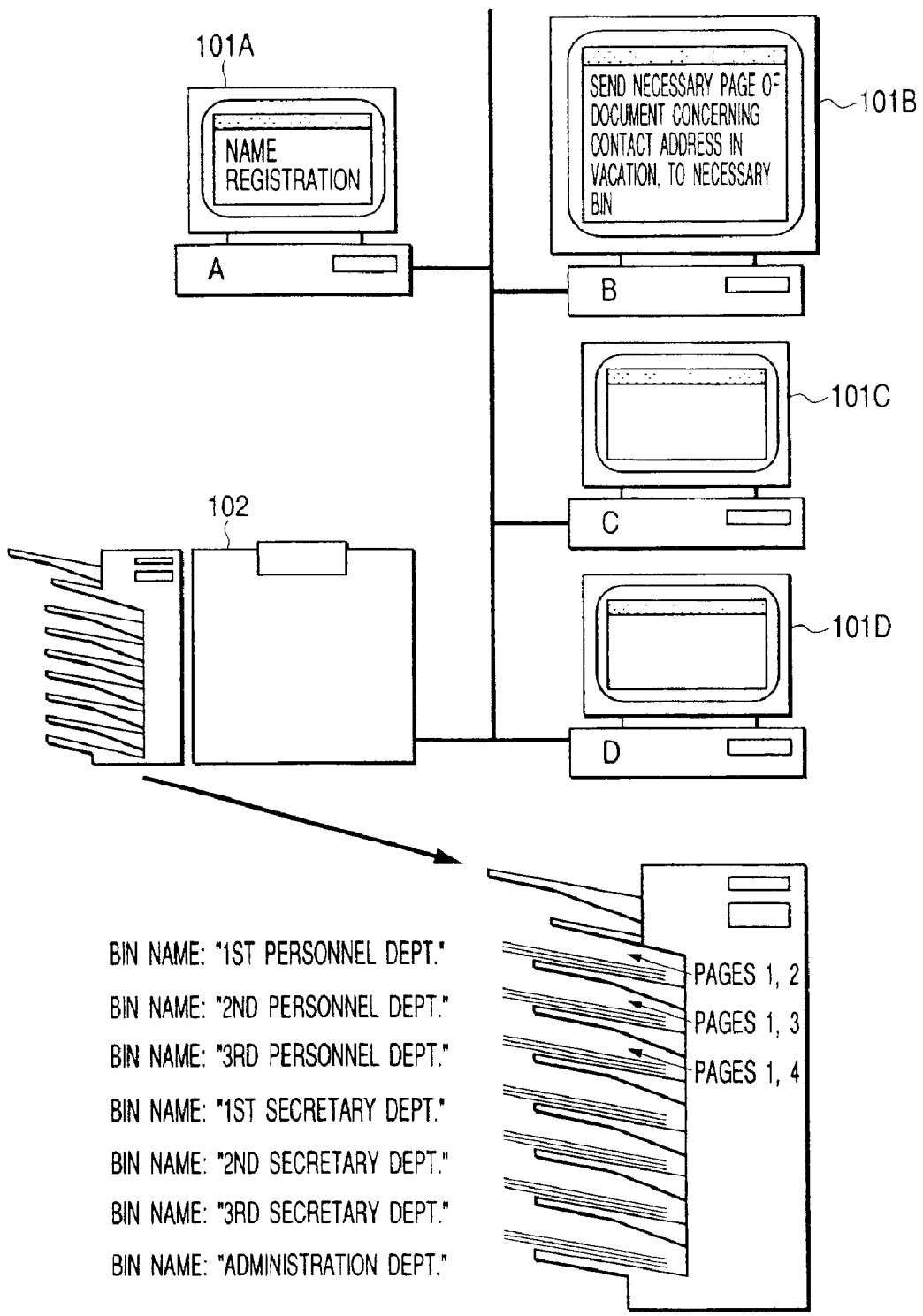
FIG. 1 is a view schematically illustrating a sorting method of an image recording system to which a data processing apparatus and an image recording apparatus showing a first embodiment of the present invention are applicable.

FIG. 1 is a view schematically illustrating a sorting method of an image recording system to which a data processing apparatus and an image recording apparatus showing a first embodiment of the present invention are applicable, and corresponds to a case in which sorted sheet discharge of a plurality of users printing jobs is realized by using discharge bins of a printer shared by a plurality of users as a mail box.

Note that, the sheet discharging method with which a user designates names for a plurality of sheet discharge ports registered in a printer shared by a plurality of users in advance with a printer driver U1 in a host computer to sort printed document, and each sheet discharge bin of a shared printer is used as a mail box by designating will be hereinafter referred to as a mail box sheet discharge.

Actual implementation of the mail box sheet discharge will now be described based on this drawing.

In the drawing, reference numeral 102 denotes an image recording apparatus (a printer) that is connected to an external device (host computer 101 (101A, 101B, 101C, 101D))via a predetermined communication medium, for example, a local interface prescribed by the IEEE 1284 and the like, or a network interface such as the Ethernet, performs image recording in a recording medium based on image information transmitted from each host computer to discharge sheet and output to bins 1 through 7 of a sheet discharge option device 108, and is shared and used by four users A, B, C and D, Further, the sheet discharge bins are referred to as bin 1, bin 2, . . . , bin 7 from the top.

Figure 2:
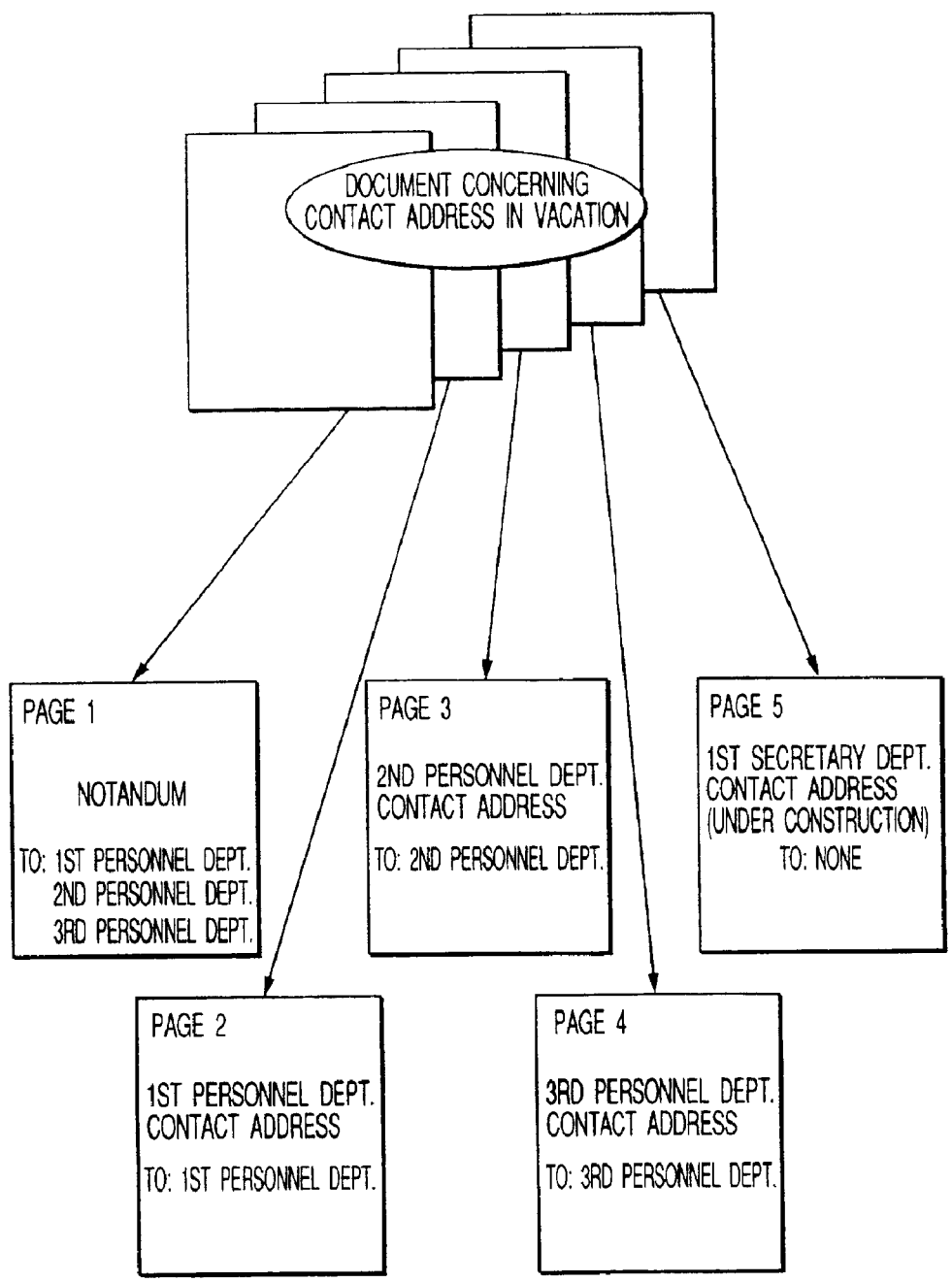
FIG. 2 is a view schematically illustrating a case in which necessary pages of a "document concerning contact address in vacation" consisting of five pages are distributed to departments requiring the pages in an environment in which a printing by a mail box sheet discharge designation is possible.

In this example, a user B is trying to distribute necessary pages of a "document concerning contact address in vacation" consisting of five pages as shown in FIG. 2 to departments requiring the same in an environment in which printing of a mail box sheet discharge designation is possible.

FIG. 2 is a schematic illustration in a case in which necessary pages of a "document concerning contact address in vacation" consisting of five pages are distributed to departments requiring the pages in an environment in which a printing by a mail box sheet discharge designation is possible.

As shown in the drawing, a user is trying to distribute necessary pages of a "document concerning contact address in vacation" to departments requiring the same in such a way as to distribute page 1 to "first Personnel Department," "second Personnel Department" and "third Personnel Department," page 2 to "first Personnel Department" only, page 3 to "second Personnel Department" only, page 4 to "third Personnel Department" only, and not distribute page 5 anywhere.

If printing is performed by a mail box sheet discharge designation, a name to be a distribution address of a mail box must be registered and set first to each sheet discharge port of the printer. In the present embodiment, the registration setting is made to a printer 102 by an administrator using its own computer under the network environment. The registration information is shared by respective users under the network environment.

For example, if A is an administrator for administering setting and the like of a printer among the above-mentioned four users, the administrator A needs to register a name for each sheet discharging bin in order to perform a mail box sheet discharge (sheet discharge in a mail box sheet discharging mode) by a printer connected to the network.

If the administrator registers a name to each sheet discharge bin of the printer, the registration is performed, for example, on a UI (user interface) shown in FIG. 3 described below, which is displayed on a display unit of an own apparatus 101A by an application for setting a printer.

FIG. 3 is a view schematically illustrating an example of a sheet discharge port name registration screen to the printer 102 shown in FIG. 1, and if A is an administrator for administering setting and the like of the printer, the screen is displayed on a display unit on the host computer 101A of FIG. 1 by an application on the host computer 101A with an instruction from a keyboard (not shown) and the like of the host computer 101A.

In the drawing, reference numeral 501 denotes a fixed sheet discharge port display computer 101A displays fixed sheet discharge ports ("bin 1", "bin 2", "bin 3", ..., "bin 7") by obtaining fixed sheet discharge port such as "bin 1", "bin 2", "bin 3", ..., "bin 7" that are set in advance in the EEPROM 410 in the printer 102 shown in FIG. 20 to be described later.

Reference numeral 502 denotes a sheet discharge port name registering area in which sheet discharge port names (identification information for representing owners using a sheet discharge port such as a user name, a group name and a department name) that can be easily recognized by a user as a distribution address of a mail box such as "first Personnel Department," "second Personnel Department," "third Personnel Department," "first Secretary Department," "second Secretary Department," "third Secretary Department" and "Administration Department" are inputted by a keyboard (not shown) of the host computer 101A, or registered by selecting from a plurality of sheet discharge port names stored in a ROM (not shown) or other storage media in advance, with respect to each fixed sheet discharge port of the printer 102 to be displayed in the fixed sheet discharge port displaying area 501.

In addition, as shown in FIG. 3, if the sheet discharge ports are registered by the names of departments, since one bin becomes a common mail box of a plurality of users belonging to a department registered in the bin, the number of group members can be registered with respect to each sheet discharge port name in order to make distribution with the number of copies for the number of users possible with respect to the same document.

Reference numeral 503 denotes the number of group members registering area in which the number of users belonging to a group registered in the sheet discharge port name registering area 502 can be registered by inputting it by a keyboard (now shown) of the host computer 101A.

In this way, by registering the number of group members, a document can be distributed to the registered object bin with the number of group members by the distribution address name.

Reference numeral 504 denotes an OK key, and the sheet discharge port name registration screen is finished by pointing the key with a pointing device (not shown) of the host computer 101A to validate the registration in the sheet discharge port name registration screen. Reference numeral 505 denotes a cancel key, and the sheet discharge port name registration screen is finished by pointing the key with a pointing device (now shown) of the host computer 101A to invalidate the registration in the sheet discharge port name registration screen.

Further, as a name to be registered as a sheet discharge port name in the mail box sheet discharge, that is, a name to be registered in the sheet discharge port name registering area 502, identification information representing an owner using the sheet discharge port such as a user name and a group name is effective as well as department names as in FIG. 2.

In addition, the configuration may be such that only an administrator can register a sheet discharge port name by providing a password for doing so.

Moreover, the sheet discharge port name registration may be performed by displaying the sheet discharge port name registration screen shown in FIG. 2 on an operating unit of the image recording apparatus.

The above-mentioned settings are registration information that is set from the remote computer 101A of the administrator administering the image recording apparatus 102, or the operating units and the like of the image recording apparatus 102 to the image recording apparatus 102, and that is set by a user such as an administrator, and in the present embodiment, the set information is stored and maintained in the memory (such as an EEPROM 410 in the image forming apparatus 102 to be referred to later) in the image recording apparatus 102. In addition, this information is transmittable from the image recording apparatus 102 to the user's computer via a network in accordance with a request from the administrator or other usual users (for example, any one of the host computers 101A through 101D). Further, the administrative information may be registered in an administration server without being stored and maintained in the image recording apparatus 102 and may be transmittable therefrom in accordance with a request from a user.

A method for designating a mail box sheet discharge at the time of printing will now be described. The following operations are the setting performed by a person desiring to print and distribute his/her own data on his/her own computer.

For example, in FIGS. 1 and 2, a case in which a user B sets in his/her computer 101B such that page 1 of a document prepared on his/her computer 101B, for example, a document consisting of five pages entitled "document concerning contact address in vacation" is distributed to "first Personnel Department," "second Personnel Department" and "third Personnel Department," page 2 to "first Personnel Department" only, page 3 to "second Personnel Department" only, page 4 to "third Personnel Department" only, and page 5 is not distributed anywhere, and transmits a print job to the image recording apparatus 102 will now be described.

A UI (user interface) of a printer driver for designating a mail box sheet discharge will now be described with reference to FIGS. 4 and 5.

Figure 4:
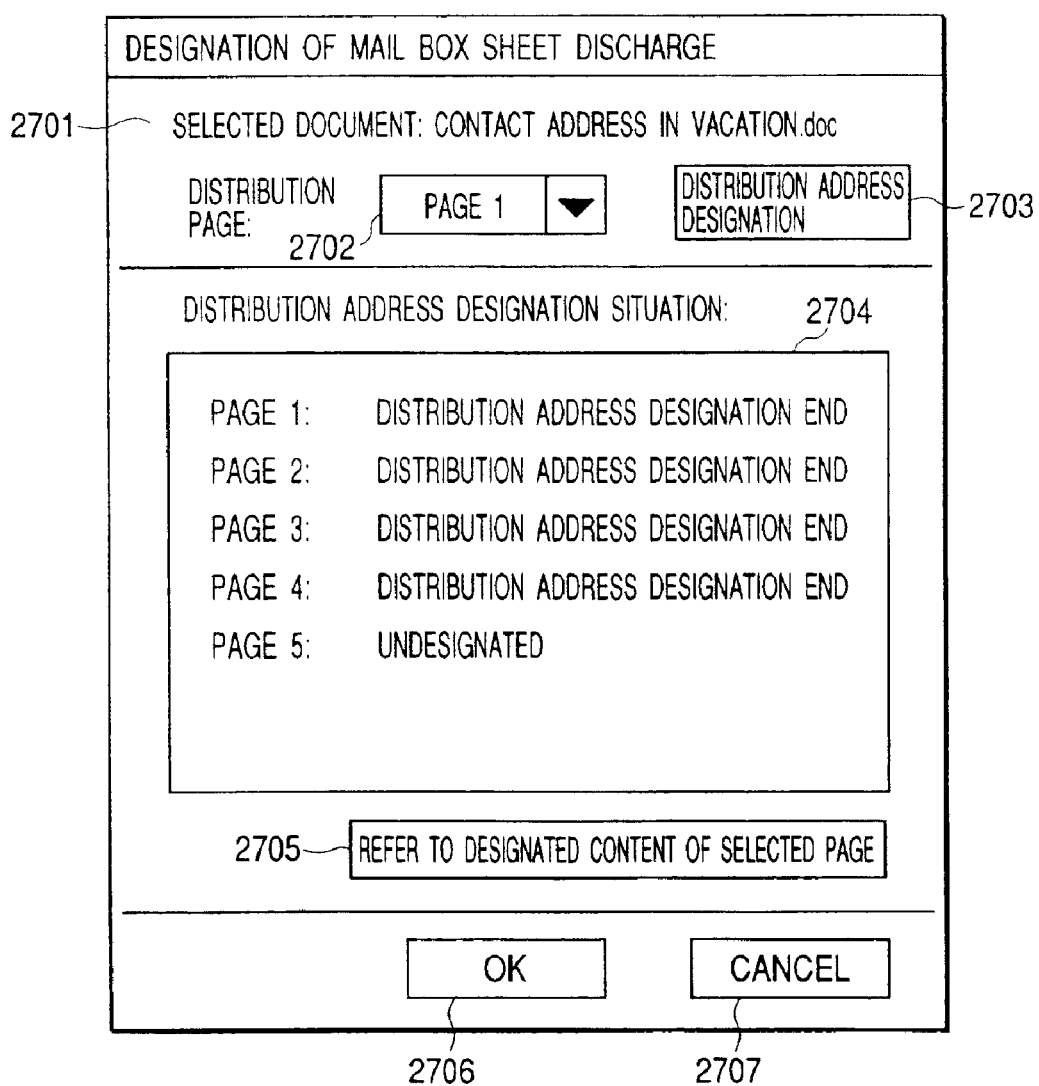
FIG. 4 is a view schematically illustrating an example of a mail box sheet discharge designation screen for performing a printing instruction by the mail box sheet discharge designation to the printer shown in FIG. 1.

FIG. 4 is a view schematically illustrating an example of a mail box sheet discharge designating for performing a printing instruction by a mail box sheet discharge designation screen to the printer 102 shown in FIG. 1, which is displayed in the display units of the host computer 101 of FIG. 1 at the time of printing by the print driver on the host computer 101 (101A through 101D) of FIG. 1.

Since the screen is the one displayed on a computer of a user desiring a printing, it is displayed on the screen of the computer 101B of the user B in this example. This is the same for a screen in FIG. 5. Further, information displayed on an operating screen (particularly information displayed in the area 602 of the screen in FIG. 5 to be described later) for designating a mail box sheet discharge that is displayed on a computer for outputting a printing job to the image recording apparatus, such as the screens of FIGS. 4 and 5 is generated based on the data set and registered by the administrator and set using the above-mentioned screen of FIG. 3 and the like, which is stored and maintained in a memory in the image recording apparatus 102, for example, the EEPROM 410 to be described later. That is, the computer outputting a printing job is configured such that, before displaying the screens of FIGS. 4 and 5, a command data for requesting the information administered by the image recording apparatus 102 to the image recording apparatus 102 is transmitted to the image recording apparatus 102 via the network in advance in accordance with an instruction from a user, and on the other hand, the image recording apparatus 102 receiving the command data transmits administrative information to the computer which outputted the request in order to respond to the request, and the computer obtains the administrative information from the image recording apparatus 102 and generates to display an operating screen for designating a mail box sheet discharge based on the obtained information.

In the drawing, reference numeral 2701 denotes a selected document displaying area, in which a file name of a selected document to be printed is displayed. A case in which "Contact Address in Vacation.doc" is selected is shown here. Reference numeral 2702 denotes a distribution page selecting area, in which a page to be distributed is selected, Reference numeral 2703 denotes a distribution address designation button. By pointing the button with a pointing device (now shown) of the host computer 101 (in this example, 101B), a distribution address designation screen shown in FIG. 5 is displayed and the distribution of the page selected in the distribution page selecting area 2702 can be designated.

Reference numeral 2704 denotes a distribution address designation status displaying area, in which the designation status of a distribution address for each page is displayed. Reference numeral 2705 denotes a designated content of selected page reference button, and by pointing the button with a pointing device (not shown) of the host computer 101, a designated content of selected page reference screen (not shown) is displayed and the designated content of the page selected in the distribution page selecting area 2702 can be referred to.

Reference numeral 2706 denotes an OK key, and by pointing the key with a pointing device (not shown) of the host computer 101, the designation of the mail box sheet discharge designation screen is validated and the mail box sheet discharge designation screen is finished. Reference numeral 2707 denotes a cancel key, and by pointing the key with a pointing device (now shown) of the host computer 101, the designation of the mail box sheet discharge designation screen is invalidated and the mail box sheet discharge designation screen is finished.

FIG. 5 is a view schematically illustrating an example of a distribution address designation screen for designating the distribution of the page selected in the distribution page selecting area shown in FIG. 4. By pointing the distribution address designation button 2703 shown in FIG. 4, the distribution address designation screen is displayed on the display unit of the host computer 101 of FIG. 1 by the printer driver on the host computer 101 (101A through 101D) of FIG. 1.

In the drawing, reference numeral 602 is a distribution address displaying area, in which all the distribution addresses are displayed by the sheet discharge port names registered by the sheet discharge port name registration screen that the administrator operates. Reference numeral 601 denotes distribution instruction check box, and by pointing the check box with a pointing device (not shown) of the host computer 101, whether there is a distribution or not can be indicated to each distribution address displayed in the distribution address displaying area 602. Reference numeral 603 is a number of distribution copies inputting area, and by inputting numbers in this inputting area with a keyboard (not shown) of the host computer 101, the inputted number of documents can be distributed to the distribution addresses to which distribution is instructed by the distribution instruction check box 601. Reference numeral 604 denotes a distribution for all members instruction check box, and by pointing this check box with a pointing device (not shown) of the host computer 101, the number of documents for the number of group members of each distribution address(the number of group members registered in the number of group members registering area 503 shown in FIG. 3) can be distributed to the distribution addresses to which the distribution is instructed in the distribution instruction check box 601.

Further, if the distribution for all members instruction check box 604 is checked, the instruction in the number of distribution inputting area 603 becomes invalid.

Figure 20:
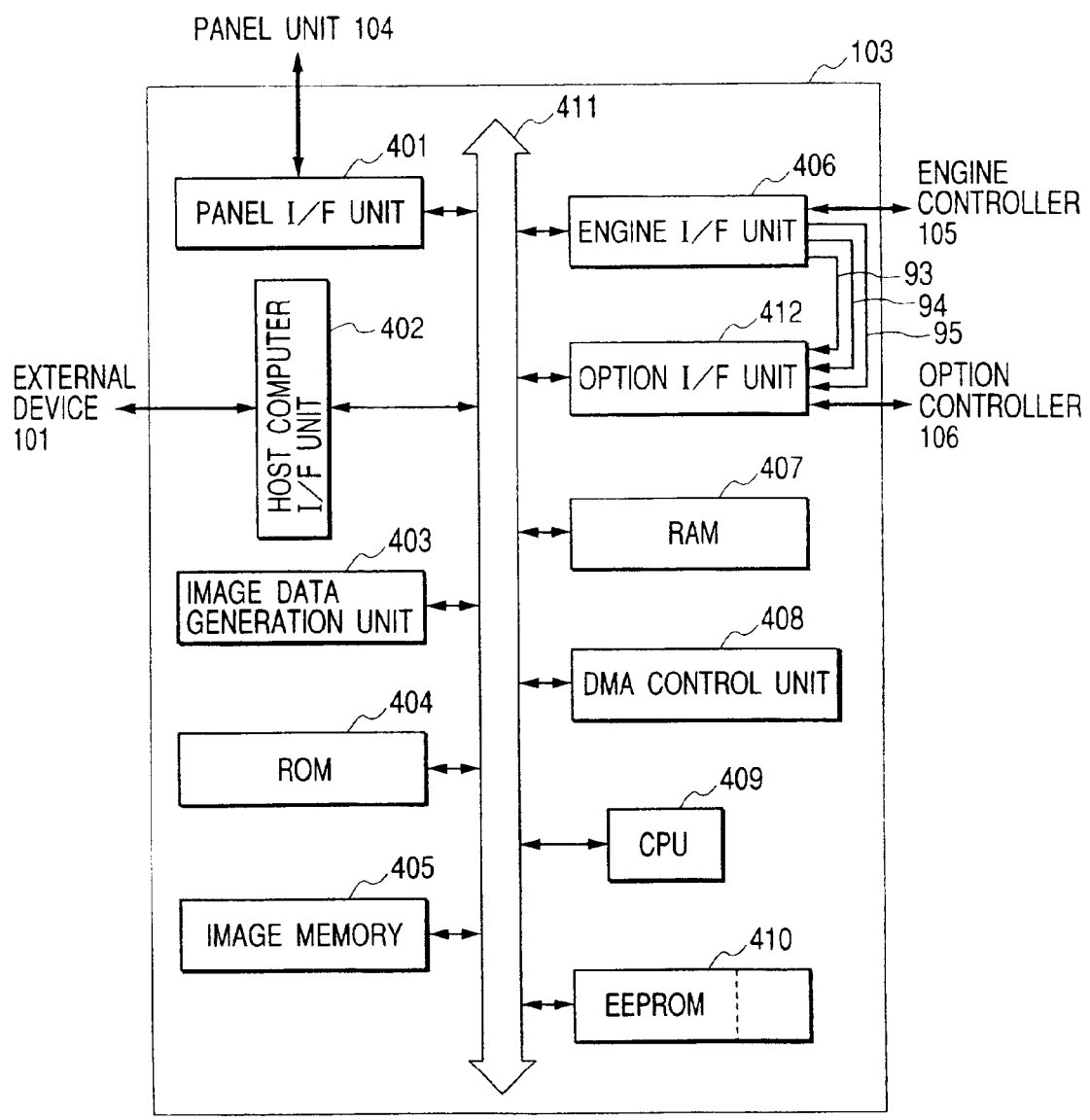
FIG. 20 is a block diagram illustrating the configuration of the video controller shown in FIG. 15.

In addition, a sheet discharge port name and the number of group members corresponding to each sheet discharge port name displayed on the distribution address displaying area 602 shall be obtained by the host computer 101 requesting administration information including each number of group members corresponding to a sheet discharge port name such as "first Personnel Department," "second Personnel Department," "third Personnel Department," "first Secretary Department," "second Secretary Department," "third Secretary Department" and "Administration Department" registered by an administrator in advance in the EEPROM 410 in the image recording apparatus 102 shown in FIG. 20 to be described later, and each sheet discharge port name to the image recording apparatus 102.

Reference numeral 605 denotes an OK key, and by pointing this key with a pointing device (not shown) of the host computer 101A, the designation of the mail box sheet discharge designation screen is made valid and the mail box sheet discharge designation screen is finished. Reference numeral 606 denotes a cancel key, and by pointing this key with a pointing device (not shown) of the host computer 101A, the designation of the mail box sheet discharge designation screen is made invalid and the mail box sheet discharge designation screen is finished.

A method for designating mail box sheet discharge at the time of printing will be described below.

The designation of mail box sheet discharge is performed on, for example, the UI (user interface) of the printer driver shown in FIGS. 4 and 5.

In FIG. 4, "Contact Address in Vacation.doc" of a "document concerning contact address in vacation" to be distributed by the mail box sheet discharge designation is displayed as a selected document.

A user selects a distribution page for each page to be distributed from the list in order and presses a distribution address designation button to designate a concrete distribution address of the selected page.

The distribution address designation screen shown in FIG. 5 is displayed by pressing the distribution address designation button 2703 of FIG. 4.

In this screen, the user designates a distribution address corresponding to the page selected in the distribution page selecting area 2702 on the UI screen of FIG. 4. A selected document and a selected page are displayed as "Contact Address in Vacation.doc" and "page 1" in the columns of "selected document" and "distribution page" respectively in FIG. 5. In addition, all the distribution addresses are displayed by the registered names in FIG. 3.

The user designates whether a page to be printed is distributed to each distribution address or not by checking in each check box.

In addition, the use can distribute one copy each to "first Personnel Department," "second Personnel Department" and "third Personnel Department" in the example of FIG. 5 by designating the number of copies that are distributed to the checked distribution addresses in the column of "the number of distribution copies".

Designation methods of the number of distribution copies include means for designating a number for distributing the same number of copies to distribution addresses to which distribution is designated, and means for designating to distribution of the number of copies for all members in a group for each distribution address in accordance with a set value of the number of the group members set at the time of name registration of FIG. 3.

In a case in which the copies are distributed for all members of a group for each distribution address as in the above latter case, designation is possible by checking in the distribution for all members instruction check box 604 on the UI of FIG. 5.

When a distribution address is designated on the UI of FIG. 5, whether a distribution address is designated for each page of "Contact Address in Vacation.doc" or not is displayed in the distribution address designation status displaying area 2704 on the UI of FIG. 4.

A page for which a distribution address is designated by a user is displayed as "Distribution Address Designation End" and when printing is executed with this designation, mail box sheet discharge is performed only for the page displayed as "Distribution Address Designation End" in accordance with the content of designation.

On the other hand, a page for which a distributions address is not designated is displayed as "undesignated" and when printing is executed with this designation, the "undesignated" page is not distributed to any designation address.

To the contrary, if there is a page unnecessary to be sent to any distribution address among the pages of the "selected document," it is possible for the user not to print that page only by not designating a distribution address on the UI screen of FIG. 4.

As described above, if the distribution designation is set and the printing button on the screen for instructing request for the start of image printing is pressed, the host computer 101 transmits an image data to be printed to the image recording apparatus 102 as a printing job together with the instruction data including the instruction by the user set via the screens of FIGS. 4 and 5. Upon receiving the data, the image recording apparatus 102 executes, for each page, image recording processing based on the information and the like set in the host computer 101 side as well as the selection of a bin to which the distribution should be made and the distribution of a recording sheet to the selected bin.

By performing mail box sheet discharge designation on the printer driver UI as described above, the user can distribute necessary pages of the "document concerning contact address in vacation" consisting of five pages to the sections requiring the pages as shown in the examples of FIGS. 1 and 2.

Hereinafter, the present embodiment will be hereinafter described in detail.

Processing on the host computer 101 of the image recording system will first be described with reference to FIGS. 6 to 10.

Figure 6:
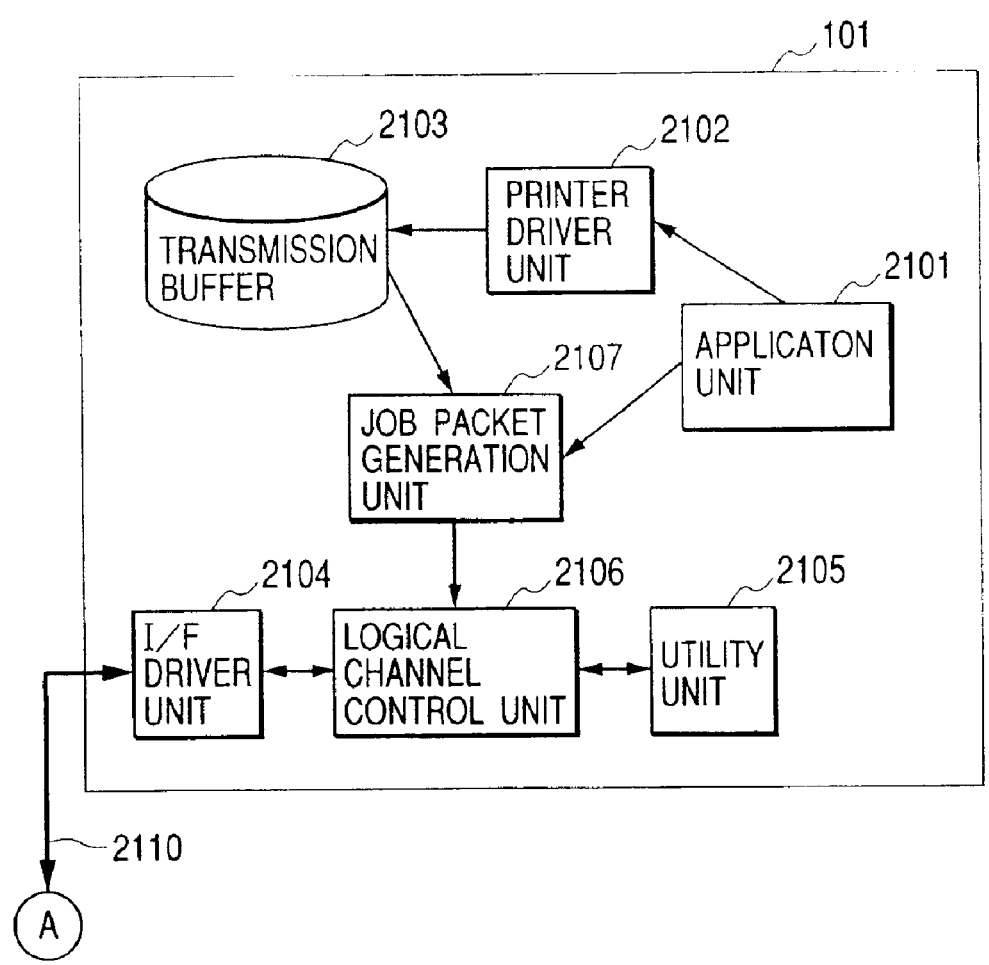
FIG. 6 is a block diagram for illustrating the configuration of the data processing apparatus showing the first embodiment of the present invention.

FIG. 6 is a block diagram for illustrating a configuration of a data processing apparatus showing the first embodiment of the present invention, and realizes the mechanisms of transmitting a printing job from the host computers 101A through 101D. (hereinafter referred simply as the host computer 101) to the image recording apparatus 102, obtaining information of the image recording apparatus 102 and performing environmental setting in the image recording system shown in FIG. 1.

As shown in the drawing, the image recording system is composed of the host computer 101 for generating a job to be printed, the image recording apparatus 102 for actually printing on a sheet, a predetermined interface 2110 and an interface 2211 shown in FIG. 12 to be described later.

The interface 2110 and the interface 2211 shown in FIG. 12 to be described later may be either a local interface prescribed by the IEEE 1284 or a network interface such as the Ethernet, and in the present embodiment, a case of the local interface will be described as an example.

In FIG. 6, reference numeral 2101 denotes an application unit, with which a user generates desired printing data by operating a graphic user interface. Reference numeral 2102 denotes a printer driver unit, which converts image data prepared by the application unit 2101 to page descriptive language (hereinafter abbreviated as PDL) data that can be printed by the image recording apparatus 102.

Reference numeral 2103 denotes a transmission buffer, which temporarily stores the PDL data converted by the printer driver unit 2102, Reference numeral 2107 denotes a job packet generation unit, which generates a predetermined job packet from the PDL data stored in the transmission buffer 2103 and job attribute information held by the application unit 2101. Reference numeral 2105 denotes a utility unit, which converts the requests of operations such as confirmation of the status of the image recording apparatus 102 and the printing status of the transmitted printing job, cancellation of the printing job and interruption to a management packet that the image recording apparatus 102 can interpret using the graphic user interface.

Reference numeral 2106 denotes a logical channel control unit, which assigns the job packet and the management packet to different channels respectively and performs duplexing of a transport layer in an OSI 7 hierarchy. Reference numeral 2104 denotes an I/F driver unit, which converts logical data to an electric signal and exchanges signals with the interface.

As described above, the host computer 101 is composed of the application unit 2101, the printer driver unit 2102, the transmission buffer 2103, the job packet generation unit 2107, the utility unit 2105, the logical channel control unit 2106 and the I/F driver unit 2104 and so on.

Further, the above-mentioned each unit in the host computer 101 may be composed of a dedicated hardware respectively or may be composed of a CPU, a ROM or other storage media storing a program to be executed by a CPU, a RAM, an EEPROM, a hard disc and the like.

In addition, considering that data transmission to be performed from the logical channel control unit 2106 of the host computer 101 to a logical channel control unit 2202 (shown in FIG. 12 to be described later) of the image recording apparatus 102 is applied a duplexing of a transport layer level by the prescribed protocols by, namely, the TCP/IP in the case of a network and the IEEE 1284/IEEE 1284.4 in the case of a local, a detailed description is omitted.

A job packet to be transmitted from the job packet generation unit 2107 logically is received by a job preprocessor unit 2203 (shown in FIG. 12 to be described later) of the image recording apparatus 102. The route is called a job channel, and a management packet transmitted and received by the utility unit 2105 is transmitted and received by an information management unit 2210 (shown in FIG. 12 to be described later) of the image recording apparatus 102. This route is called a control channel.

Both the channels are prescribed to be capable of two-way communications, however, as far as the job channel is concerned, only one-way communication from the host computer to the image recording apparatus does not hamper the present embodiment.

The job channel and the control channel are duplexed at the transport layer level in the OSI 7 hierarchy ,and the flow processing of the one does not affect the other.

Configurations of a job packet and a management packet of the image recording system to which the data processing apparatus and the image recording apparatus of the present invention can be applied will now be described with reference to FIG. 7.

Figure 7:
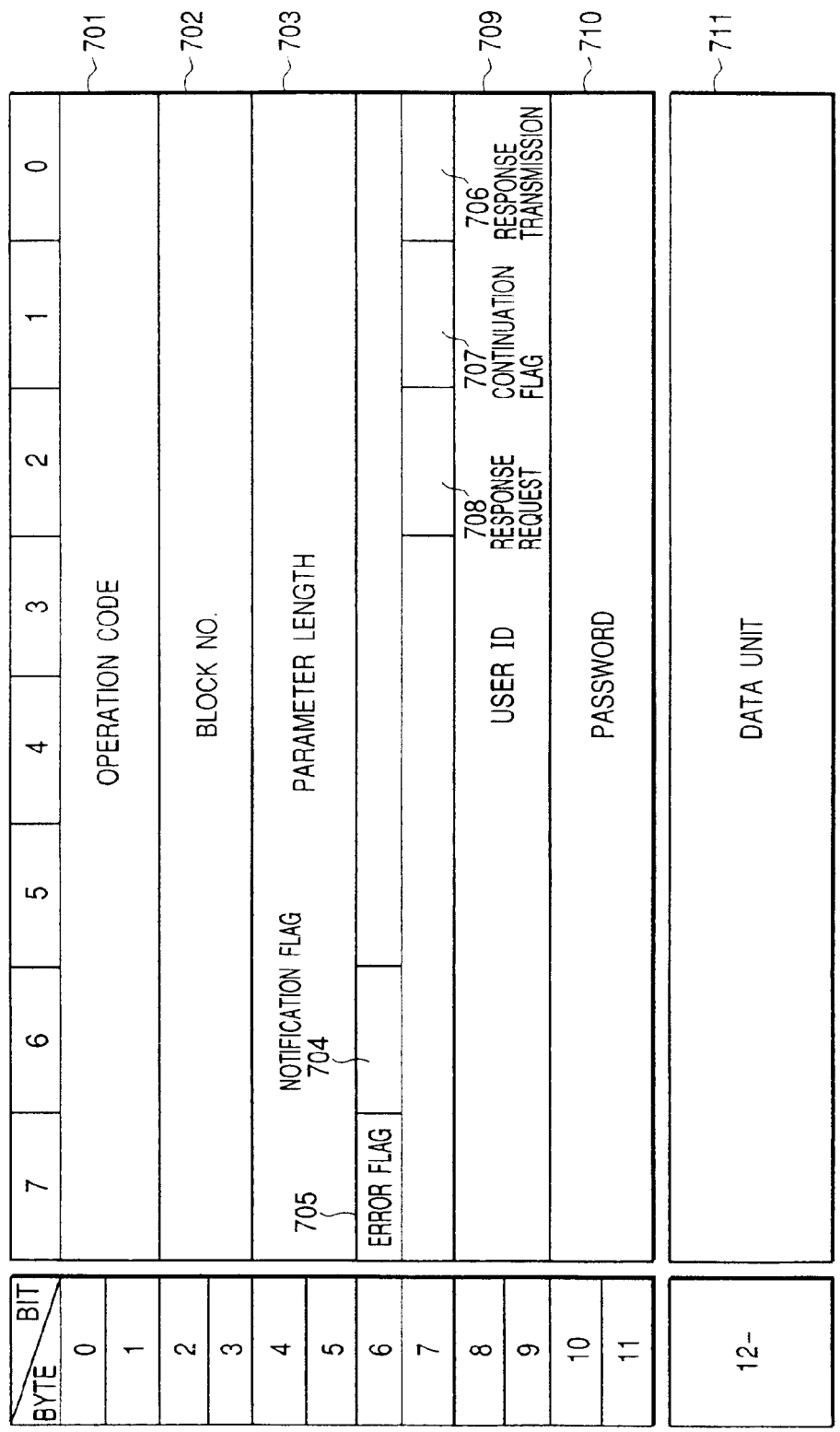
FIG. 7 is a view schematically illustrating the configuration of a job packet and a management packet of the data processing apparatus of the present invention.

FIG. 7 schematically illustrates the configuration of a job packet and a management packet of the data processing apparatus of the present invention.

A job packet and a management packet of the image recording system to which the data processing apparatus and the image recording apparatus can be applied are protocols of the application layer, and have a packet structure consisting of a header unit and a parameter unit.

In addition, one printing job consists of a plurality of job packets, and a set of a series of job packets forming a printing job is called a job script.

In the drawing, the vertical axis shows a byte and the horizontal axis shows a bit of each byte.

Zero to first byte of a packet is a region showing an operation code 701, and is an ID with the length of two bytes showing the function of the packet. This operation code 701 can take the following values in a job packet. Note that, "0x" in the code shows the hexadecimal number representation.
"0x0201": Job start operation
"0x0202": Job attribute setting operation
"0x0204": PLD data transmission operation
"0x0205": Job end operation Second to third byte of the packet is a region showing the block number 702, which is the number used to find which response request of a transmitting side a response from a receiving side corresponds to if the transmitting side of a job packet requests a response.

For example, when job packets with the block number=1, 2, 3 are serially transmitted, if an error packet with the block number=2 is returned, the transmitting side can specify that an error has occurred in the second job packet sent.

Fourth to fifth byte of the packet is a region showing a parameter length 703, and a parameter length is a region showing the byte length of a data unit and can indicate 0 to 64 Kbytes (KB).

Sixth to seventh byte of the packet is a region showing various kinds of flags of a job packet, which respectively shows the following values.

First, sixth bit of the sixth byte of the packet is a region showing a notification flag 704, which indicates that the image recording apparatus notifies the host computer that there is some notification instead of a response to a request packet from the host computer when the value is "1".

Then, seventh bit of the sixth byte of the packet is a region showing an error flag 705, which indicates that some error has occurred in the image recording apparatus if the value is "1". This flag is added to a return packet to be transmitted from the image recording apparatus to the host computer.

In addition, zero bit of the seventh byte of the packet is a region showing a response transmission 706, which indicates that a response is a response to a request packet from the host computer when the value is "1".

Further, first bit of the seventh byte of the packet is a region showing a continuation flag 707, which indicates that, since all the data have not been accepted in a data unit, the remaining data are transmitted in the next job packet if the value is "1". The same operation code and block number as the previous packet must be set in the next job packet.

In addition, second bit of the seventh byte of the packet is a region showing a response request 708, which sets "1" if a response packet is necessary from the host computer to the image recording apparatus. When "0" is set in the response request 708, no response is returned if the request packet is normally processed. However, if an error occurs in the image recording apparatus 102, the image recording apparatus 102 returns a response packet always having the error flag 705 set as "1" irrespective of a value ("0" or "1") set in the response request 708 received by the image recording apparatus 102.

In addition, eighth to ninth byte of the packet is a region showing a user ID 709 and tenth to eleventh byte of the packet is a region showing a password 710, which are used for authentication when security limitation is set for an operation that can be performed in the request packet. This does not affect the present embodiment.

Twelfth byte onward of the packet is a region showing a data unit 711, in which additional data corresponding to the operation code 701 are stored.

In case of the job start operation, an execution mode of a job is described as additional data. Execution modes that can be designated are listed below.

"0x01": Usual execution of a job. The job is lastly added to a queue of the image recording apparatus as a usual job, and performs printing processing when a scheduled time comes.

"0x04": Interruption execution of a job. The job is handled as an interruption job, and the printing of the job is given priority to be executed by suspending the processing of all the jobs.

In case of the job attribute setting operation, a job attribute ID desired to be set and a job attribute value are set. A job attribute ID shows a identifier corresponding to an attribute or an environment concerning the job and is assigned in advance an ID equivalent to an attribute of a job prescribed in the ISO-10175 (DPA). Typical job attributes are listed below.
Job Attribute ID
"0x0101": Job name
"0x0103": Job owner name
"0x016a": Job size
"0x017a": Sheet discharge mode designation
"0x018a": The number of printing In addition to the above, job attributes such as the designation of finishing concerning sheet discharge and black and white or color, and corresponding ID can be assigned depending on the function of the image recording apparatus.

In case of the PDL data transmission operation, PDL data is inputted in the additional data unit. Data of one job packet as large as 64 Kbytes, the maximum size that can be stored in the parameter length, can be stored, and data larger than this size are divided into a plurality of PDL data transmission operations and transmitted. In this case, 1 is flagged in the continuation flag.

In case of the job end operation, additional data does not exist.

Control processing operations of the job packet generation unit 2107 in the host computer 101 shown in FIG. 6 will hereinafter described with reference to FIGS. 8 and 9.

Figure 8:
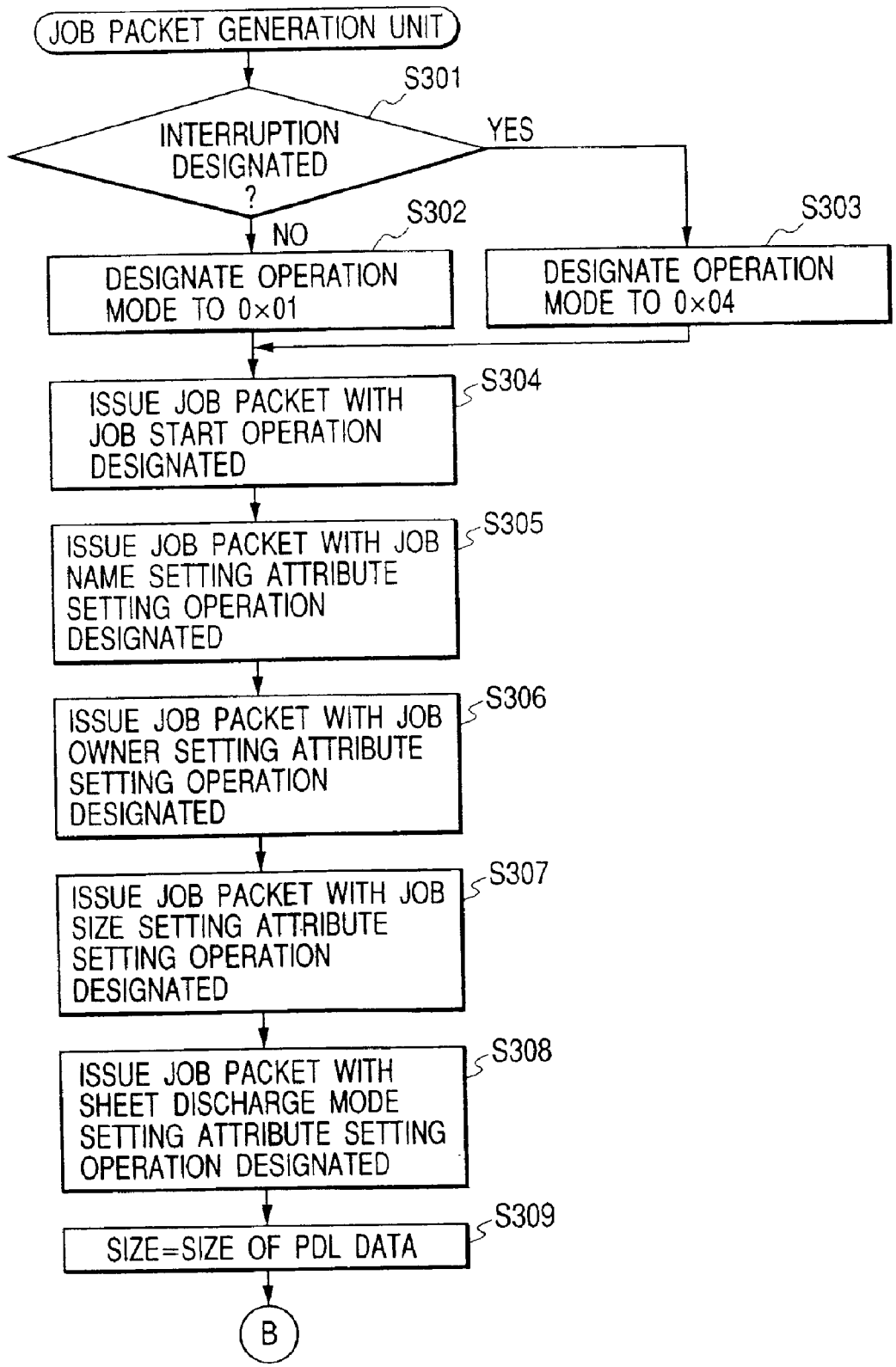
FIG. 8 is a flow chart showing first control processing procedures of an image recording system to which the data processing apparatus and the image recording apparatus of the present invention are applicable.
Figure 9:
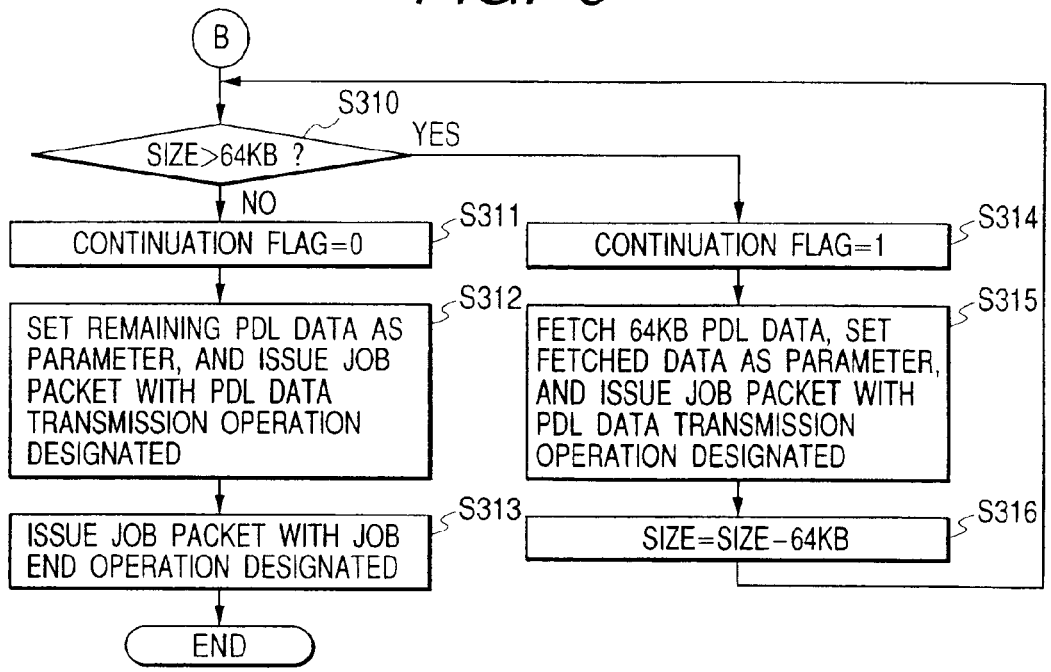
FIG. 9 is a flow chart showing first control processing procedures of an image recording system to which the data processing apparatus and the image recording apparatus of the present invention are applicable.

FIGS. 8 and 9 are flow charts showing first control processing procedures of an image recording system to which the data processing apparatus and the image recording apparatus of the present invention are applicable, and particularly correspond to job packet generation processing procedures of the job packet generation unit 2107. Further, S301 through S316 shows each step.

The job packet generation unit 2107 is activated by the printer driver unit 2102 when printing designation is selected by the application unit 2101 and starts processing after the printer driver unit 2102 completes the generation of printing data in the transmission buffer unit 2103.

First, in step S301, whether the job is interruption designated or not is determined, Interruption designation is designated by a property provided by the user interface of the printer driver unit 2102.

In step S301, if the job is determined to be interruption designated, the operation mode is set as the interruption execution of job "0x04" in step S303, and on the other hand, if the job is determined not to be interruption designated, the operation mode is set as the usual execution of job "0x01" in step S302.

Then, in step S304, a job packet in which the job start operation code "0x0201" is designated in the region for storing the operation code 701 shown in FIG. 7 is issued to the logical channel control unit 2106.

At this time, an operation mode is set in the additional data region of the job packet, and whether the operation mode is a usual job or an interruption job is designated. Thereafter, all the operations are used solely for information setting of the job until the job end operation is issued.

Then, in step S305, a job name is set. A job packet in which the job attribute setting operation code "0x0202" is designated in the region for storing the operation code 701 shown in FIG. 7 and the job attribute ID "0x0101" indicating a job name and a name to be a job attribute value are designated in the data unit 711 is issued to the logical channel control unit 1106.

Then, in step S306, a job owner is set. A job packet in which the job attribute setting operation code "0x0202" is designated in the region for storing the operation code 701 shown in FIG. 7 and the job attribute ID "0x0103" indicating a job owner and an owner name to be a job attribute value are designated in the data unit 711 is issued to the logical channel control unit 2106.

Then, in step S307, a job size is set. A job packet in which the job attribute setting operation code "0x0202" is designated in the region for storing the operation code 701 shown in FIG. 7, the job attribute ID "0x016a" indicating a job size and a job data size to be a job attribute value are designated in the data unit 711 is issued to the logical channel control unit 2106.

Then, in step S308, a sheet discharge mode is set. A job packet in which the job attribute setting operation code "0x0202" is designated in the region for storing the operation code 701 shown in FIG. 7 and the job attribute ID "0x017a" indicating a sheet discharge mode and codes to be a job attribute value such as fixed sheet discharge, job separate designation, mail box sheet discharge, sort designation, stack designation are designated in the data unit 711 is issued to the logical channel control unit 2106.

Then, in step S309, the size of PDL data to be transmitted is substituted in the variable size.

Then, in step S310, the size of the variable size is checked and whether the variable size is larger than 64 Kbytes or not is determined. Since the size of a parameter that can be designated in the job packet is limited to the maximum 64 Kbytes because the size of the parameter length of the packet header is represented in 16 bits, data larger than that will be divided into a plurality of job packets and issued.

If the size of data size is determined to be larger than 64 Kbytes in step S310, the continuation flag 707 of the packet header shown in FIG. 7 is set as 1 in step S314, PDL data for 64 Kbytes are taken out from the transmission buffer 403 and a job packet in which the PDL data transmission operation code "0x0204" is designated in the region for storing the operation code 701 shown in FIG. 7 and the taken out PDL data is designated in the data unit 711 is issued to the logical channel control unit 2106 in step S315, 64 Kbytes transmitted in step S315 is subtracted from the size in step S316, and the processing returns to step S310. However, if mail box sheet discharge is set in step S308, the PDL data to be stored in the data unit 711 is made to have a data structure shown in FIG. 11 to be described later.

On the other hand, if the size of data size is determined not to be larger than 64 Kbytes (64 Kbytes or less) in step S310, the transmission of all the data is completed by one more PDL data transmission operation. In this case, the continuation flag 707 of the packet header shown in FIG. 7 is set "0" meaning that the PDL data transmission is final in step S311, all the PDL data are taken out from the transmission buffer 2103 and a job packet in which the PDL data transmission operation code "0x0204" is designated in the region for storing the operation code 701 shown in FIG. 7 and the taken out PDL data is designated in the data unit 711 is issued to the logical channel control unit 2106 in step S312. However, if mail box sheet discharge is set in step S308, the PDL data to be stored in the data unit 711 is made to have a data structure shown in FIG. 11 to be described later.

Thereafter, a job packet in which the job end operation code "0x0205" is designated in the region for storing the operation code 711 shown in FIG. 7 is issued to the logical channel control unit 2106 in step S313, and the processing is finished.

Processing concerning the mail box sheet discharge performed by the printer setting application on the host computer, for example the host computer 101A, for performing control processing of the sheet discharge port name registration screen shown in FIG. 3 will hereinafter described with reference to FIG. 10 based on the flow chart.

Figure 10:
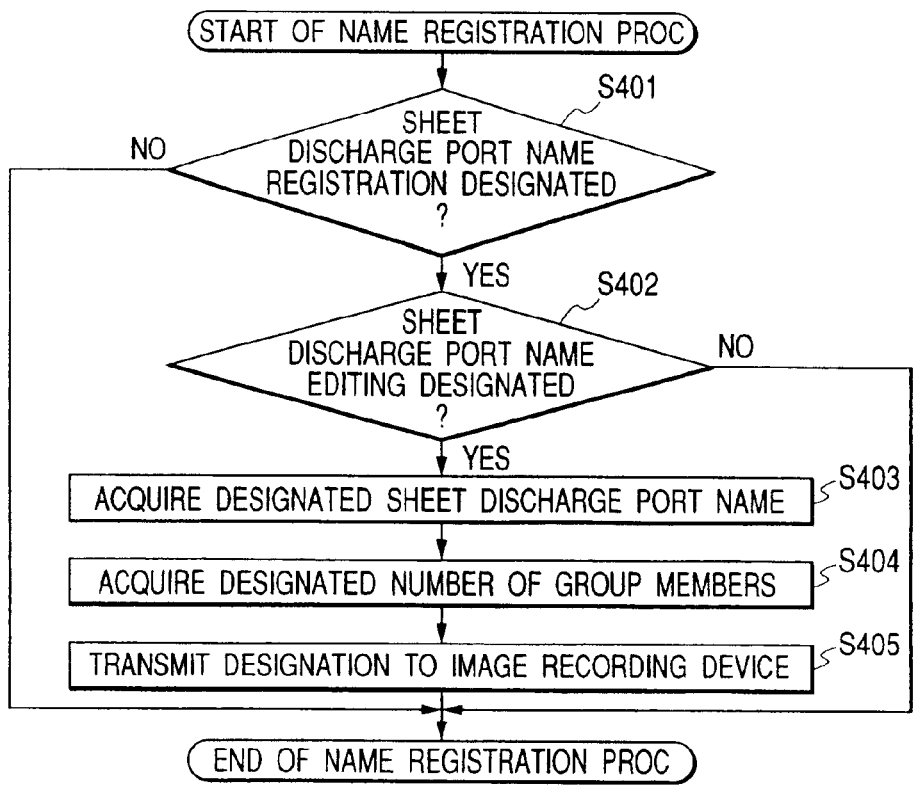
FIG. 10 is a flow chart showing second control processing procedures of an image recording system to which the data processing apparatus and the image recording apparatus of the present invention are applicable.

FIG. 10 is a flow chart showing second control processing procedures of the image recording system to which the data processing apparatus and the image recording apparatus of the present invention are applicable, and particularly corresponds to registration processing by the sheet discharge port name registration screen shown in FIG. 3 of the application unit 2101 (processing for registering a sheet discharge port name (a distribution address name) to be used at the time of mail box sheet discharge designation on the host computer). Further, S401 through S405 indicate each step.

First, whether a sheet discharge port name registration is designated or not is determined in step S401, and if the sheet discharge port name registration is determined not to be designated (if the cancel key 505 is pointed), the processing is directly finished, and if the sheet discharge port name registration is determined to be designated, that is, if a user registers an discrimination name (if the OK key 504 is pointed), whether the sheet discharge port name and the number of members belonging to the group are edited or not, that is, whether the sheet discharge port name registration area 502 or the number of group members registration area 503 is edited or not is determined in step S402, and if determined not to be edited, the processing is directly finished.

On the other hand, the sheet discharge port name and the number of members belonging to the group (the sheet discharge port name registration area 502 and the number of group members registration area 503) are determined to be edited in step S402, the sheet discharge port name designated by the user's input operation from the sheet discharge port name registration area 502 is acquired in step S403, the number of group members designated by the user's input operation from the number of group members registration area 503 is acquired in step S404, and the acquired each sheet discharge port name and each number of group members are converted to the designation to the image recording apparatus 102 and transmitted to be registered in step S405.

Thereafter, these are used as information to be added at the time of printing of the mail box mode designation, are received on the printer driver UI (the mail box sheet discharge designation screen shown in FIG. 4) as information from the image recording apparatus 102 in which the above-mentioned set names are centralized and controlled, and are displayed as the distribution address displaying area 602.

Usually, it is sufficient to perform the setting indicated in FIGS. 3 and 10 only once at the time of the printer setting, and if the implementation of the mail box mode is desired to be changed, the sorting method may be changed by a system administrator (for example, the host computer 101A) and the like timely changing the sheet discharge port name or the number of group members. In this way, users of the host computers 101A through 101D, that is, a plurality of users sharing the image recording apparatus 102 via the network can refer to information of one sheet discharge port that is centralized and controlled in the remote image recording apparatus 102 side whenever the users is in need of the information such as the time when requesting printing, can instruct a desired distribution form via the operation screen for designating mail box sheet discharge generated based on administration information including the sheet discharge port information, and can cause the image recording apparatus 102 to execute operations based on the instruction. In this way, it is no longer necessary to perform a sheet discharge port registration in the users own apparatus individually for each user as in the past by exchanging information such as the one concerning sheet discharge ports and the like between the image recording apparatus 102 and a computer remotely located with each other via the network, and various kinds of failures (for example, a failure such as discharge of a printed document to a bin of unrelated person and resulting mixture of documents without distribution to a proper bun on the image recording apparatus 102 side to a wrong setting by somebody among the plurality of users, or a failure requiring alteration of registration information each time the setting in the image recording apparatus 102 side is changed in order to make the information agreeable to the change) can be dissolved.

Figure 11:
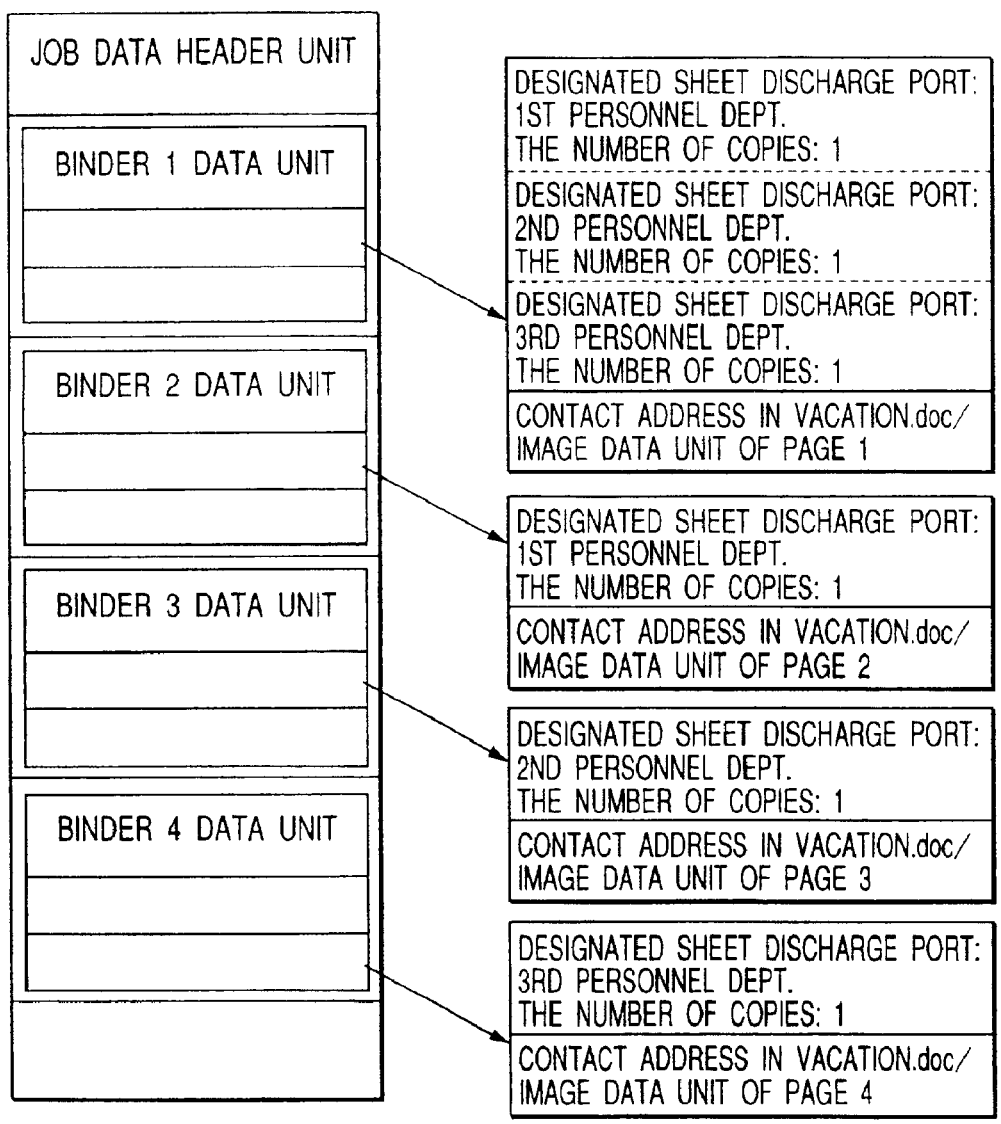
FIG. 11 is a view schematically illustrating the configuration of a data unit of the job packet in FIG. 7.

FIG. 11 shows the structure of the data unit of the job packet in FIG. 7, and illustrates the content of data in a case in which the mail box sheet discharge instruction as in the example of FIGS. 1 and 2 is designated by a user.

If the mail box sheet discharge instruction is designated, the printer driver prepares printing data for designating a plurality of sheet discharge addresses for a predetermined unit called a binder in accordance with the content of instruction from the user.

The above-mentioned binder is a concept provided to include the contents of a plurality of jobs in one job. If a plurality of users share one printer via a network, it is possible that a user's printing jobs are interposed by another user's job and another user's output sheets are mixed with the user's sheets even if the user expects that a plurality of jobs are transmitted serially. However, if each of the plurality of jobs is regarded as one binder and a plurality of binders collectively form one job, sheet discharge as designated can be realized without another user's job interposing between the binders.

In addition, for example, by changing a finishing designation and the like such as the number of printed documents, a sheet discharge address, a distribution address, a staple, a job offset for the unit of the above binder, the trouble of repeating the printing instruction several times on the host computer can be saved.

Moreover, even if a case in which a printed document is distributed to a plurality of users, since this is collectively performed as a single job, printing data need not to be transmitted to a printer many times (the number of times equal to the number of people to whom copies are distributed), and hence there is no load on the network.

In an example of FIG. 11, contents of printing data are shown as Binder 1, Binder 2, Binder 3 and Binder 4 for each page to which a user designated distribution. For example, a designation concerning page 1 of a document named "Contact Address in Vacation.doc" is described in a data unit of Binder 1, and the sheet discharge port designation equivalent to a "distribution address" is designated to discharge the number of sheets "1" in "first Personnel Department," "second Personnel Department" and "third Personnel Department," respectively (that is, one each of a printed sheet of the first page of this document is distributed to the bin 1, the bin 2 and the bin 3 respectively). In addition, image data are designated as image data of page 1 (matters that require attention) of "Contact Address in Vacation.doc" Designation concerning page 2 (contact address of First Personnel Department) of "Contact Address in Vacation-.doc" designation concerning page 3 (contact address of Second Personnel Department) of "Contact Address in Vacation.doc" and designation concerning page 4 (contact address of Third Personnel Department) of "Contact Address in Vacation.doc" are described in the same way, and as a result, the printing jobs illustrated in FIG. 2 are distributed to the sheet discharge addresses shown in FIG. 1 respectively (the printed sheet of the second page of the document is distributed to the bin 1 only, the printed sheet of the third page is distributed to the bin 2 only, and the printed sheet of the fourth page is distributed to the bin 3 only).

By preparing the above-mentioned data and designating the printing of all the mail box sheet discharge designations that are different for each page by a single job, it is possible to distribute a necessary document to a distribution address requiring the document by the necessary number of copies.

Figure 12:
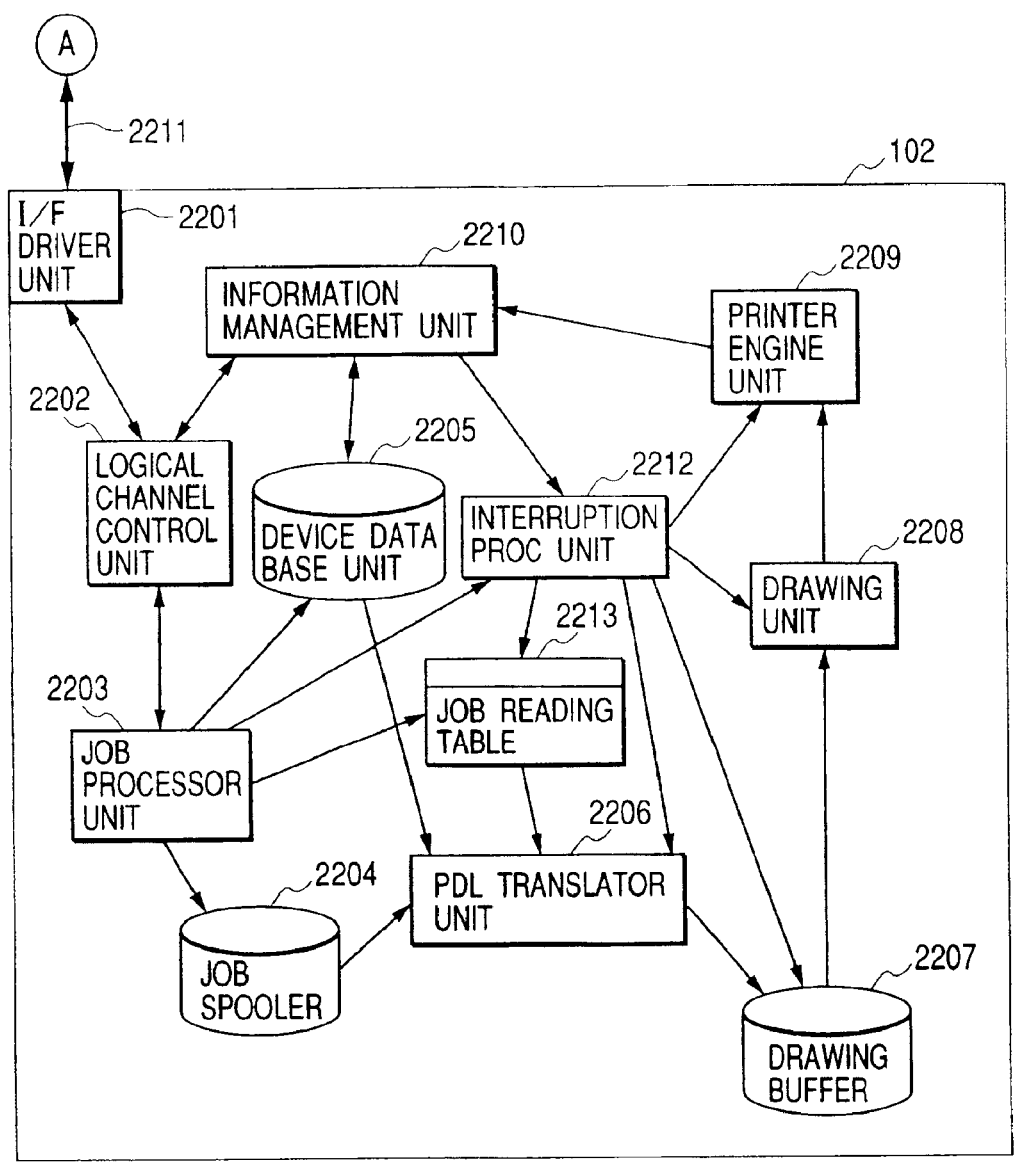
FIG. 12 is a block diagram illustrating the configuration of an image recording apparatus showing the first embodiment of the present invention.

FIG. 12 is a block diagram illustrating the configuration of the image recording apparatus showing the first embodiment of the present invention, and corresponding to the image recording apparatus 102 in the image recording system shown in FIG. 1.

In the drawing, reference numeral 2201 denotes an I/F driver unit, which converts logical data to an electric signal and exchanges the signal with the interface 2211. Reference numeral 2202 denotes a logical channel control unit, which analyses the data received from the I/F driver unit 2201, sorts the job packet and the management packet to different channels respectively, and multiplexes the transport layer in the OSI 7 hierarchy.

Reference numeral 2204 denotes a job spooler, which is composed of a large scale memory device such as a HDD, a flash memory or a DRAM, and temporarily retains PDL data of a printing job until the completion of printing. Reference numeral 2205 denotes a device data base unit, which stores attribute information of a printing job.

Reference numeral 2203 denotes a job preprocessor unit, which receives to analyze a job packet and divides it into the attribute information of the printing job that is stored in the device data base unit 2205 and the PDL data that is stored in the job spooler 2204. Reference numeral 2213 denotes a job reading table, which describes processing order of a job. Reference numeral 2207 denotes a drawing buffer, which stores intermediate data that can be drawing processed on a real time basis.

Reference numeral 2206 denotes a PDL translator unit, which takes out the job in the order that is described in the job reading table 2213, analyzes the attribute information stored in the device data base unit 2205 and the PDL data stored in the job spooler 2204, and generates the intermediate data that can be drawing processed on a real time basis to store it in the drawing buffer 2207.

Reference numeral 2209 denotes a printer engine unit which obtains the intermediate data from the drawing buffer 2207, performs rendering of the intermediate data on a real time basis together with sheet conveying processing performed by the printer engine 2209, and physically performs printing on a sheet by using a drawing unit 2208 of transmitting data as video data to the printer engine unit 2209 and a known electronic photographic technology on the basis of the video data transmitted from the drawing unit 2208.

Reference numeral 2210 denotes an information management unit, which receives the management packet transmitted from the host computer 101, acquires information from the device data base unit 2205 in accordance with a request, performs a job cancellation request and a interruption request, and detects an end of a job and an abnormality of devices to independently issue a notification event to the host computer 101.

Reference numeral 2212 denotes an interruption processing unit, which performs actual interruption processing when a job interruption designation is performed.

As shown in the drawing, the image recording apparatus 102 is composed of the I/F driver unit 2201, the logical channel control unit 2202, the job preprocessor unit 2203, the job spooler 2204, the device data base unit 2205, the PDL translator unit 2206, the drawing buffer 2207, the drawing unit 2208, the printer engine 2209, the information management unit 2210, the interruption processing unit 2212, and the job reading table 2213.

Further, each part of the above-mentioned image recording apparatus 102 may be composed of a dedicated hardware respectively, or may be composed of a CPU, a ROM or other storage media storing a program executed by the CPU, a RAM, an EEPROM, a hard disc and the like.

Control operations of the job preprocessor unit 2203 shown in FIG. 12 will hereinafter be described with reference to FIG. 13.

Figure 13:
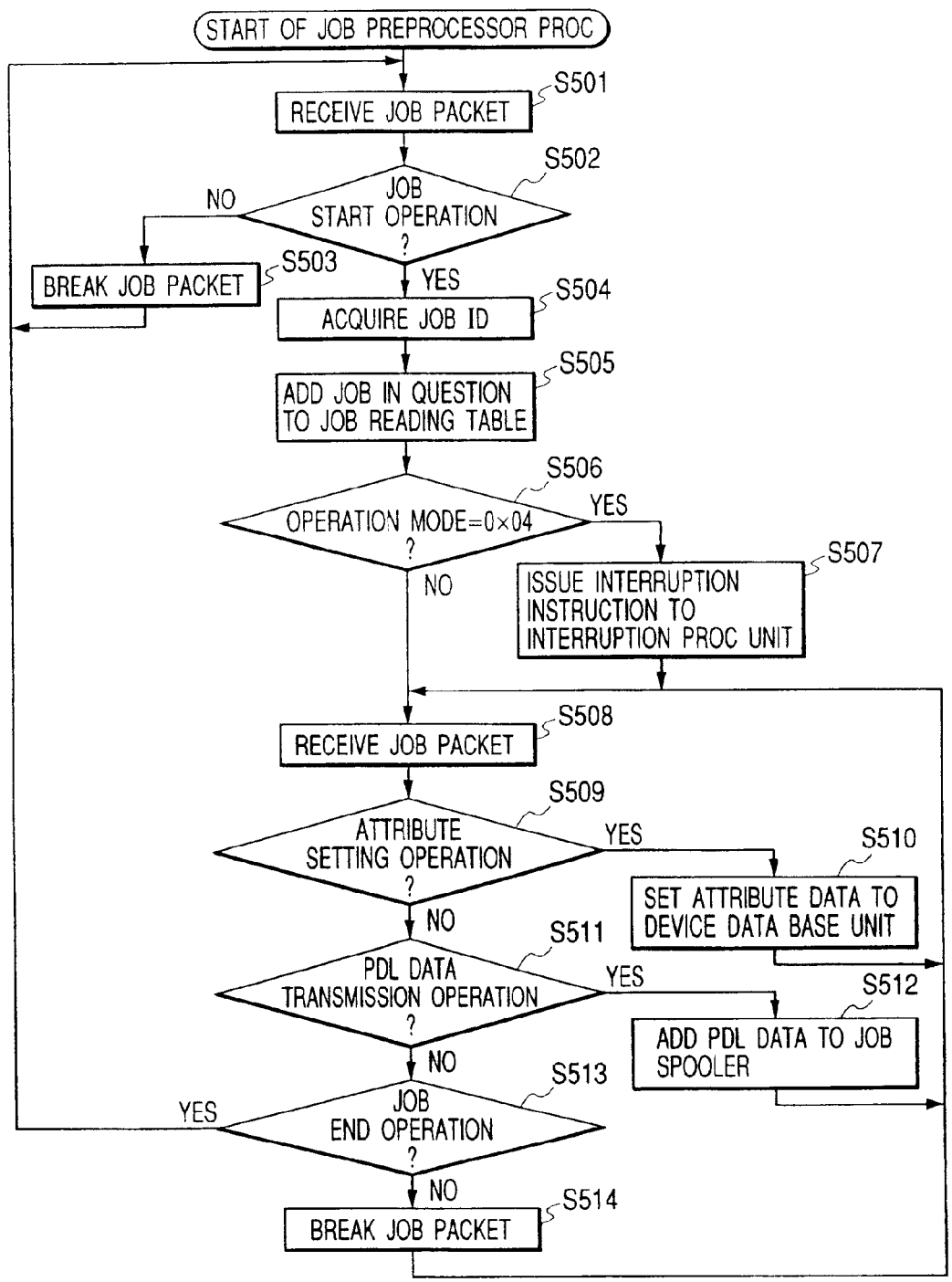
FIG. 13 is a flow chart showing third control processing procedures of an image recording system to which the data processing apparatus and the image recording apparatus of the present invention are applicable.

FIG. 13 is flow chart showing third control processing procedures of the Image recording system to which the data processing apparatus and the image recording apparatus of the present invention are applicable, and particularly corresponds to the processing procedures of the job preprocessor unit 2203. Further, S501 through S514 show each step.

The job preprocessor unit 2203 starts the processing at the time of activating the image recording apparatus 102 and thereafter continues the processing until breaking the power source of the image recording apparatus 102.

First, a job packet is received in step S501, Upon receiving, whether the received job is a job start operation or not is determined in step S502, and if it is determined that an operation other than the job start operation arrives, the reception is an incorrect operation, and the job packet is broken in step S503 and the processing returns to step S501.

On the other hand, if the job received in step S502 is determined to be the job start operation, a job ID for the job is acquired in step S504, and the job ID is assigned as a number of two bytes, and is utilized as a key for reading and writing processing of the job attribute information in the device data base unit 2205.

Then, the job ID of the job is added to the job reading table in step S505, and the added data of the job packet is retrieved and whether the operation mode is "0x04" or not is determined in step S506, and if the operation mode is determined not to be "0x04", the processing proceeds to step S508 directly.

On the other hand, if the operation mode of the added data of the job packet is determined to be "0x04" in step S506, this shows the interruption print designation as described above, in which case an instruction of interruption printing is issued to the interruption processing unit 2212 in step S507 and the processing proceeds to step S508.

Then, the next job packet is received in step S508 and whether the received job packet is an attribute setting operation or not is determined in step S509, and if the received job packet is determined to be an attribute setting operation, attribute data are set in the device data base unit 2205 in step S510. What becomes a key at this time is the job ID acquired in step S504 as well as the attribute ID and the attribute data described in the added data of the job packet.

For example, if the received job packet is an attribute setting operation for which the mail box sheet discharge is designated as a job attribute value of the sheet discharge mode, the mail box sheet discharge to be the job attribute value, distribution addresses of the number of designated distribution addresses and a code designating the number of distribution copies are obtained, and the attribute data are set in the device data base unit 2205.

When the attribute setting of step S510 is completed, the processing returns to step S508 in order to receive the next job packet.

On the other hand, if the job packet received in step S509 is determined not to be the attribute setting operation, whether the received job packet is the PDL data transmission operation or not is determined in step S511, and if the received job packet is determined to be the PDL data transmission operation, the PDL data is added to the job spooler 2204 in step S512. At this time, the job ID is given as a key and the job ID is arranged to be taken out as a key when it is taken out later. When the addition to the job spooler 2204 is completed, the processing returns to step S508 in order to receive the next job packet.

On the other hand, if the job packet received in step S511 is determined not to be the PDL data transmission operation, whether the job packet is the job end operation or not is determined in step S513, and if the job packet is determined to be the job end operation, the processing leaves the series of loop and returns to the initial state of step S501.

On the other hand, if the job packet is determined not to be the job end operation, that is, if the job packet does not correspond to either of the operations, since it is an incorrect job packet, the job packet is broken in step S514, and the processing returns to step S508.

By these operations, the job preprocessor unit 2203 can sort the data of the job packet to the device data base unit 2205 and the job spooler 2204.

The job reading table 2213 shown in FIG. 12 will be described with reference to FIGS. 14A to 14C.

FIGS. 14A to 14C are explanatory schematic illustrations representing the job reading table shown in FIG. 12.

In the drawing, FIG. 14A shows a state in which jobs 1 through 4 are registered in the job reading table 2213. In this state, when the PDL translator unit 2206 executes translation, print jobs are taken out from the top of the reading table in order, and if the job preprocessor unit 2203 adds the job 5 to the job reading table in step S505 of FIG. 13, the job 5 is added to the end of the reading table as shown in FIG. 14B.

In addition, if it is recognized that the last page of the job 1 is discharged in the printer engine unit 2209, the job 1 is deleted from the job reading table as shown in FIG. 14C.

As described above, the job reading table 2213 controls the order of jobs that the PDL translator unit 2206 processes.

Operations from the processing of the PDL translator unit 2206 onward will now be described.

The PDL translator unit 2206 performs translating processing based on the PDL data stored in the job spooler 2204 and the job information stored in the device data base unit 2205, converts them to intermediate data that the drawing unit 2208 can draw on a real time basis to transmit them to the drawing buffer 2207.

Then, the drawing buffer 2207 stores the intermediate data for a plurality of pages and gives them to the drawing unit 2208. Then, the drawing unit 2208 obtains the intermediate data from the drawing buffer 2207, performs the rendering of the intermediate data on a real time basis together with the sheet conveying processing performed by the printer engine unit 2209, and transmits the data to the printer engine unit 2209 as video data.

Then, the printer engine unit 2209 physically prints on a sheet using the known electronic photographic technology based on the video data transmitted from the drawing unit 2208.

In addition, the information management unit 2210 receives an information acquiring request from the utility unit 2105 in the form of a management packet, acquires necessary information from the device data base unit 2205, and convert the information into a management packet to respond to the host computer via the logical channel control unit 2202. In addition, the information management unit 2210 detects the end of the job and independently converts the notice of end to a management packet to notify.

Further, a operation panel 104 shown in FIG. 15 to be described later is provided in the main body of the image recording apparatus 102, and the operation panel 104 is composed of a display device such as liquid crystal or LED and an operation button, and can perform processing for reflecting the setting from a user on the device data base unit 2205 via the information management unit 2210 or for displaying the current state of the devices.

The configuration of the image recording apparatus 102 shown in FIG. 1 will now be described with reference to FIGS. 15 through 27.

Figure 15:
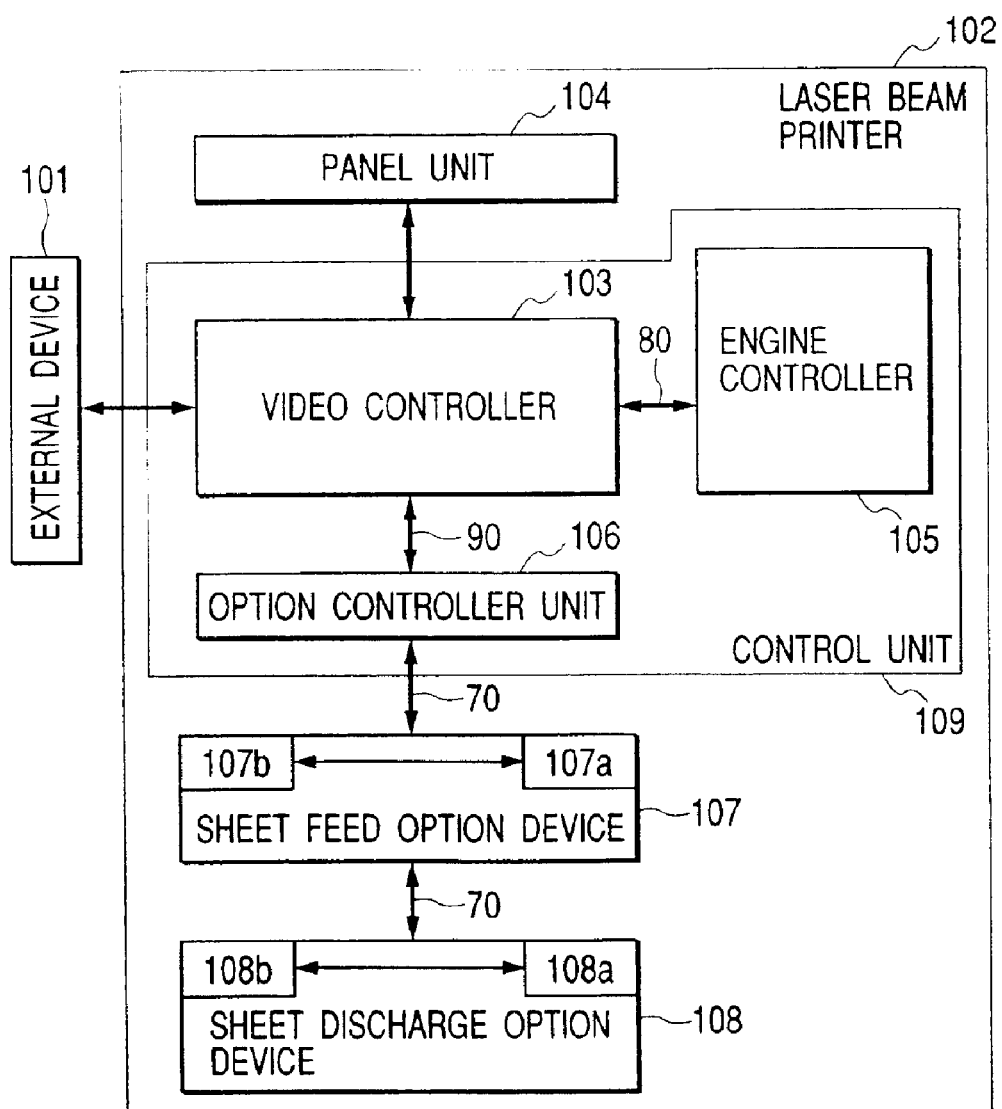
FIG. 15 is a block diagram illustrating the configuration of a laser beam printer to which the image recording apparatus shown in FIG. 1 is applicable.

FIG. 15 a block diagram illustrating the configuration of a laser beam printer to which the image recording apparatus 102 shown in FIG. 1 is applicable.

Further, it goes without saying that the image recording apparatus to which the present embodiment is applied is not limited to a laser beam printer, and may be a printer of the print method such as the LED type, the ink jet type, the thermal transfer type or the sublimation type.

In addition, although an example in which two option units are connected is described in the following description and drawings, more option units can be connected and functions of the option unit may be shared with the main body.

In the drawing, the laser beam printer (the printer) 102 can be connected to various kinds of option devices, is connected to the external device 101 such as a host computer by a universal interface (for example, a Centronics, an RS232C, a USB, etc.) and a network (for example, the Ethernet and the like), and records images based on print information (control information of code data and the like based on a predetermined printer language, for example, including the Post Script, the LIPS III, the LIPS IV, image data and the like) transferred from the external device 101 via the universal interface.

Reference numeral 103 denotes a video controller, which is connected to the external device such as the host computer 101 by the universal interface, receives code data (the ESC code, various kinds of PDL data and the like) transmitted via the universal interface from the external device 101, generates page information consisting of dot data and the like based on the code data, transmits image data (two values or multiple values) to an engine controller 105 to be described later via a video interface 80, and at the same time, transmits commands and the like for sheet feed instruction and sheet discharge instruction to an option controller unit 106 to be described later via a supervising interface 90. The engine controller 105 forms a latent image on a photosensitive drum by a well known electrophotographic process based on the image data to be transferred from the video controller 103, and prints the image on a sheet to be fed by transferring and fixing it. Further, at this time, the video controller 103 issues an instruct and the like concerning the timing for feeding and discharging a sheet to the option controller unit 106.

Reference numeral 104 denotes a panel unit, which is an interface with a user composed of a various kinds of switches (buttons) for operation, a LED display device, an LCD display device and the like, and a user can instruct the printer 102 to perform a predetermined operation by operating the panel unit 104. Further, the various kind of data and the like set by a user are stored in a non-volatile memory (not shown) such as an NVRAM and an EEPROM and managed.

The option controller unit 106 is a supervising controller provided with a CPU, a ROM, a RAM and the like (not shown) for controlling one or more option devices (units) by supervising them based on sheet feed and discharge instructions and the like transferred from the video controller 103 and sheet feed and discharge instructions from the engine controller 105. The option controller unit 106 collectively controls various kinds of option devices by communicating with an option controller unit provided in various kinds of option devices via an option unit interface 70.

In addition, in the RAM of the option controller unit 106, there is a common memory (shown in FIG. 21 to, be described later) to which the video controller 103 can access, which is composed of an approximately forty page carrying condition management area, a basic status area, a command status management area, a start-up processing area and the like. The video controller 103 gives an instruction to each option device via each area of the common memory.

Further, the carrying condition management area is composed of an area for the video controller 103 to notify each option device of a printing method (a sheet feed port, a sheet discharge port, a color, stapling, shifting, etc.) and an area for notifying the video controller 103 of each option state (how much sheet feed ended?, does sheet discharge end?, etc.)

In addition, the basic status area is an area for notifying the video controller 103 of an abnormality of each option device (jam, no sheet, no staple, etc.), the command status management area is an area for exchanging command status with the video controller 103, and the start-up processing area is an area for the video controller 103 to designate start-up processing of each option device. Further, information concerning an abnormality of each of these option devices is transmitted from the image recording apparatus 102 side to the host computer 101 either automatically at the time of occurrence of the abnormality or in accordance with status request data from the host computer 101.

Reference numeral 107 denotes a sheet feed option device (unit), for example, a sheet deck option unit, having a sheet deck controller (a large scale sheet feed cassette controller) 107*a* inside, which controls sheet feed based on control information transmitted from the option controller unit 106. Further, the above-mentioned sheet deck controller 107*a* is provided with a CPU, a ROM and a RAM (not shown), and the CPU controls the sheet feed option device 107 based on a program stored in the ROM. In addition, extension information of the sheet feed option device 107, for example, information on a sheet size that can be stored in a sheet deck, is stored in the ROM. Further, the information of these option devices is transmitted from the image recording apparatus 102 side to the host computer 101 in accordance with status request data from the host computer 101.

Reference numeral 108 denotes a sheet discharge option device (unit), for example, a sorter option unit, having the sort function, having a sorter controller (a large scale sheet discharge stacker controller) 108*a* inside, which performs a sort operation and a sheet discharge operation based on control information transmitted from the option controller unit 106. Further, the above-mentioned sorter controller 108*a* is provided with a CPU, a ROM and a RAM (not shown), and the CPU controls the sheet discharge option device 108 based on a program stored in the ROM. In addition, extension information of the sheet discharge option device 108, for example, information on the number of sheet discharge bins, presence/absence of the sort function, presence/absence of the staple function, presence/absence of the shift function for shifting a discharged sheet to a predetermined direction, presence/absence of the reversing function for reversing the orientation of a discharged sheet and the like is stored in the ROM. Further, information on these option devices is transmitted from the image recording apparatus 102 side to the host computer 101 in accordance with a status request data from the host computer 101.

Further, operation units (controllers) 107*b* and 108*b* provided with a display unit and various kinds of keys are disposed in the sheet feed option device 107 and the sheet discharge option device 108 respectively, which enable the display of messages, operation method and the like to a user at the time of using each option, and the operation of the devices by a user.

In addition, reference numeral 109 denotes a control unit and is composed of the engine controller 105 for controlling the printing process of the printer 102, the video controller 103 for controlling the whole printer 102, analyzing data from the external device 101 such as the host computer and converting the data to image data, and the option controller unit 106 for collectively controlling the various kinds of option units.

Further, the option controller unit 106 manages each option unit by the common option unit interface 70 and communicates with the video controller 103 via the supervising interface 90. The present embodiment is characterized in that each sheet feed and discharge option unit is controlled by the video controller 103 through the option controller unit 106.

Figure 16:
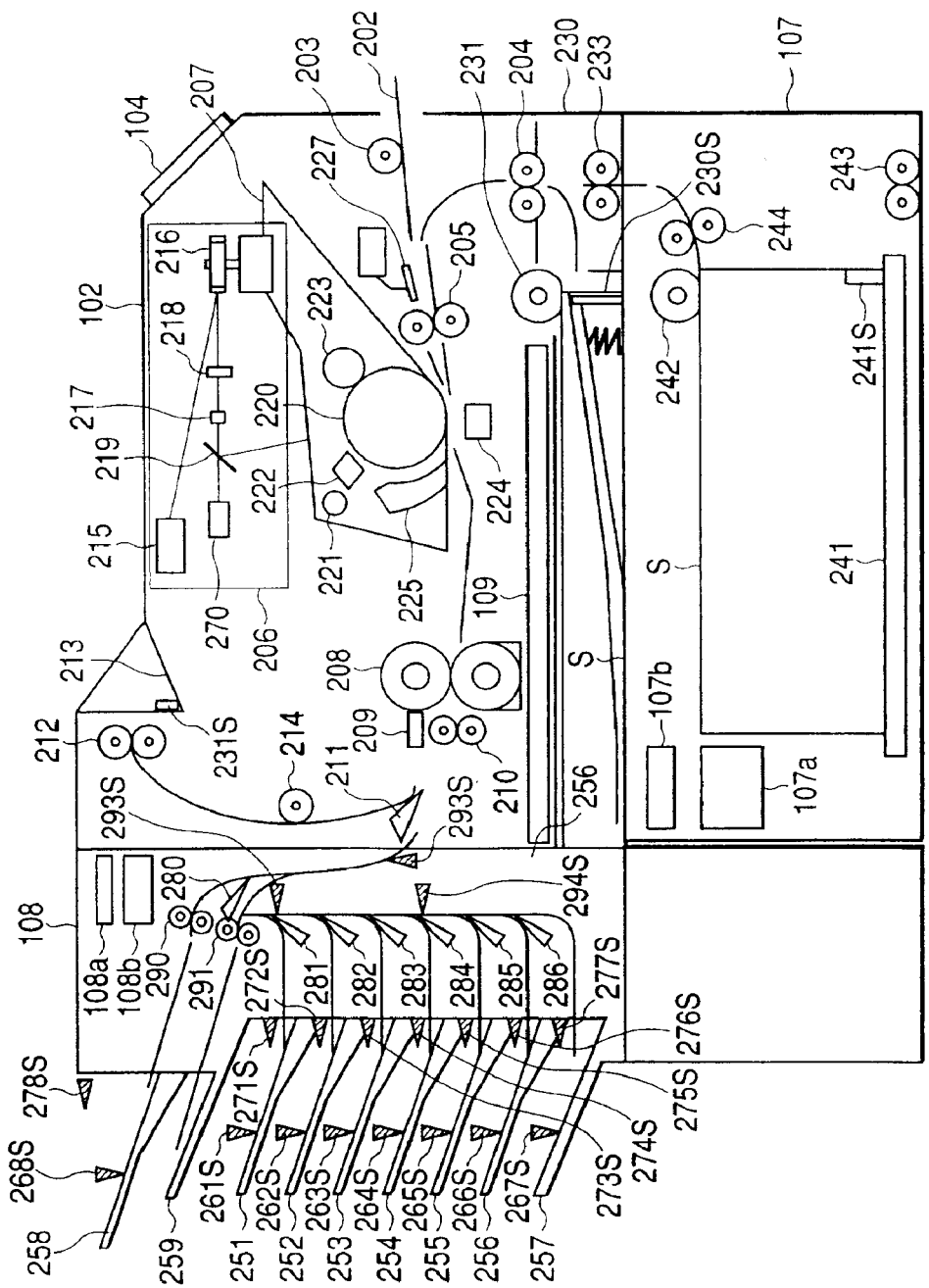
FIG. 16 is a cross sectional view illustrating the configuration of the printer shown in FIG. 15.

FIG. 16 is a cross sectional view illustrating the configuration of the printer 102 shown in FIG. 15, and the same parts are given the same symbols.

In the drawing, reference numeral 230 denotes a sheet cassette, which retains recording sheets S and has a mechanism for electrically detecting the size of the recording sheets S by a partition plate (not shown). Reference numeral 231 denotes a cassette sheet feed clutch, which is a cam for separating only the top one recording sheet of the recording sheets S disposed on the sheet cassette 230 and for conveying the separated recording sheet S to a sheet feed roller 204 by driving means (not shown), rotates intermittently each time a sheet is fed, and feeds one recording sheet corresponding to one rotation. Reference numeral 230S denotes a recording sheet detection sensor, which detects the volume of the recording sheets S retained in the sheet cassette 230.

Reference numeral 227 denotes a resist shutter, which stops sheet feed by pressing a sheet. The sheet feed roller 204 conveys the top end part of the recording sheet S to the resist shutter 227. Reference numeral 202 denotes a hand supply tray, which mounts the recording sheet S. Reference numeral 203 denotes a hand supply sheet feed clutch, which conveys the recording sheets S mounted on the hand supply tray 202 to the resist shutter 227. Reference numeral 233 denotes an option sheet feed roller (a sheet feed relay conveying roller), which supplies the recording sheet S fed from the sheet feed option device 107 into the printer 102 main body.

In addition, a pair of resist rollers 205 for synchronously conveying the recording sheet S are provided in the downstream of the hand supply sheet feed roller 203, the cassette sheet feed clutch 231 and the option sheet feed roller 233, and a image recording unit 207 for forming a toner image on the recording sheet S using the well known electrophotographic process by a laser beam emitted from a laser scanner unit 206 is provided in the downstream of the resist rollers.

In the laser scanner unit 206, reference numeral 215 denotes a laser unit, which emits a laser beam based on an image signal (a VDO signal) forwarded from the video controller 103. The laser beam emitted form the laser unit 215 is scanned by a polygon mirror 216 and forms a latent image on a photosensitive drum 220 via a group of imaging lenses 218 and a turnaround mirror 219. Reference numeral 217 denotes a beam detector, which detects the laser beam emitted from the laser unit 215 and outputs a main scanning synchronous signal. Reference numeral 270 denotes a light amount sensor, which detects the light amount of the laser beam emitted from the laser unit 215.

In addition, in the image recording unit 207, reference numeral 222 denotes a primary charging device, which equally charges the surface of the photosensitive drum 220. Reference numeral 223 denotes a developing device, which toner develops a latent image that is formed on the photosensitive drum 220 by being charged by the primary charging device 222 and exposed to a laser beam by the laser scanner unit 206. Reference numeral 224 denotes a transferring charging device, which transfers the toner image on the photosensitive drum 220 developed by the developing device 223 on the recording sheet S fed by the resist roller 205. Reference numeral 225 denotes a cleaner, which removes a residual toner on the photosensitive drum 220. Reference numeral 221 is a preflashing lamp, which removes optical electricity of the photosensitive drum 220.

Reference numeral 208 denotes a fixing device, which thermally fixes the toner image formed on the recording sheet S by the image recording unit 207. Reference numeral 210 denotes a conveying roller, which discharges and conveys the recording sheet S. Reference numeral 209 denotes a sheet discharge sensor, which detects the sheet discharge status of the recording sheet S. Reference numeral 211 is a flapper, which switches the conveying direction of the recording sheet S on which recording is completed to the sheet discharge tray 213 side or the sheet discharge option unit 108 side. Reference numerals 214 and 212 denote discharge rollers, which discharge the recording sheet S conveyed by the switching of the flapper 211 to a loading tray 213. Reference numeral 213S denotes a sheet discharge loading amount detection sensor, which detects the loading amount of the recording sheets S loaded on the loading tray 213.

In addition, the engine controller 105 in the control unit 109 performs the control of the electrophotographic process by the laser scanner unit 206, the image recording unit 207 and the fixing device 208, and the conveying control of a recording sheet in the printer 102 main body.

Moreover, the video controller 103 is connected to the external device 101 such as a personal computer via a universal interface (for example, a Centronics, an RS232C, etc.), develops image information transmitted via the universal interface into bit data, and transmits the bit data to the engine controller 105 via the video interface 80 as a VDO signal.

Various kinds of option units detachably connected to the printer 102 main body will now be described.

The option controller unit 106 shown in FIG. 15 is provided in the printer main body shown in FIG. 16, and is configured such that it can communicate with various kinds of option units with the same protocol via the option unit interface 70 being a common path. In addition, the option controller unit 106 is connected to the video controller 103 via the supervising interface 90.

In the sheet feed option device 107 such as a paper deck option unit, reference numeral 241 denotes a paper deck, which loads a large capacity of recording sheets S on a vertically moving deck. Reference numeral 242 denotes a paper deck sheet feed roller, which feeds the recording sheets S loaded on the paper deck 241.

Reference numeral 244 denotes a conveying roller, which conveys the recording sheet S fed from the paper deck sheet feed roller 242 to the direction of the option sheet feed roller 233. Reference numeral 243 denotes a sheet fees relay conveying roller, which relays and conveys a recording sheet fed from another sheet feed type option unit (an option unit capable of feeding recording sheets of different size or the same size) that can be connected with plural detachably mountable to the lower part of the paper deck option unit. In addition, reference numeral 241S is a recording sheet storing amount detection sensor, which detects the loaded amount of the recording sheets S loaded on the paper deck 241.

Further, the sheet feed option device 107 such as a paper deck option unit is controlled by the paper deck controller 107a.

In the sheet discharge option device 108 such as a sorter option unit, reference numerals 251 through 257 are a first to seventh sheet discharge bins for performing face down sheet discharge, and sort recorded recording sheets S to load. In addition, reference numeral 258 denotes an eighth sheet discharge bin for passing straightly sheets conveyed from the sorter option to perform face up sheet discharge. Reference numeral 280 denotes a flapper, which switches conveyance of the recording sheet S sorted by the flapper 211 of the printer 102 main body and sent to the sorter option unit 108 so as to switch the face of a sheet based on an instruction from the video controller 103. In addition, reference numerals 2615 through 268S denotes sheet discharge empty detection sensor, which detects presence/absence of loaded sheets of the recording sheets discharged to the first sheet discharge bin 251 through the eighth sheet discharge bin 258.

Moreover, sheet discharge loaded amount detection sensor 271S through 278S detect the loaded amount of the recording sheets loaded on the first sheet discharge bin 251 through the eighth sheet discharge bin 258 (loaded amount zero (empty) to full stacking), and the sorter controller 108a notifies the video controller 103 of the full stacking via the option controller unit 106 at the time when (it is detected that) the height of the recording sheets loaded on the first sheet discharge bin 251 through the eighth sheet discharge bin 258 reaches, for example, 18 mm (equivalent to approximately 120 sheets).

In addition, the above-mentioned first sheet discharge bin 251 through the eighth sheet discharge bin 258 are capable of loading approximately 120 sheets for each bin, that is approximately 960 sheets for eight bins, among which the first sheet discharge bin 251 through the seventh sheet discharge bin 257 are capable of performing the sort sheet discharge.

If the face up is designated by the video controller 103 through the supervising interface 90, the face up flapper 280 is turned on to sort the recording sheets S, and the sorted recording sheet S is directly sent to a sheet discharge port by a roller 290. In addition, if the face down is designated by the video controller 103 through the supervising interface 90, the face up flapper 280 is turned off to sort the recording sheets S, and the sorted recording sheet S is conveyed by a roller 291 until the rear end of the recording sheet S once passes over the face up flapper 280, and then, is forwarded to a vertical path from the rear end of recording sheets by the reverse rotation of the roller 291, and the bin flappers 281 through 286 are driven in a predetermined timing by a designated sheet discharge bin to sort the recording sheets to each face down sheet discharge port to complete the sheet discharge in the face down status. If the sheet discharge bin is the seventh sheet discharge bin 257, the face down sheet discharge is completed by performing a sheet discharge without driving the bin flappers.

Moreover, if stapling using a stapler (not shown) is designated by the video controller 103 through the supervising interface 90, the recording sheets S are stocked in a staple tray (not shown), the recording sheets S are aligned, and the stapler executes the stapling to discharge the sheets to either of the first sheet discharge bin 251 through the eighth sheet discharge bin 258. In addition, if shifting is designated by the video controller 103 through the supervising interface 90, in the same manner as stapling the sheets are stocked in the staple tray (not shown), the recording sheets S are aligned and shifted as they are in the tray, that is, a loading area (a tray) of the recording sheet S to be discharged is shifted, to be discharged to either the first sheet discharge bin 251 through the eighth sheet discharge bin 258. In addition, a staple residual amount detection sensor is provided, which detects the residual amount of staples stored in the stapler.

Further, the sorter option unit 108 is controlled by the sorter controller 108a.

In addition, the option controller unit 106, the paper deck controller 107a and the sorter controller 108a are mutually connected by connectors and performs serial communication with the option unit interface 70. These are mutually connected in series by the same connector, therefore, the paper deck option unit 107 and the sorter option unit 108 can be connected with the connection order exchanged.

Further, the pair of resist rollers 205, the sheet feed roller 204 and the conveying roller 244 for conveying the recording sheets S are respectively provided in the downstream of the hand supply sheet feed roller 203, the cassette sheet feed clutch 231 and the paper deck sheet feed roller 242, and the image recording unit 207 for forming a toner image on the recording sheet S by a laser light emitted from the laser scanner unit 206 is provided in the downstream of the pair of resist rollers 205. Moreover, the fixing device 208 for thermally fixing the toner image formed on the recording sheet S is provided in the downstream of the image forming device 207, and the sheet discharge sensor 209 for detecting the conveying status of the sheet discharge unit, the conveying roller 210 for conveying a recording sheet, the flapper 211 for switching the conveying direction of the recording sheet S on which the recording is completed and the like are provided in the downstream of the fixing device 208.

Figure 17:
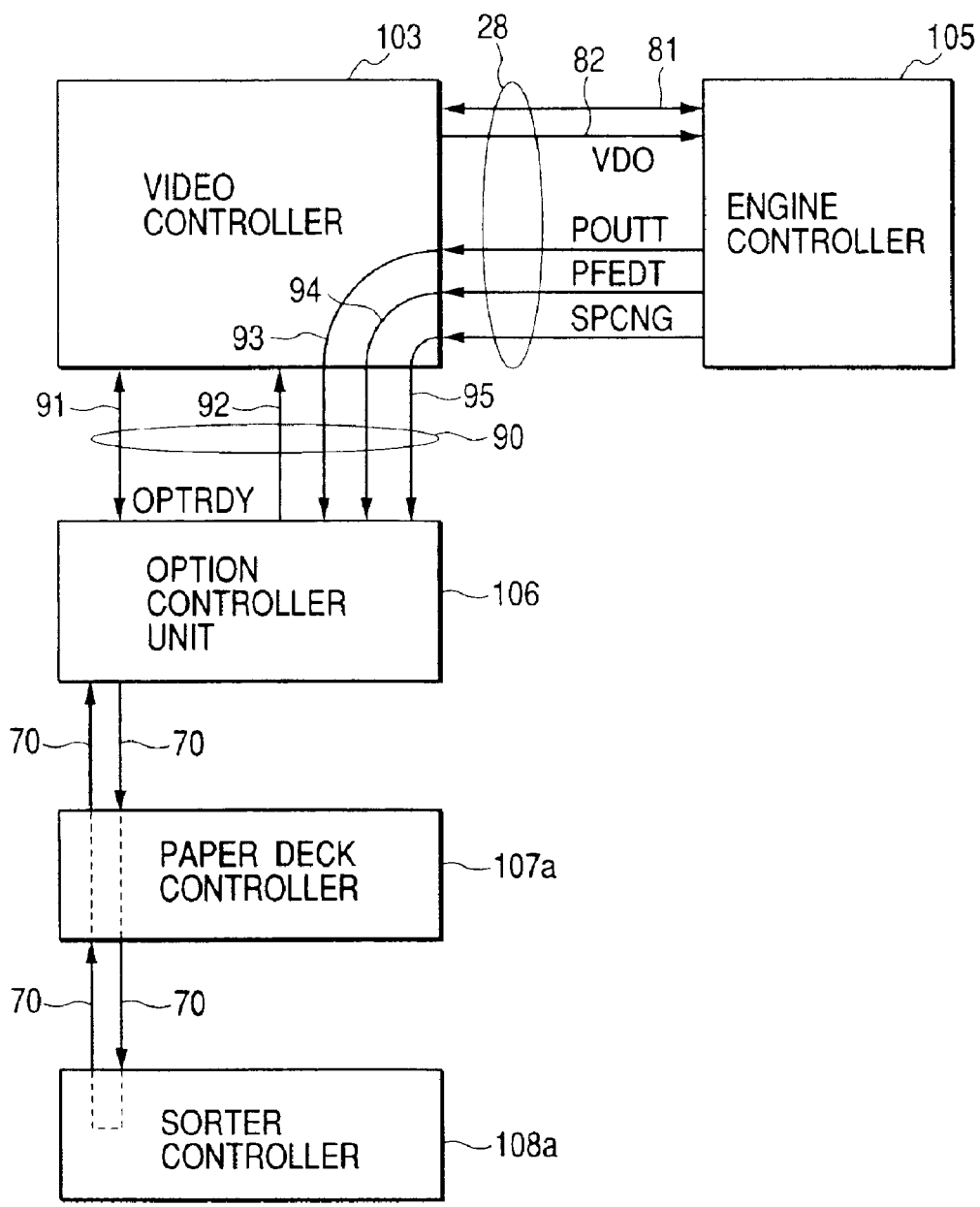
FIG. 17 is a block diagram illustrating the configuration of the printer shown in FIG. 15.

FIG. 17 is a block diagram illustrating the configuration of the printer 102 shown in FIG. 15, and the same parts as those in FIG. 15 are given the same symbols.

In the drawing, reference numeral 91 denotes a serial communication interface. Through this interface 91, commands such as sheet feed designation to the paper deck option unit 107 and sheet discharge bin designation to the sorter option unit 108 are transmitted to the option controller unit 106 from the video controller 103, and further the presence/absence status of sheets in the paper deck option unit 107, the loading status of each sheet discharge bin of the sorter option unit 18, and the presence/absence status of staples and the like are transmitted. Incidentally, the option controller unit 106 and the video controller 103 may be directly connected by a CPU bus.

Reference numeral 92 denotes an OPTRDY signal, which functions as a signal for showing an option designated by the video controller 103, for example, whether the stapler is in condition for use or not, and is transmitted from the option controller unit 106 to the video controller 103. Reference numeral 93 is a POUTT signal, which functions as a timing signal used when the printer 102 main body discharges recording sheets. Reference numeral 94 is a PFEDT signal, which functions as a signal for showing a timing used when the printer 102 main body receives recording sheets from the option unit. Reference numeral 95 denotes a SPCNG signal, which functions as a signal to slow down recording sheets high-speed carried in the option unit to match it with carrying speed of the printer 102 main body.

Reference numeral 81 denotes a communication interface, through which commands such as sheet feed designation to the sheet feed cassette of the printer 102 main body, sheet discharge designation to the sheet discharge tray 231 of the printer 102 main body and printing are transmitted from the video controller 103 to the engine controller 105, and statuses such as the presence/absence of sheet status, sheet jam and the like in the cassette 230 of the printer 102 main body are sent from the engine controller 105 to the video controller 103. Reference numeral 82 denotes a VDO signal, which shows bit data to be transmitted from the video controller 103.

In addition to the above, although not shown, controls for each processing by the engine controller 105 are executed based on signals exchanged with the video controller 103. As such signals, there are /CPRDY, /PPRDY, /RDY, /PRNT, /VSREQ, /VSYNC, /BD, /SCLK, /CMD, /CBSY, /STS, /SBSY, /CCRT (Condition Change ReporT), details of which are shown in FIG. 18.

FIG. 18 is a view schematically illustrating signals exchanged between the video controller (VC) 103 and the engine controller (EC) 105.

Further, among the above-mentioned signals, to take a method for using the /CCRT signal as an example, processing is as shown in the following procedures 1 and procedures 2.

(Procedures 1)

The video controller 103 usually checks the /RDY signal and the /CCRT signal, and reads status information if there is any change in these signals. In the instance, if the /CCRT signal is "FALSE" and the /RDY signal is "FALSE", the video controller 103 checks the statuses of the contents such as misprinting, waiting, sleep, operator call and the like, and depending on the results, refers to the lower status corresponding to each bit and confirms the details.

(Procedures 2)

On the other hand, if the /CCRT signal is "TRUE", the video controller 103 first reads the statuses of the contents such as sheet size change, change of presence/absence of sheets in the sheet feed unit, sheet feed unit function change, warning contents change and the like, then recognizes the type of the changed status and reads the statuses in the group one after another to recognize the details. In addition, concerning the resetting procedures of the /CCRT signal, the engine controller 105 always checks the status change of the end of the sheet, that is, alteration of the sheet size, change of presence/absence of sheets, alteration of the sheet feed unit function and change of the warning state, and if there is any change, sets its upper state change status at "1" and at the same time, makes the /CCRT signal of a hard signal "TRUE". Thereafter, the engine controller 105 receives a status request command from the video controller 103, and makes the /CCRT signal "FALSE" with the fact that the state change status is read in the video controller 103.

In addition, the supervising interface 90 is composed of the serial communication interface 91 and five hard signals such as the OPTRDY signal 92, the POUTT signal 93, the PFEDT signal 94 and the SPCNG signal 95.

Further, three signals of the POUTT signal 93, the PFEDT signal 94 and the SPCNG signal 95 are outputted from the engine controller 105, and is inputted in the option controller unit 106 via the video interface 80 and through the video controller 103. Details of the above-mentioned each signal are as shown in FIG. 19.

FIG. 19 is a view schematically illustrating signals exchanged between a video controller (VC) 103, an engine controller (EC) 105 and an option controller (OC) unit 106.

FIG. 20 is a block diagram illustrating the configuration of the video controller shown in FIG. 15, and the same parts as those in FIG. 15 are given the same symbols.

In the drawing, reference numeral 401 denotes a panel interface (I/F) unit, which receives various settings and instructions of an operator from the panel unit 104 by data communication with the panel unit 104. Reference numeral 402 denotes a host interface (I/F) unit, which is an input/output unit of signals exchanged with the external device 101 such as a host computer. Reference numeral 406 denotes an engine interface (I/F) unit, which is an input/output unit of signals exchanged with the engine controller 105, and forwards data signals form an output buffer register (not shown) and at the same time performs communication control with the engine controller 105.

Reference numeral 403 denotes an image data generation unit, which generates bit map data for actual printing based on control code data sent by the external device 101. Reference numeral 405 denotes an image memory, which stores image data.

Reference numeral 409 denotes a CPU, which manages the overall control of the video controller 103. Reference numeral 404 denotes a ROM, which stores control codes of the CPU 409. Reference numeral 407 denotes a RAM, which functions as temporary storage means used by the CPU 409. Reference numeral 410 denotes an EEPROM, which is composed of a nonvolatile memory medium.

Reference numeral 408 denotes a DMA control unit, which transfers the bid map data in the image memory 405 to the engine interface unit 406 by an instruction from the CPU 409. Reference numeral 412 denotes an option interface (I/F) unit, which communicates with the option controller unit 106 in accordance with an instruction from the CPU 409. In addition, the option interface (I/F) unit transmits the POUTT signal 93, the PFEDT signal 94 and the SPCNG signal 95 through to the supervising interface 90 from the engine interface unit 406.

Reference numeral 411 denotes a system bus, which has an address bus and a data bus. The panel interface unit 401, the host interface unit 402, the image data generation unit 403, the ROM 404, the image memory 405, the engine interface unit 406, the RAM 407, the DMA control unit 408, the CPU 409, the EEPROM 410, and the option interface unit 412 are connected to the system bus 411 respectively, and can access all the function units on the system bus 411.

Further, control codes for controlling the CPU 409 are composed of an OS for performing time-sharing control for each load module called a task by a system clock (not shown), and a plurality of load modules (tasks) operating for each function.

With the above configuration, the video controller 103 controls the handling of storage media for feeding or discharging sheets to the printer 102 having a plurality of sheet feed and discharge ports that can record images in a recording medium based on printing information inputted by the external device 101.

Hereinafter, a method for the video controller 103 to collectively control each option device through the option controller unit 106 will now be described with reference to FIGS. 21 and 22.

FIG. 21 is a schematic illustration of a common memory shared with the video controller 103 secured in the RAM provided in the option controller unit 106 shown in FIG. 15.

The common memory shown in FIG. 21 consists of an conveying status management area for performing page designation and finding the conveying status of a sheet, a basic status unit for finding an abnormality state of each option, a command status unit for exchanging command statuses, and a start-up processing unit for designating option device start-up processing.

The start-up processing unit consists of a startup designating portion for performing designation from the video controller 103, and a notification portion for notifying that, as a result of performing the designation, each option has completed processing.

The video controller 103 performs start-up processing of each option unit by performing designation to the start-up processing unit. When a power source is inputted, the video controller 103 notifies the start-up designation unit of an initial designation of the common memory, a designation for obtaining configuration information of each option unit necessary in the option controller unit 106, completion of obtaining information and the like, and observes the completion notification portion to find if each processing is completed, and if all the processing is completed, the start-up processing finishes.

The conveying status managing area consists of a part where printing method such as a sheet feed port, a sheet discharge port, color/black and white, stapling position and execution is designated, and a part which teaches option state such as how much sheet feed ended, whether a print signal can be outputted or not, whether sheet discharge ends or not, The video controller 103 designates the above-mentioned printing method and executes printing while grasping the state of each option.

The above-mentioned designation can designate 40 pages as the maximum, performs designation in order for each page, regards an area for which sheet discharge is completed as an empty area and initializes the area so that it can be designated again, and uses the initialized area as a ring buffer.

The basic status unit is an area for notifying an abnormal state of each device, and the states such as no sheet, sheet size inconsistency, door open, sheet jam, breakdown, full stacking, no staple and the like are obtained from this area. Depending on the contents of the basic status, more detailed information is obtained by the command status unit.

The command status unit is an area for obtaining detailed information of each option and controlling operations of each option, designates a command in this area as necessary, and obtains information. For example, obtainable information includes the name of a device, sheet size for sheet feed implementation, a residual amount of sheets for sheet feed, a position and a type of sheet jam, an access point, a loaded amount of sheets for sheet discharge, details of breakdown and the like, which issue commands corresponding to each state and receive statuses. In addition, controls of options such as transition to the power saving mode, emergency stop at the time of sheet jam, removal of sheet discharge bins, execution of reset and the like are also performed using the command status unit.

Figure 22A:
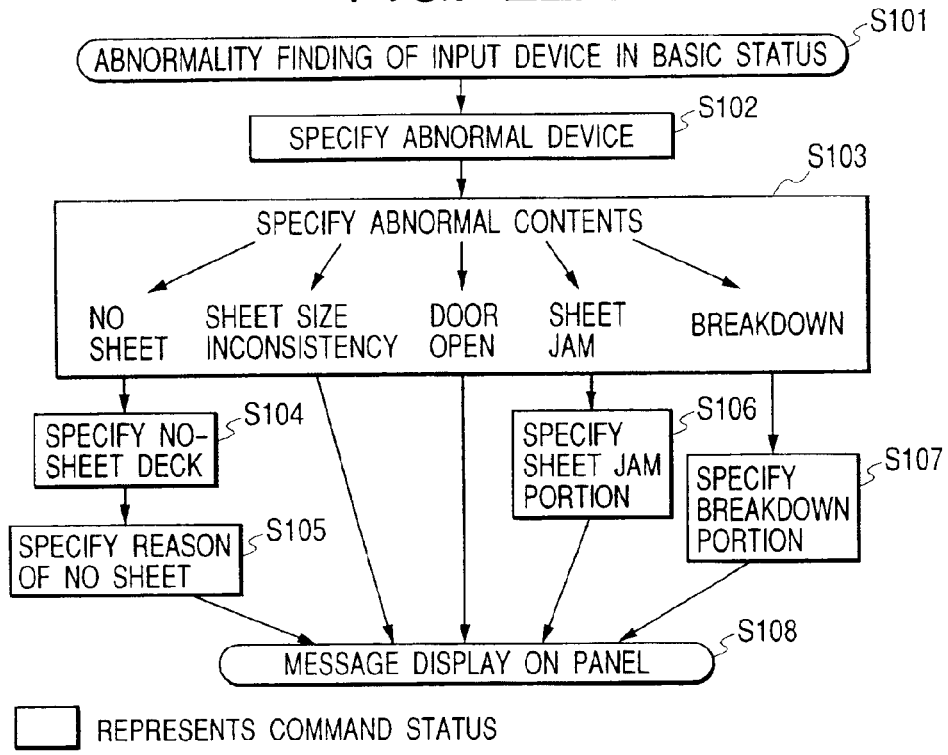
FIGS. 22A and 22B are flow charts showing fourth control processing procedures of an image recording system to which the data processing apparatus and the image recording apparatus of the present invention are applicable.
Figure 22B:
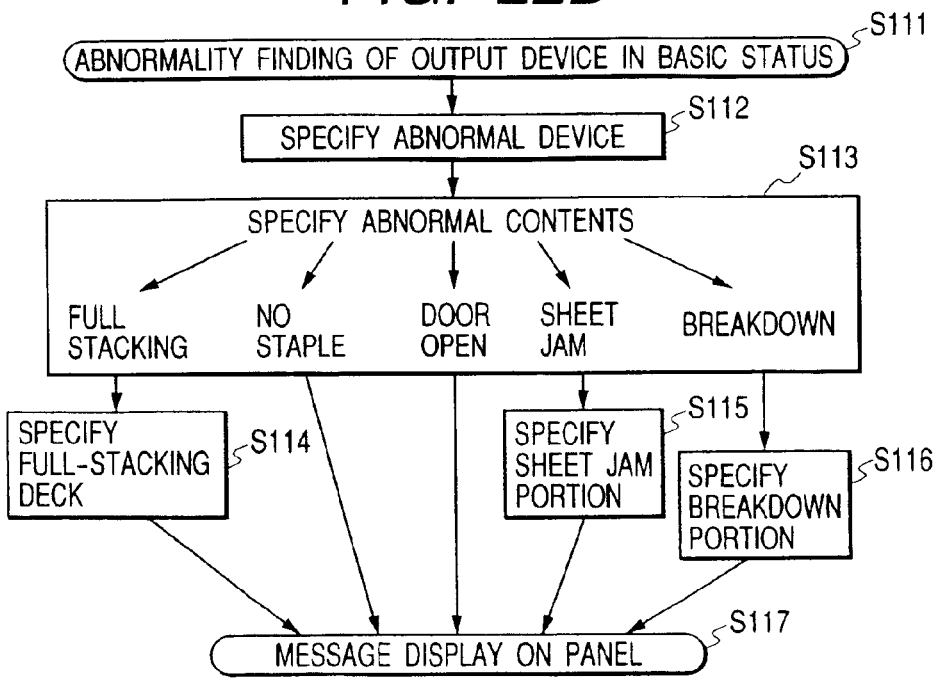

FIGS. 22A and 22B are flow charts showing fourth control processing procedures of the image recording system to which the data processing apparatus and the image recording apparatus of the present invention are applicable, which corresponds to the procedures in which the video controller 103 shown in FIG. 15 obtains detailed information of each of the input and output options by issuing a command status based on the basic status, and the CPU 409 in the video controller 103 shown in FIG. 20 executes the procedures based on a program stored in the ROM 404. Further, FIG. 22A corresponds to a case in which an abnormality of the input device is found and FIG. 22B corresponds to a case in which an abnormality of the output device is found. In addition, S101 through S108 and S111 through S117 show each step.

Upon finding an abnormality of the input device by the basic status unit of the common memory shown in FIG. 21 (S101), the video controller 103 first designates a command in the command status unit and specifies an abnormal device (if a plurality of input option devices are connected, specifies which input device is abnormal) (S102) as shown in FIG. 22A.

The video controller 103 further designates a command in the command status unit and specifies abnormal contents (no sheet, sheet size inconsistency, door open, sheet jam, breakdown, etc.) (S103).

Then, the video controller 103 designates a command corresponding to the specified abnormal contents and, for example, specifies a no-sheet deck (S104) and specifies a reason of no sheet (S105) in case of no sheet, specifies a sheet jam portion (S106) in case of sheet jam, and specifies a breakdown portion (S107) in case of breakdown.

The video controller 103 then displays a message indicating the abnormal contents obtained by the above-mentioned command on the panel unit 104, the operation unit 107b, the display unit of the external device 101 and the like.

In addition, as shown in FIG. 22B, upon finding an abnormality of the output device by the basis status unit of the common memory shown in FIG. 21 (S111), the video controller 103 designates a command in the command status unit and specifies an abnormal device (if a plurality of output option devices are connected, specifies which output device is abnormal) (S112).

The video controller 103 further designates a command in the command status unit and specifies an abnormal contents (full stacking, no staple, door open, sheet jam, breakdown and the like) (S113).

Then, the video controller 103 designates a command corresponding to the specified abnormal contents and, for example, specifies a full-stacking deck (S114) in case of full stacking and specifies a sheet jam portion (S115) in case of sheet jam, and specifies a breakdown portion (S116) in case of breakdown.

The video controller 103 then displays a message indicating the abnormal contents obtained by the above-mentioned command on the panel unit 104, the operating unit 107b, the display unit of the external device 101 and the like.

In this way, the video controller 103 obtains the above-mentioned information, executes printing if there is not abnormality, issues a command status specifying the abnormal portion if the occurrence of abnormality is detected from the basic status, further specifies abnormal contents for that device, and performs collection of detailed information and control corresponding to the abnormality.

Figure 23:
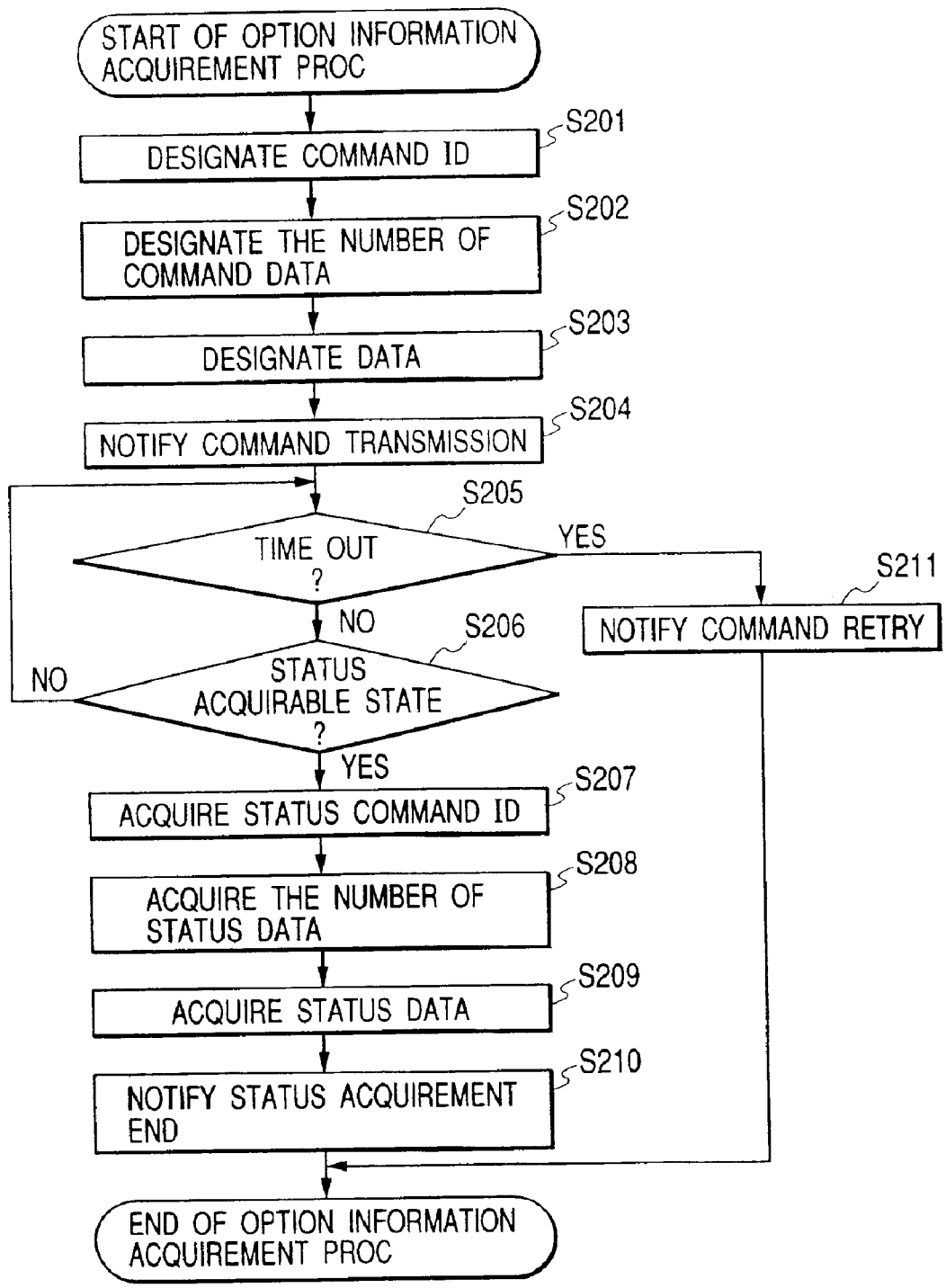
FIG. 23 is a flow chart showing fifth control processing procedures of an image recording system to which the data processing apparatus and the image recording apparatus of the present invention are applicable.

FIG. 23 is a flow chart showing fifth control processing procedures of the image recording system to which the data processing apparatus and the image recording apparatus of the present invention are applicable, which corresponds to the procedures in which the video controller 103 shown in FIG. 15 accesses the common memory of the option controller unit 106 and exchanges command statuses and information with each option, and the CPU 409 in the video controller 103 shown in FIG. 20 executes the procedures based on the program stored in the ROM 404, Further, S201 through S211 show each step.

When option information is acquired, the video controller 103 makes a designation to the command status management area in the memory held by the option controller unit 106, and receives the information. The video controller 103 designates an ID identifying the type of necessary information in a predetermined address in the command designation area (S201), designates the number of data to be designated to the option controller unit 106 in a predetermined address by the execution command (S202), and designates data representing the designated contents in a predetermined address (S203).

Then, the video controller 103 notifies that the command is sent, and triggers for the option controller unit 106 to obtain information by communicating with each option device (S204).

The option controller unit 106 performs serial communication with a necessary option device based on the trigger by step S204 and the designated contents, and obtains the designated information. On the other hand, the video controller 103 keeps the timer activated until the option controller unit 106 obtains the information completely and observes if the video controller 103 is in the status information acquirable state (S205, S206).

If the processing does not proceed to the status information acquirable state in step S206 although a fixed time has passed in step S205, since the status information cannot be acquired, the video controller 103 notifies command retry to execute command again (S211), and finishes the processing.

On the other hand, before a fixed time passes in step S205, if the processing proceeds to the status information acquirable state in step S206, the video controller 103 obtains the ID of a status, and confirms if the status information is that corresponding to the designated command (S207).

The video controller 103 then obtains the number of status data (S208), obtains status data for the number of status data (S209), notifies the option controller unit 106 that the status acquirement is completed (S210), and finishes the processing.

Data flow from the external device 101 shown in FIG. 15 to the option controller unit 106 and the engine controller 105 will now be described with reference to FIGS. 24 through 27.

Figure 24:
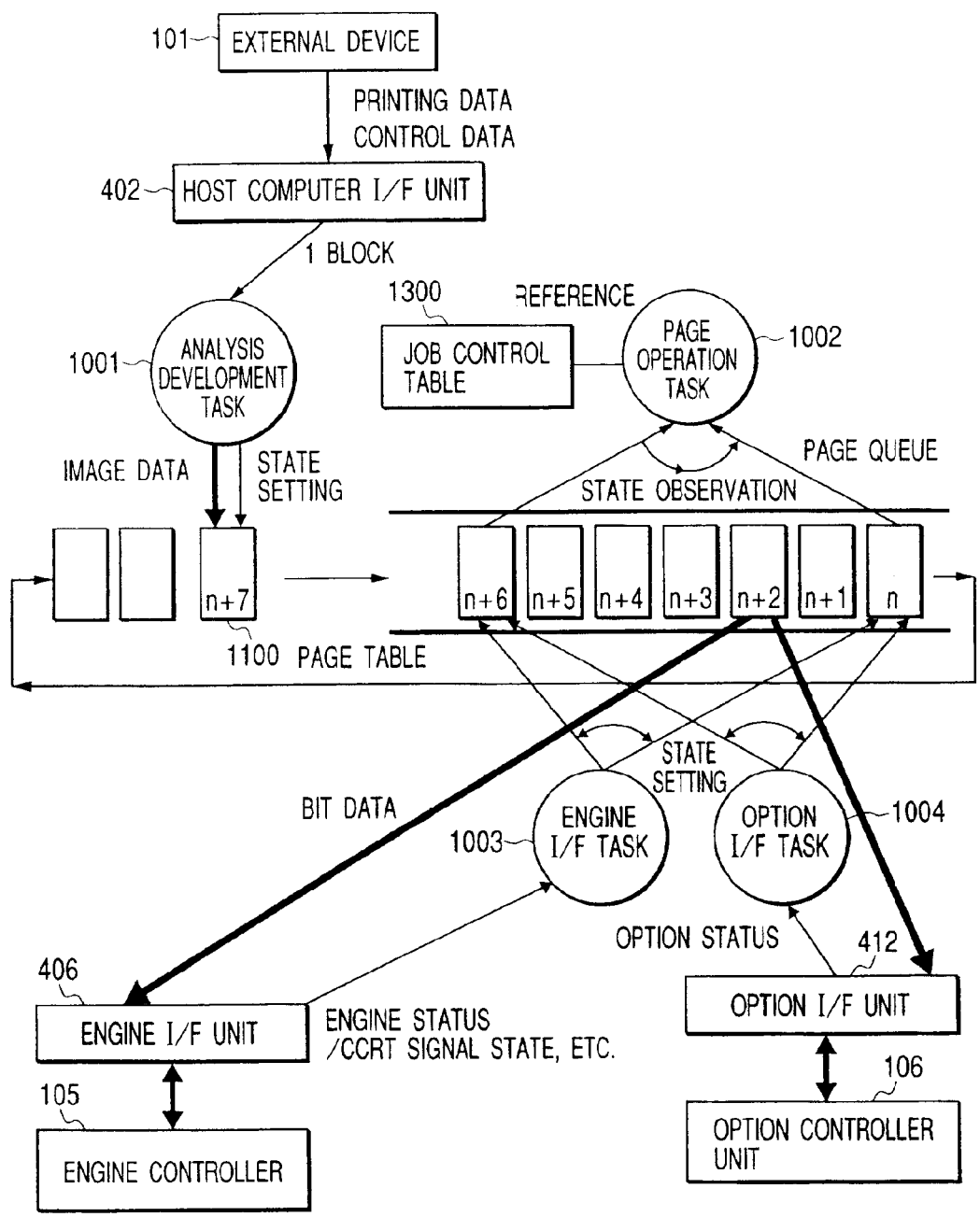
FIG. 24 is a view schematically illustrating a data flow from an external device to the option controller unit and the engine controller shown in FIG. 15.

FIG. 24 is a view schematically illustrating a data flow from the external device 101 to the option controller unit 106 and the engine controller 105 shown in FIG. 15.

Further, control codes for controlling the CPU 409 of the video controller 103 shown in FIG. 20 are composed of an OS for performing time-sharing control for each load module called a task by a system clock (not shown), and a plurality of load modules (tasks) operating for each function.

A translator processing system (an analysis development task 1001), a scheduling system (a page operation task 1002), an engine I/F system (an engine I/F task 1003) and an option I/F system (an option I/F task 1004) are tasks with the CPU 409 as an entity as described above, and operates logically in parallel.

Figure 25:
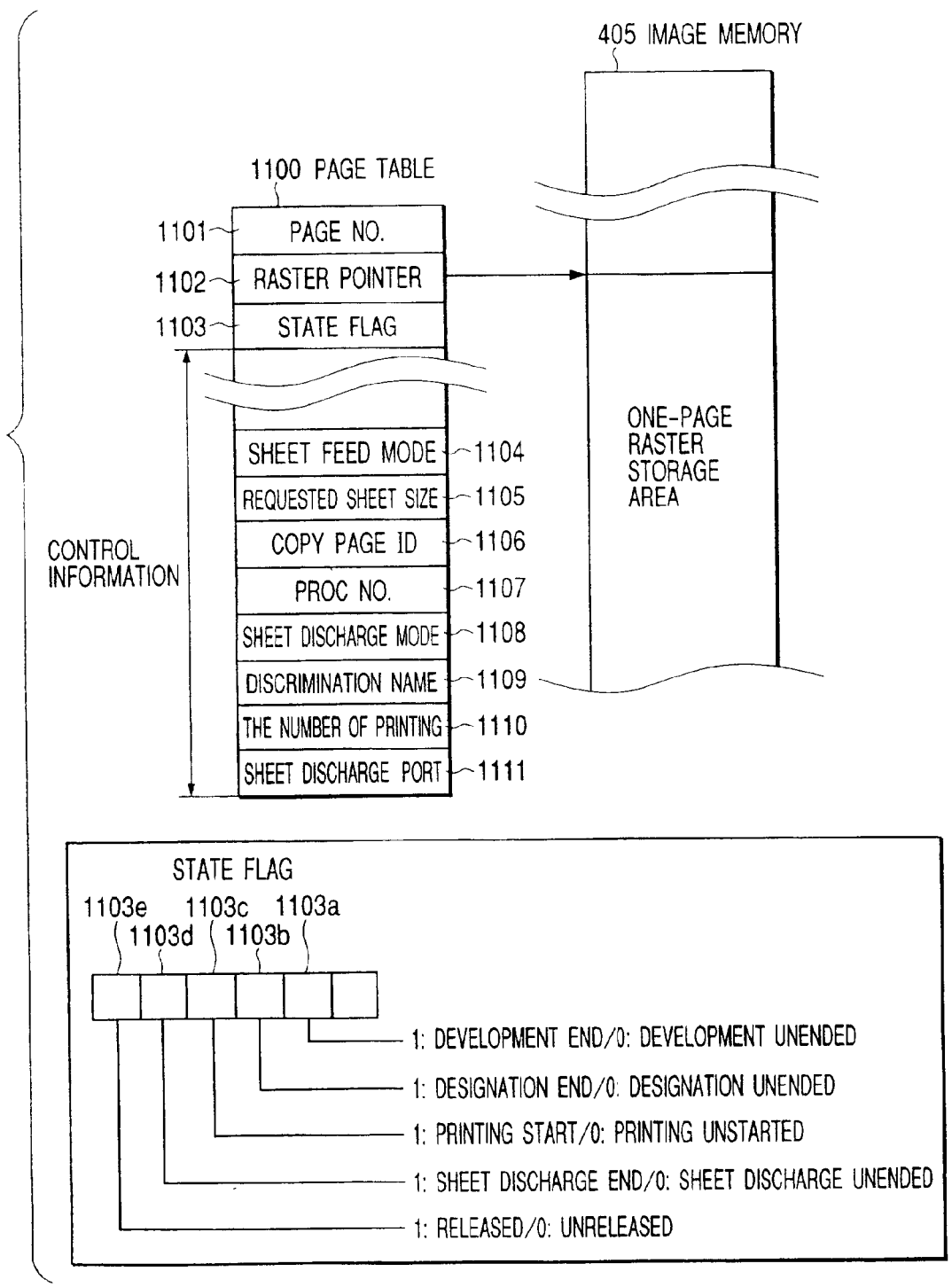
FIG. 25 is a view schematically illustrating the configuration of a page table stored in the RAM shown in FIG. 20.

FIG. 25 is a view schematically illustrating the configuration of the page table stored in the RAM 107 shown in FIG. 20. Contents to be set in the table are based on instruction data and the like included in a printing job from the host computer.

In the drawing, reference numeral 1100 denotes a page table, which stores page information. The page table 1100 is a table for logically recognizing each page in the CPU 409, and is composed of "a page number" 1101, "a raster pointer" 1102, "a state flag" 1103, . . . , "a sheet feed mode" 1104, "a requested sheet size" 1105, "a copy page ID" 1106, "a processing number" 1107, "a sheet discharge mode" 1108, "a discrimination name" 1109, "the number of printing" 1110, "a sheet discharge port" 1111 and the like, and an entity is exists in a control information storage area (not shown) of the RAM 407 shown in FIG. 20 as a continuous area and its acquisition and release are controlled by a page management function unit (not shown) or the CPU 409.

"The raster pointer" 1102 in the page table 1100 is a top pointer in a one-page area in the image memory 405 shown in FIG. 20, and the CPU 409 divides the area (not shown) in the image memory 405 for each page and links it to the raster pointer 1102 at the time of initialization upon inputting a power source.

In addition, "the state flag" 1103 is an area for storing a flag indicating the state of a page and, as shown in FIG. 25, includes "a development end flag" 1103a indicating development ended/unended of a page, "a page designation end flag" 1103b indicating designation ended/unended of a page, "a printing start flag" 1103c indicating printing started/unstarted of a page, "a sheet discharge end flag" 1103d indicating sheet discharge ended/unended of a page, "a release flag" 1103e indicating released/unreleased of a page information development area and the like, and can determine what state page information prepared by the state flag is in.

Moreover, "the sheet feed mode" 1104 is for instructing a determination method of sheet feed means, and includes "an automatic sheet feed" (not shown), "a cassette 1 (cassette 230) sheet feed," "a paper deck (cassette 107) sheet feed," "an MP tray (hand supply sheet tray 202) sheet feed" and the like, "the automatic sheet feed" is a mode in which a sheet is retrieved and determined in accordance with a predetermined priority from sheet feeding means having a consistent sheet size on which sheets are mounted.

In addition, "the requested sheet size" 1105 stores a numerical representation value of a sheet size which sheet feed is requested to the engine controller 105.

Moreover, a character-string representing a sheet discharge port name of a sheet discharge address is stored in "the discrimination name" 1109. A numerical value indicating the number of printing is stored in "the number of printing" 1110. A numerical value representing a sheet discharge port of a sheet discharge address is stored in "the sheet discharge" port 1111.

Figure 26:
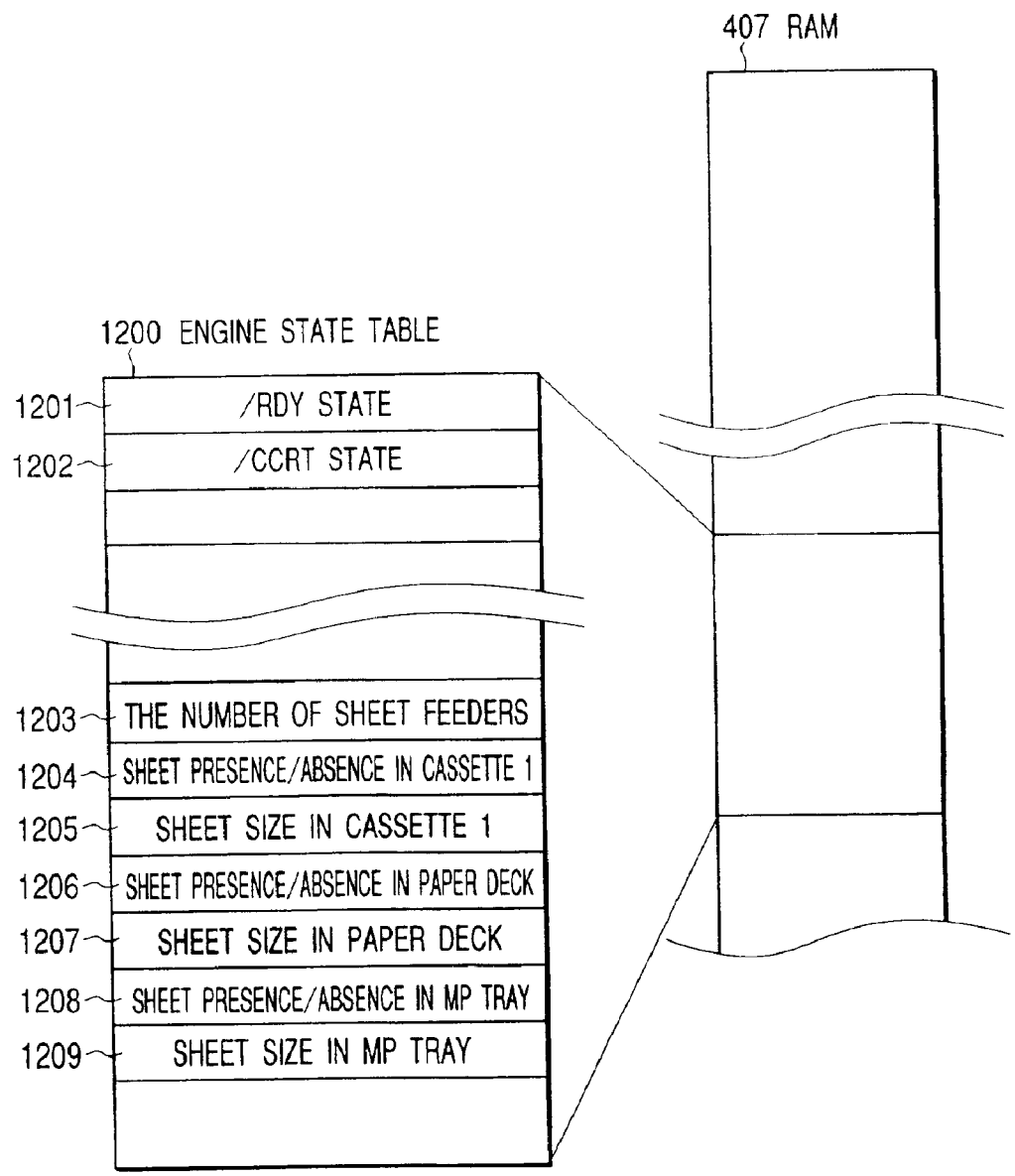
FIG. 26 is a view schematically illustrating the configuration of an engine state table stored in the RAM shown in FIG. 20.

FIG. 26 is a view schematically illustrating the configuration of the engine state table stored in the RAM 407 shown in FIG. 20.

In the drawing, reference numeral 1200 denotes an engine state table, which is a table indicating the states of the engine controller 105 and the options (106, 107, 108) held in the video controller 103, is composed of a "/RDY state" 1201, a "/CCRT state" 1202, . . . , "the number of sheet feeders" 1203, "a sheet presence/absence in cassette 1" 1204, "a sheet size in cassette 1" 1205, "a sheet presence/absence in paper deck" 1206, "a sheet size in paper deck" 1207, "a sheet presence/absence in MP tray" 1208, "a sheet size in MP tray" 1209 and the like, is not identical with the states of the actual engine controller 105 and the options (106, 107, 108) but is updated reflecting the states of the engine controller 105 and the options (106, 107, 108) by a predetermined communication in an arbitrary timing.

For example, "the /RDY state" 1201 is a flag reflecting the state of the /RDY signal shown in FIG. 18, which is made "TRUE" while the engine I/F task detects "FALSE" of the /RDY signal.

In addition, "the /CCRT state" 1202 is a flag reflecting the state of the /CCRT signal shown in FIG. 18, on which the state of the actual /CCRT signal is reflected by the engine I/F task. The /CCRT signal is made "FALSE" as previously described by the engine I/F task detecting "TRUE" of the /CCRT signal and acquiring the state of the engine controller 105 by a predetermined serial communication.

Moreover, "the number of sheet feeders" 1203 is the number of sheet feeders that can be selected reflecting the insertion of an option cassette unit and the like.

In addition, "the sheet presence/absence in cassette 1" 1204 is presence/absence of sheets in the cassette 230, Moreover, "the sheet size in cassette 1" 1205 is a sheet size set by a dial (not shown) of the cassette 230, which is recognized as the sheet size of the cassette 230 on the premise that an operator mounts sheets having a size identical with a dial value.

In addition, "the sheet presence/absence in paper deck" 1206 is presence/absence of sheets in the sheet feed option device 107. "The sheet size in paper deck" 1207 is a sheet size set by a partition plate (not shown) of the sheet feed option device 107, which is recognized as the sheet size of the sheet feed option device 107 on the premise that an operator mounts sheets having the identical size with a partition plate.

"The sheet presence/absence in MP tray" 1208 is presence/absence of sheets in the hand supply tray 202, "The sheet size in MP tray" 1209 is a sheet size detected by a sensor (not shown) of the hand supply tray 202.

Further, both of the table, the page table shown in FIG. 25 and the engine state table shown in FIG. 26 (not shown in FIG. 24), are referred to and updated from the analysis development task, the page operation task, the engine I/F task, and the option I/F task.

Figure 27:
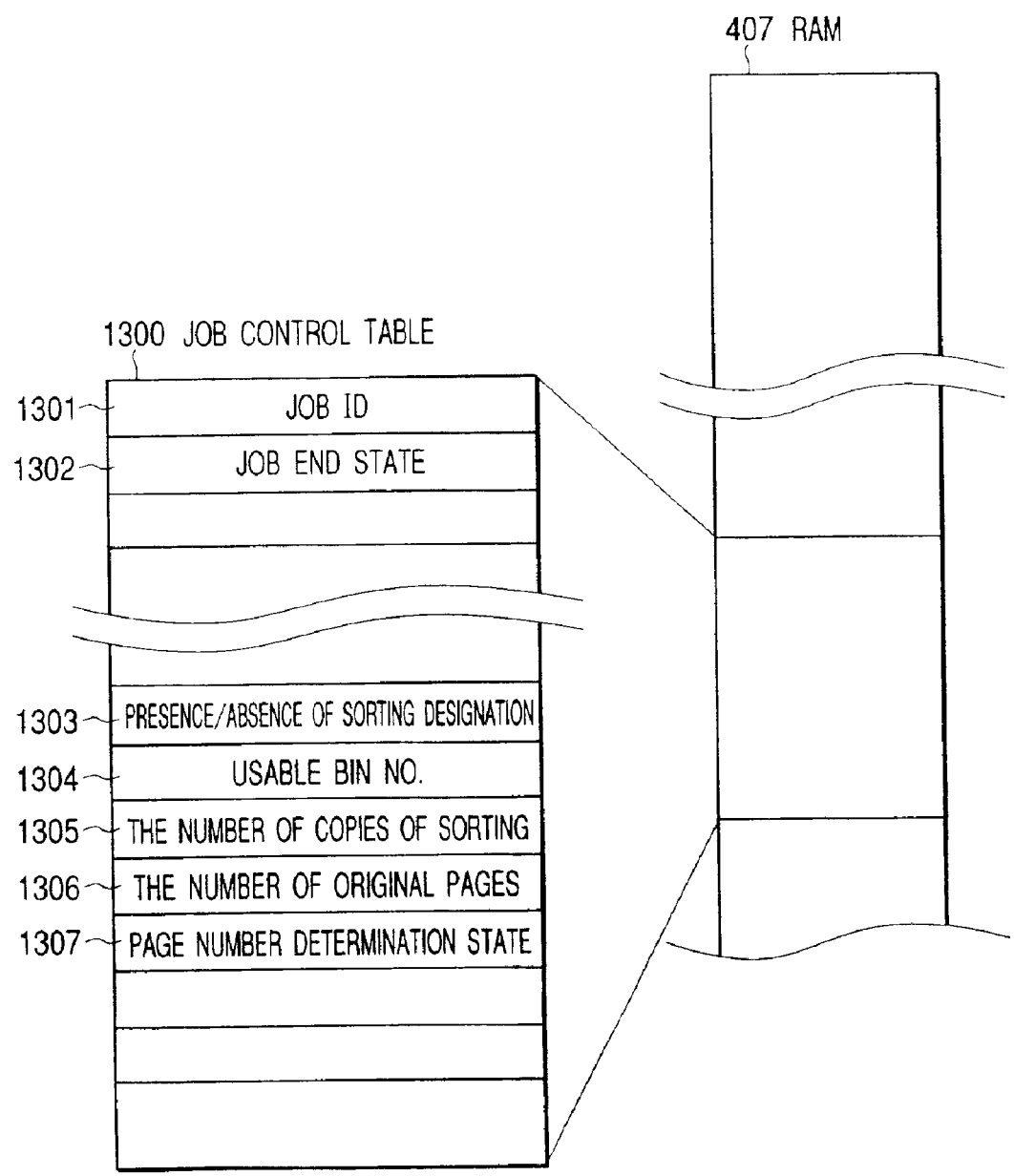
FIG. 27 is a view schematically illustrating the configuration of a job control table stored in the RAM shown in FIG. 20.

FIG. 27 is a view schematically illustrating the configuration of the job control table stored in the RAM 407 shown in FIG. 20.

In the drawing, reference numeral 1300 denotes a job control table, which is a table for controlling a job in the CPU 409. The job control table 1300 is composed of "a job ID" 1301, "a job end state" 1302, . . . , "a presence/absence of sorting designation" 1303, "a usable bin number" 1304, "the number of copies of sorting" 1305, "the number of original pages" 1306, "a page number determination state" 1307 and the like, and an entity exists in a control information storage area (not shown) of the RAM 407 shown in FIG. 17 as a continuous area and its acquisition and release are managed by the CPU 409.

A data flow of FIG. 24 will hereinafter described.

As shown in FIG. 24, printing data (control codes, PDL, etc.) inputted from the external device 101 is stored for a predetermined blocks in the host interface unit 402.

"The analysis development task" 1001 acquires the page table 1100 shown in FIG. 25 upon detecting data in the host I/F unit 402, Then, "the analysis development task" 1001 analyzes the data for the above-mentioned one block, and develops image using the image data generation unit 403 shown in FIG. 17 concerning image forming information (a figure drawing command of PDL, character codes, etc.) or by the CPU 409 itself to store the developed image in an area pointed by "the raster pointer" 1102 of the page table 1100 shown in FIG. 25.

In addition, control information for a printer (the number of copies (the number of printing), selection of sheet feed (a sheet feed mode), etc.) is stored in the page table 1100 shown in FIG. 25. After completing the analysis and the development of data for one page, "the development end flag" in "the state flag" is made "TRUE" and is enqueued the a page queue (for example, provided in the image memory 405 and the EEPROM 410) of the FIFO structure.

"The page operation task" 1002 refers to the job control table 120 shown in FIG. 27, simultaneously observes "the state flag" 1103 in all the page tables 1100 in the above-mentioned page queue, and changes the carrying procedures in accordance with the state to realize printing.

In printing, printing designation such as sheet feed means, sheet discharge means, a printing mode and the like by the option I/F unit 412 and, at the same time, the setting of sheet feed means and the like is actually performed to the engine controller 105 by the engine I/F unit 406. The page table 1100 in which "the sheet discharge end flag" 1103c is made TRUE is dequeued from the page queue and returned to the page management function unit (not shown).

"The engine I/F task" 1003 and "the option I/F task" 1004 communicate with the engine controller 105 and the option controller unit 106 via the engine I/F unit 406 and the option I/F unit 412 respectively in a predetermined cycle and, when a factor due to which the state of a page changes occurs, update the above-mentioned "state flag" 1003.

In addition, "the engine I/F task" 1003 and "the option I/F task" 1004 observe a change of the /RDY signal, and set the printer status as an error occurring with respect to the change of "TRUE" to "FALSE" and, at the same time, observe the release of the error. Moreover, "the engine I/F task" 1003 and "the option I/F task" 1004 observe the change of state such as the /RDY signal and the /CCRT signal, executes the above-mentioned (procedures 1) and (procedures 2), and updates "the engine state table" 1200 shown in FIG. 26.

An operation mode designation (the number of copies, selection of sheet feed, etc.) from the panel unit 104 are first stored in the panel I/F unit 401. A printer control task (not shown) goes round and observes the panel I/F unit 401 in an appropriate interval, and when data exists, stores the data in the EEPROM 410 and, at the same time, stores it in the control information storage area (not shown) of the RAM 407 as control information. By storing the data in the EEPROM 410, the printer can be operated by the mode desired by a user even after the power source of the printer is turned off.

Processing procedures until the printing data of the image recording apparatus 102 is received and printing is completed will hereinafter described with reference to FIG. 28.

Figure 28:
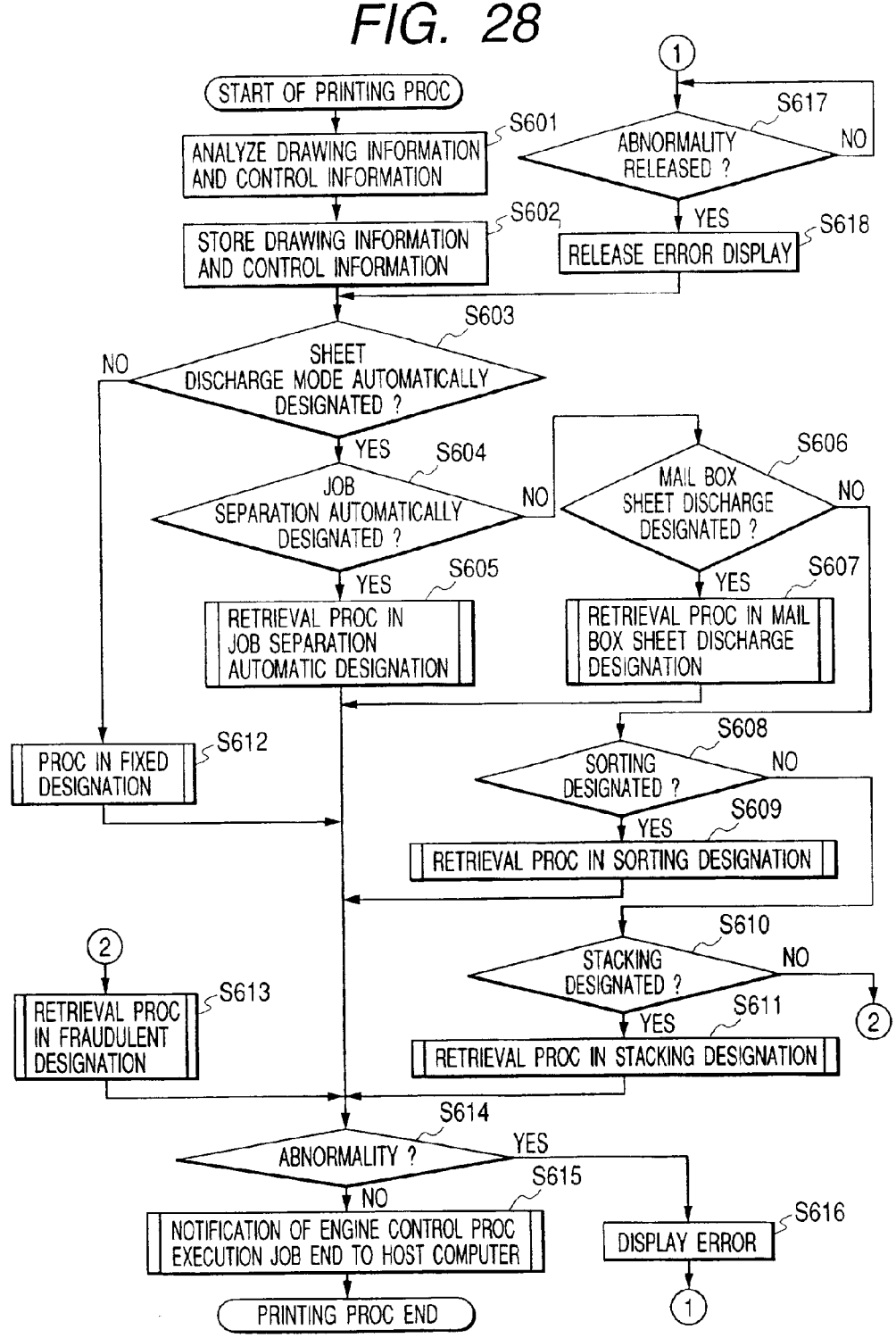
FIG. 28 is a flow chart showing sixth control processing procedures of an image recording system to which the data processing apparatus and the image recording apparatus of the present invention are applicable.

Further, prior to the processing of FIG. 28, the following series of processing is conducted between the host computer and the image recording apparatus 102. Instruction data for requesting the registered management information concerning the mail box set by an administrator using the screen and the like shown in FIG. 3 is outputted from the host computer 101 to the image recording apparatus 102. The image recording apparatus 102 having received the request data transmits the registration management information concerning the above-mentioned mail box to the host computer 101 being an output source of the data. The host computer 101 having received the management information generates and displays UIs such as in FIGS. 4 and 5 based on the above-mentioned acquired management information. When a desired setting (setting of a mail box sheet discharge designation) including a designation of a distribution address and the like is made by a user via the above-mentioned UIs, the setting is transmitted to the image recording apparatus 102 as a printing job together with image data to be recorded as an instruction from the user. The series of processing is executed prior to the processing procedures of FIG. 28.

FIG. 28 is a flow chart showing sixth control processing procedures of the image recording system to which the data processing apparatus and the image recording apparatus of the present invention are applicable, which correspond to the processing until the image recording apparatus 102 receives printing data from the external device 101 such as a host computer and completes printing, and the CPU 409 shown in FIG. 20 executes the procedures based on a program stored in the ROM 404 or other storage media (not shown). Further, S601 through S618 shows each step.

First, in step S601, control information (attribute information) stored in the device data base unit 2205 and the drawing information (PDL data) stored in the job spooler 2204 are analyzed by the processing transmitted from the external device 101 such as a host computer and shown in FIG. 13, and in step S602, the control information (attribute information) is stored in the memory (the RAM 407) and, at the same time, the drawing information (PDL data) is developed and stored in the memory (the RAM 407). In step S603, whether the sheet discharge mode is the automatic designation or not is determined from the control information (attribute information) stored in the memory and, if the sheet discharge mode is not the automatic designation, in step S612, a sheet discharge port fixedly designated based on the control information as processing at a fixed time is selected, and the processing proceeds to step S614.

On the other hand, if the sheet discharge mode is determined to the automatic designation from the control information in step S603, whether a job separate (that performs sheet discharge to an empty sheet discharge port for each job) is designated or not is determined in step S604 and, if it is determined that the job separate is designated, retrieval processing at the time of designating the job separate is performed and the processing proceeds to step S614.

On the other hand, if it is determined that the job separate is not designated in step S604, whether the mail box sheet discharge is designated or not is determined in step S606 and, if it is determined that the mail box sheet discharge is designated, retrieval processing (shown in FIG. 29 to be described later) at the time of designating the mail box sheet discharge is performed in step S607 and the processing proceeds to step S614.

On the other hand, if it is determined that the mail box sheet discharge is not designated in step S606, whether the sort is designated or not is determined in step S608 and, if it is determined that the sort is designated, retrieval processing at the time of designating the sort is performed and the processing proceeds to step S614.

On the other hand, if it is determined that the sort is not designated in step S608, whether the stack is designated or not is determined in step 610 and, if it is determined that the stack is designated, retrieval processing at the time of designating the stack is performed in step S611 and the processing proceeds to step S614.

On the other hand, if it is determined that the stack is not designated in step S610, retrieval processing at the time of incorrect designation is performed in step S613 and the processing proceeds to step S614.

A loading state and the like stored in the EEPROM 410 and each sensor (not shown) are checked in step S614 and, if it is determined that there is no abnormality, engine control processing (printing processing) is executed in step S615 and, when all the sheet discharges of the printing job are ended, the sheet discharge bin of the discrimination name designated by the printing job is transmitted to the host computer, the bin to which a sheet is currently discharged is notified to a user on the UI of the host computer, and the printing processing finishes. Further, in printing processing in a case in which the mail box sheet discharge is designated, printing sheet discharge processing for the determined number of printing is performed in each sheet discharge port determined by mail box sheet discharge retrieval processing shown in FIG. 29 to be described later respectively.

On the other hand, if it is determined that there is an abnormality (for example, an abnormality such as full stacking) in step S614, an error display corresponding to the contents of the abnormality is made on the panel unit 104 of the image recording apparatus 102 in step S616 and, at the same time, the contents of the abnormality and the event of an error display are notified to the host computer 101 and, after waiting for the abnormality to be released by an operation of the user, if it is determined that the abnormality is released in step S617, the error display on the panel unit 104 is released in step S618 and, at the same time, the event of the error display release is notified to the host computer 101, and the processing is repeated from the processing of step S603 to enter recovery processing.

Sheet discharge port retrieval processing procedures at the time of the mail box sheet discharge mode shown in step S607 of FIG. 28 of the image recording apparatus 102 will hereinafter be described with reference to FIG. 29.

Figure 29:
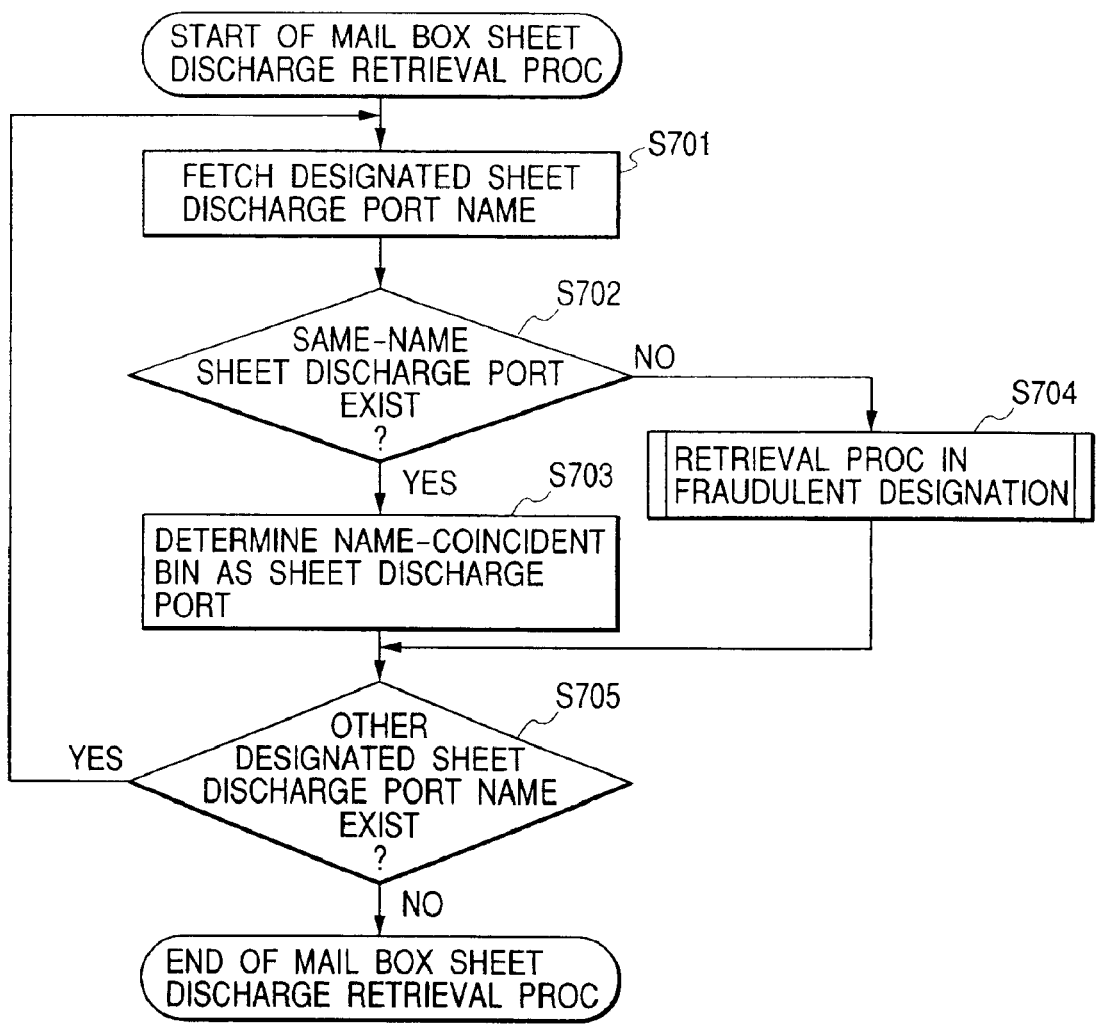
FIG. 29 is a flow chart showing seventh control processing procedures of an image recording system to which the data processing apparatus and the image recording apparatus of the present invention are applicable.

FIG. 29 is a flow chart showing seventh control processing procedures of the image recording system to which the data processing apparatus and the image recording apparatus of the present invention are applicable, which corresponds to the sheet discharge port retrieval procedures at the time of the mail box sheet discharge mode shown in step S607 of FIG. 28 and is executed for each one binder shown in FIG. 1. Further, the processing is executed by the CPU 409 shown in FIG. 20 based on the program stored in the ROM 404 or other storage media (not shown). Further, S701 through S705 show each step.

When retrieval processing of the mail box sheet discharge mode is started, one sheet discharge port name designated by printing data is first taken out from the control information (attribute information) stored in the RAM 407 in step S701 to prepare a page (acquire the table 1100 shown in FIG. 25).

In step S702, it is determined whether a same name sheet discharge port exists or not is determined by comparing the designated sheet discharge port name taken out in step S701 and the sheet discharge port name registered in each sheet discharge port (that is stored in the EEPROM 410).

If it is determined that an same name sheet discharge port exists in step S702, a sheet discharge port registered in that name is determined (designated) as a sheet discharge port of the designated printing data in step S703 with respect to the page prepared in step S701 (a character string representing the sheet discharge port name is stored in "the discrimination name" 1109 of the page table 1100 and a numerical value representing the sheet discharge port is stored in "the sheet discharge port" 1111) and, at the same time, the number of copies designated in the sheet discharge port is determined (designated) as the number of sheet discharges (stored in "the number of printing" of the page table 1100), and the processing proceeds to step S705.

On the other hand, if it is determined that no same name sheet discharge port exists in step S702, a sheet discharge port for escape is determined (designated) as a sheet discharge port of the designated printing data with respect to the page prepared in step S701 as retrieval processing at the time of incorrect designation (a character string representing the sheet discharge port name is stored in "the discrimination name" 1109 of the page table 1100 and a numerical value representing the sheet discharge port is stored in "the sheet discharge port" 1111) and, at the same time, processing for determining (designating) the number of copies designated in the sheet discharge address as the number of sheet discharges (storing in "the number of printing" 1110 in the page table 1100) and the like, and the processing proceeds to step S705.

Then, whether other designated sheet discharge port name exists in the printing data or not is determined in step S705 and, if it is determined that nothing exists, the retrieval processing of the mail box sheet discharge is finished, and if it is determined that other sheet discharge port name exists, the process returns to step S701 and repeats the processing of steps S701 through S705. That is, page for the number of designated sheet discharge port names (discrimination names) is prepared and a designation for discharging sheets of the number of designated copies to a sheet discharge port coincident with the sheet discharge port name registered in advance in the sheet discharge port is carried out.

By executing the above-mentioned mail box sheet discharge retrieval processing for each binder shown in FIG. 11, the sheet discharge processing as shown in FIG. 2 can be performed.

Information update processing procedures of each sheet discharge bin of the image recording apparatus 102 will be hereinafter described with reference to FIG. 30.

Figure 30:
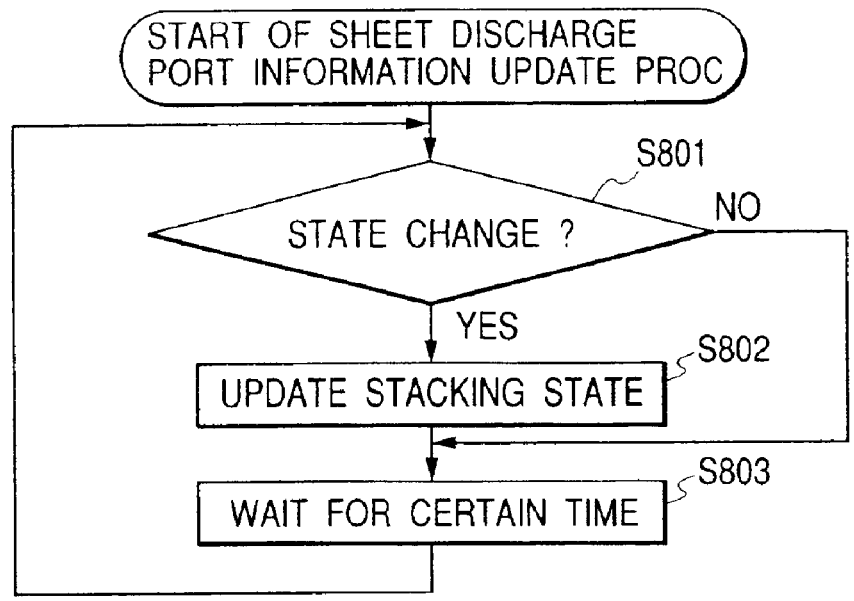
FIG. 30 is a flow chart showing eighth control processing procedures of an image recording system to which the data processing apparatus and the image recording apparatus of the present invention are applicable.

FIG. 30 is a flow chart showing eighth control processing procedures of an image recording system to which the data processing apparatus and the image recording apparatus of the present invention are applicable, which corresponds to information update processing of each sheet discharge bin, and the CPU 409 shown in FIG. 20 executes based on a program stored in the ROM 404 or other storage media (not shown). Further, S801 through S803 show each step.

The state of a sheet discharge port is updated (stored in the EEPROM 410) by obtaining status information whose state changes in a certain cycle interval (obtaining status information by accessing the common memory (FIG. 21) of the option controller unit 106 to exchange command statuses with the option).

First, in step S801, whether there is any change in the loading amount (state) of each sheet discharge port or not is determined and, if it is determined that there is a change, the loading state is updated (stored in the EEPROM 410) in step S802, and the processing proceeds to step S803.

On the other hand, if it is determined that there is no change in the loading amount (state) of each sheet discharge port in step S802, the processing proceeds to step S803 directly.

Then, in step S803, the processing waits for a certain time and returns to step S801, and repeats the processing of step S801 through S803. The state of each sheet discharge port obtained by observing as above is stored in the EEPROM 410 together with the discrimination name of each sheet discharge port and the number of group members for each sheet discharge port.

Further, the loading state updated in the above-mentioned step S802 (the loading state stored in the EEPROM 410) is checked at the times of the abnormality determination of step S614 and the abnormality release determination of step S617 of FIG. 28.

Processing procedures for updating information and display indicating a printer state on the host computer 101 will be hereinafter described with reference to FIG. 31.

Figure 31:
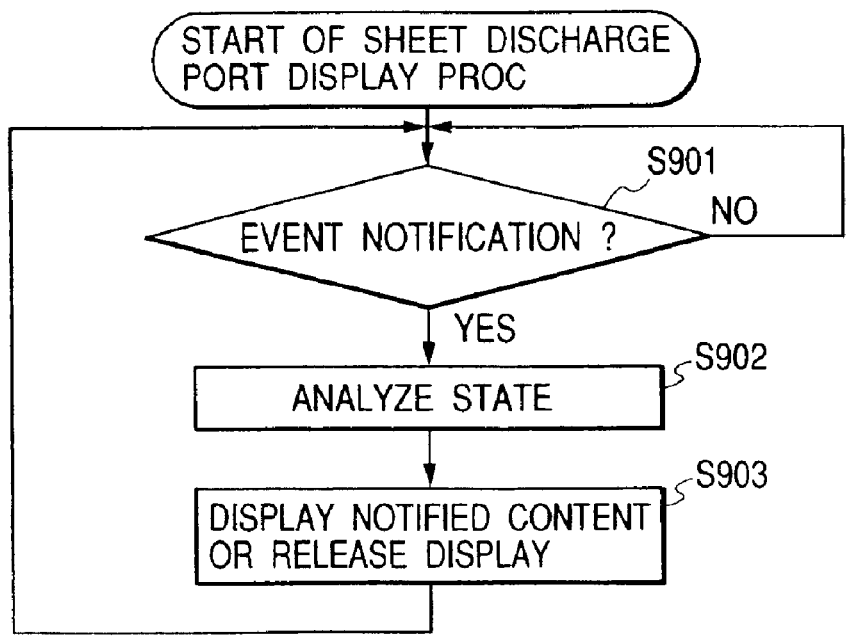
FIG. 31 is a flow chart showing ninth control processing procedures of an image recording system to which the data processing apparatus and the image recording apparatus of the present invention are applicable.

FIG. 31 is a flow chart showing ninth control processing procedures of an image recording system to which the data processing apparatus and the image recording apparatus of the present invention are applicable, which corresponds to the processing for updating information and display indicating a printer state on the host computer, and the CPU (not shown) of the host computer 101 executes based on a program stored in other storage media (not shown). Further, steps S901 through S903 show each step.

First, in step S901, the CPU waits until an event notification (a notification concerning the bin to which a sheet is discharged in step S615 of FIG. 28, a notification of an error display in step S616, a notification of an error display release, etc.) is issued and, if it is determined that the printer state is changed and an event notification is issued, the CPU receives the notified event and analyzes the contents (a notification concerning the bin to which a sheet is discharged, a notification of an error display, a notification of an error display release ,etc.) in step S902.

Then, in step S903, the CPU displays the notification contents or releases display based on the contents of the analysis results, and notifies a user of the change in the printer state.

For example, in the mail box sheet discharge mode, printing cannot be performed due to an occurrence of an operation error such as full stacking even if a sheet discharge port name coincident sheet discharge bin exists, or a sheet is discharged to the sheet discharge port for escape in some cases.

Therefore, after the printing job is finished or during the printing job, the host computer is notified whether a sheet has been normally discharged to the sheet discharge port registered with the sheet discharge port name designated to the job, and the host computer displays on the display unit such messages as "your job has been distributed to First Personnel Department" and "Second Personnel Department," "your job has not been able to be distributed to "First Personnel Department" due to full stacking or "Your job has been distributed to "escape bin" and "Second Personnel Department" to notifies the user of information such as the state of sheet discharge of the printing job.

In this way, in order to notify a user in a remote host computer 101 side whether a printed document from the host computer 101 has been distributed to an appropriate distribution address and the like as the results of the finished printing processing, the image recording apparatus 102 identifies which name bin (distribution address) the document has been distributed and notifies the host computer 101 of this accordingly in response to the completion of the distribution processing of the printed document. In addition, if distribution of a printed document cannot be distributed to a designated distribution address due so some reason, the image recording apparatus 102 identifies the reason (full stacking, etc.) and which alternative bin (an escape bin, etc.) the printed document has been discharged, and notifies the host computer 101 of this as the results of the completed printing processing.

Further, concerning the above-mentioned notification to the host computer, the image recording apparatus 102 makes a notification to the host computer of a user having inputted the printing job (a distributing user) and, at the same time, also notifies an owner of the bin that is an object of distribution of the printed document (for example, a user in a distribution address such as host computers of First Personnel Department and Second Personnel Department and the like) that the printed document has been distributed via a network.

[Second Embodiment]

Although the configuration in which a printer driver displays a UI with which a distribution address can be designated for each page of one document (contents to be displayed includes information based on registration management information of a sheet discharge bin acquired from the image recording apparatus 102 side via a network (a discrimination name, etc.)) when a user performs a printing instruction of the mail box sheet discharge designation on the host computer, and a binder is also prepared for each page at the time of preparing job data after the user completes the printing instruction, the configuration may be such that a distribution address is designated for a plurality of pages depending on a user's preference or any number of pages of any number of documents prepared by an identical or different sorts of application software instead of for one page of one document to prepare a binder forming one job. The embodiment will be hereinafter described with reference to FIGS. 32 and 33.

FIG. 32 is a view schematically illustrating an example of a mail box sheet discharge designation screen for performing a printing instruction of a mail box sheet discharge designation to a printer of the second embodiment of the present invention, which corresponds to the UI (user interface) for performing a printing instruction of the mail box sheet discharge designation by the printer driver on the host computer to enable printing in the mail box sheet discharge mode, and is displayed on the host computer 101 of FIG. 1 at the time of printing. Further, the same parts as those in FIG. 4 are given the same symbols.

In the drawing, reference numeral 3201 denotes a selected document displaying area, in which the file name of a selected document is displayed. Here, a case in which a file named "Timetable.bmp" is selected. Reference numeral 3202 denotes a reference button, and by pointing it with a pointing device (not shown) of the host computer 101, a document file stored in the storing medium such as the hard disc (not shown) and the like in the host computer can be selected to display. In this way, a desired file to be outputted can be designated out of the files stored in the own apparatus. In addition, a plurality of files can be collectively outputted as printing job data for one communication. In this case, a plurality of documents are registered in a designated order (see 2704).

Reference numeral 3203 denotes a distribution page selecting area, which can select a distribution start page and a distribution end page.

A user can designates various distribution methods (distribution forms) using the reference button 3202, a key in the area 3203 and the like. For example, if the user wishes to distribute printing data for each page to each bin of distribution object sheet discharge bins among a plurality of sheet discharge bins, a desired page number is set as the same number in a distribution start page designation column and a distribution end page designation column of the area 3203 respectively (for example, if the user wishes to distribute the second page of a file, the number "2" is set in both of the distribution start page designation column and the distribution end page designation column). In addition, if the user wishes to distribute printing data for each file to each bin of the distribution object sheet discharge bins, the number "1" in the distribution start page designation column of the area 3203 and the last page number of the file is set in the distribution end page designation column (for example, if a file consisting of three pages is distributed as the file, the number "1" is set in the distribution start page designation column and the number "3" is set in the distribution end page designation column). Moreover, in the case where printing job data for one communication including a plurality of files is transmitted to the image recording apparatus 102 and is printed, if the user wishes to distribute all the files of the plurality of files to each bin of the distribution object sheet discharge bin, for example, a desired first file is designated first, and the number "1" is set in the distribution start page designation column of the area 3203 and the last page number of the first file is set in the distribution end page designation column to register by the button 3203. Then, using the button 3203 again, a second file is designated, and the number "1" is set in the distribution start page designation column of the area 3203 and the last page number of the second file is set in the distribution end page designation column to register. By repeating such processing for the number of time of the plurality of files included in a printing job for one communication, all of the plurality of files included in the printing job data for one communication can be distributed to one storing unit.

In the example shown in the drawing, if a user can select a file to use the mail box sheet discharge and its page range, and for example a file named "Timetable.bmp" is selected as a "selected document" and the pages "1" to "2" (image data for two pages) are selected by the user as a "distribution page" among data of the plurality of pages included in the file, it is possible, as shown in a distribution address designation status 2704, to include printing jobs of documents prepared by an identical sort of application software such as "Contact Address in Vacation.doc" and "Communication Table.doc" and documents prepared by different sorts of application software such as "Communication Table.doc" and "Timetable.bmp" in one job, and one binder can be prepared for designating a plurality of distribution address for the same number of plurality of pages.

In the example of FIG. 32, the first through the fourth pages of a file named "Contact Address in Vacation.doc" are instructed to be delivered to bins that are different each other, all of the first through the third pages of a file named "Communication Table.doc" prepared by an application software identical with the one for "Contact Address in Vacation.doc" are instructed to be delivered to one bin, and all of the first and the second page of a file named "Timetable.bmp" prepared by an application software different from that for the above file are distributed to one bin. Then, in this sate, when an OK key 2706 is pressed by the user, the printer driver generates instruction data based on the contents set in the screen, and controls to transmit image data to be printed (image data of the first through the fourth pages of "Contact Address in Vacation.doc" image data of the first through the third pages of "Communication Table.doc" and image data of the first and the second pages of "Timetable.bmp", to the image recording apparatus 102 as a print job data for one communication together with the instruction data via network.

Figure 33:
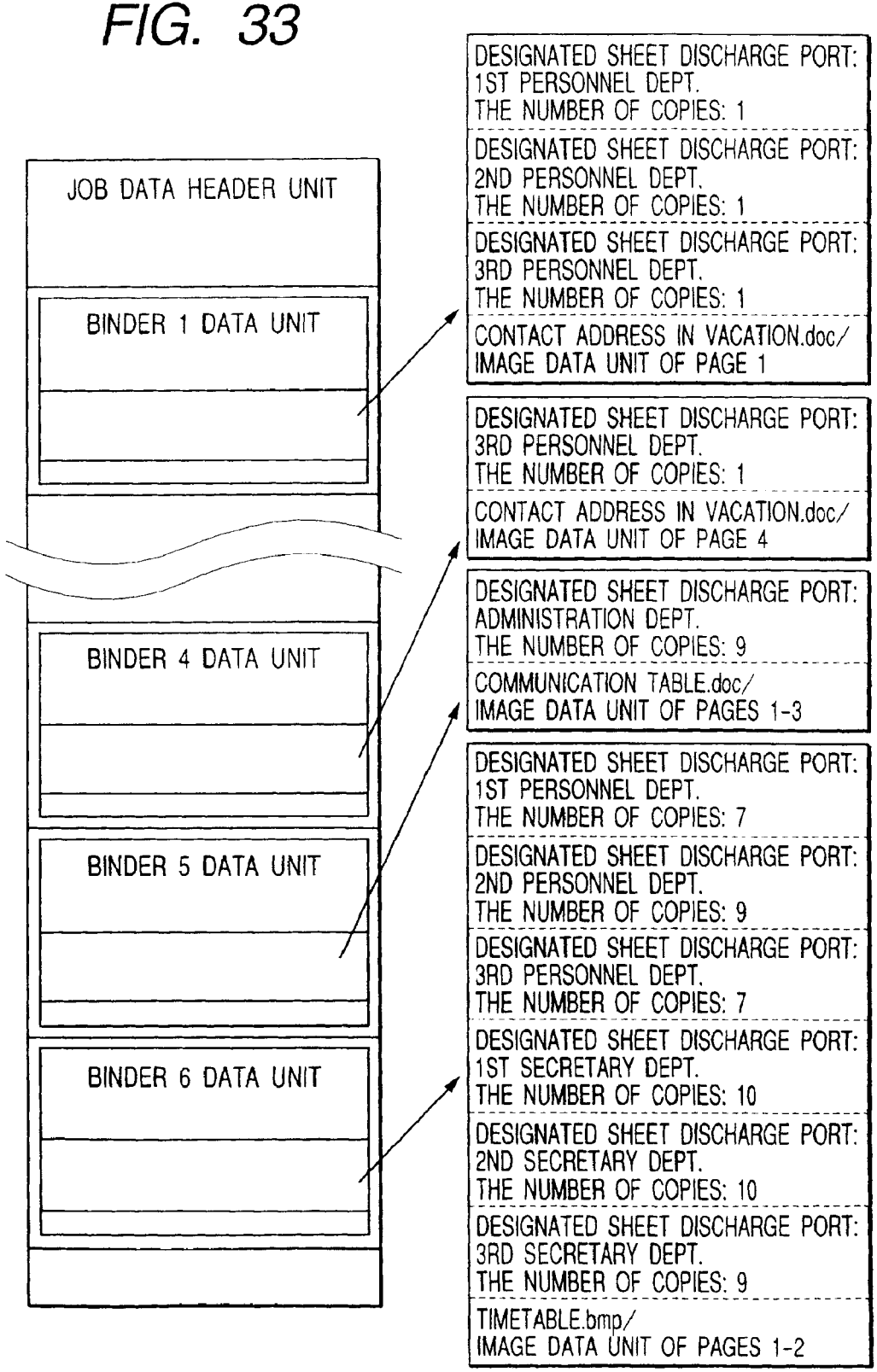
FIG. 33 is a view schematically illustrating the configuration of a data unit of the job packet in FIG. 7.
Figure 37:
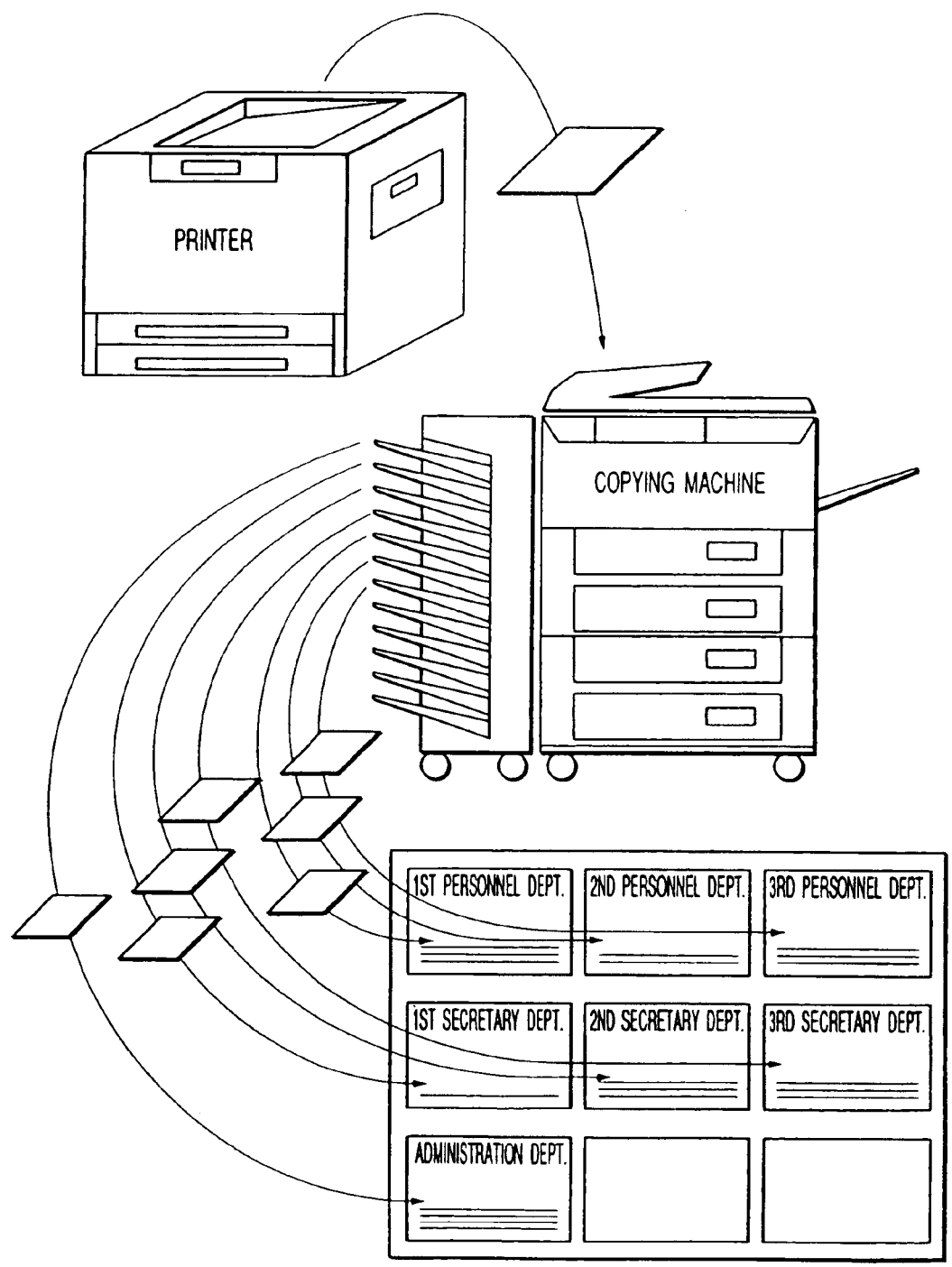
FIG. 37 is a view schematically illustrating a utilization state of a conventional printer.
Figure 38:
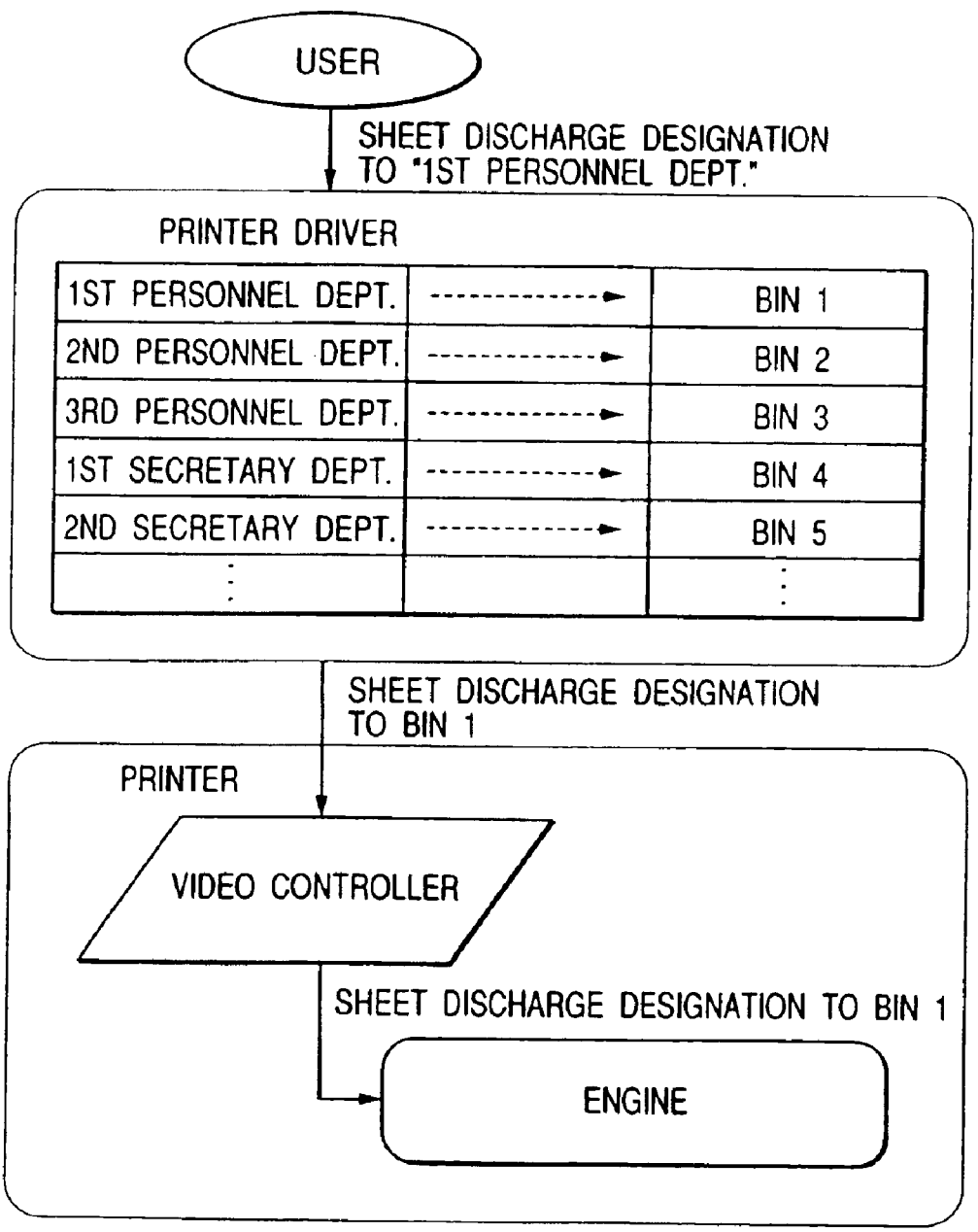
FIG. 38 is a view schematically illustrating a conversion processing of a sheet discharge distribution address of a conventional printer driver with respect to a designation of a sheet discharge distribution address by name by a user.

In addition, as shown in the drawing, job data prepared when the mail box sheet discharge designation is performed is configured as shown in FIG. 33, which is described below.

FIG. 33 is a view schematically illustrating the configuration of a data unit of the job packet in FIG. 7, and shows data contents when the mail box sheet discharge as shown in FIG. 32 is designated by a user.

As shown in the drawing, image data prepared by different sorts of application software ("Contact Address in Vacation.doc" and "Timetable.bmp") can be simultaneously designated by one job by dividing the data with a unit called binder.

In the example shown in FIG. 33, it will be understood that an instruction to distribute one each set of data in the first page of a file named "Contact Address in Vacation.doc" to each bin of "First Personnel Department," "Second Personnel Department" and "Third Personnel Department" is included in a piece of bind data, an instruction to distribute one set of data in the fourth page of "Contact Address in Vacation.doc" to the bin of "Third Personnel Department" is included in another piece of bind data, an instruction to distribute nine sets of all the data in the first through the third pages of a file named "Communication Table.doc" to the "Administration Department" bin is included in another piece of bind data, and an instruction to distribute seven sets of data in the first and the second pages of "Timetable.bmp" to the bin of "First Personnel Department," nine sets to the bin of "Second Personnel Department" seven sets to the bin of "Third Personnel Department," ten sets to the bin of "First Secretary Department," ten sets to the bin of "Second Secretary Department," and nine sets to the bin of "Third Secretary Department" is included in another piece of bind data. A plurality of pieces of bind data including these bind data are collected in one piece of job data, and are transmitted to the image recording apparatus 102 as one printing job. Further, the job data is generated based on setting information from a user via the screen shown in FIG. 32 described previously, and setting information and the like from a user via the distribution address designation screen shown in FIG. 5 and FIG. 35 to be described later. Further, information to be displayed on the distribution address designation screen includes information based on registration management information with respect to the sheet discharge bins obtained from the image recording apparatus 102 side via a network as described above.

In addition, looking at one binder, a plurality of arbitrary pages can be designated by the same number of plurality of distribution address designations, which eliminates the trouble for a user to designate the same distribution address again for each page.

[Third Embodiment]

In the above-mentioned first and the second embodiments, the configuration with which a printer setting application registers a name of a distribution address corresponding to each sheet discharge port of a printer and the number of group members sharing a sheet discharge port having the name in the printer at the time of registering the name of a sheet discharge port, and, at the time of printing, a printer driver instructs printing in the form for distributing documents in the number of group members with a name to a plurality of sheet discharge ports designated by the name, or for distributing documents in a uniform designated number to each designated sheet discharge port. However, configuration may be such that a printer setting application registers only a name to be a designation address corresponding to each sheet discharge port of a printer in the printer at the time of registering the name of a sheet discharge port and, at the time of printing, a printer driver has a user designate the number of distributed documents in each sheet discharge port designated by a name, and distributes the designated number of documents to the designated sheet discharge port. The embodiment will be hereinafter described with reference to FIGS. 34 and 35.

FIG. 34 is a view schematically illustrating an example of a sheet discharge port name registration screen to a printer of the third embodiment of the present invention, which corresponds to a UI (user interface) for registering a sheet discharge port name by a printer setting application on the host computer. Further, the same parts as those in FIG. 3 are given the same symbols.

FIG. 35 is a view schematically illustrating an example of a mail box sheet discharge designation screen for performing a printing designation of a mail box sheet discharge designation to a printer of the third embodiment of the present invention, which corresponds to a UI (user interface) for performing printing instruction of the mail box sheet discharge designation by a printer driver on the host computer in order to enable printing in the mail box sheet discharge mode, and is displayed on the display unit of the host computer 101 of FIG. 1 at the time of printing. Further, the same parts as those in FIG. 5 are given the same symbols.

In FIG. 35, reference numeral 3001 denotes the number of distribution copies input area, and by inputting numerals by a keyboard (not shown) of the host computer 101 in this input area, the inputted number of distribution copies can be respectively distributed to distribution addresses to which distribution is instructed by a distribution instruction check box 601.

Printing instruction procedures in the mail box sheet discharge mode of the present embodiment will be hereinafter described.

First, as shown in FIG. 34, the printer setting application on the host computer registers in advance a sheet discharge port name corresponding to each sheet discharge port of a printer designated by a printer setting administrator.

For example, if instructed by a user to print in the way to distribute timetables in the number of members to each department, i.e, Personnel Department and Secretary Department, the printer driver having a UI (user interface) shown in FIG. 35 prepares job data so that the number of copies designated as the number of distribution is distributed to distribution addresses for which check boxes for determining to distribute or not is checked, and transmits the data to the printer.

In the example of FIG. 35, designation is made such that seven copies of the page "1" and the page "2" of "Timetable.bmp" are distributed to "First Personnel Department," nine copies to "Second Personnel Department," seven copies to "Third Personnel Department," ten copies to "First Secretary Department," 10 copies to "Second Secretary Department" and nine copies to "Third Secretary Department," and the host computer prepares a printing job of such printing instruction.

[Fourth Embodiment]

In the above-mentioned third embodiment, the printer setting application registers only a name to be a distribution address corresponding to each sheet discharge port of the printer at the time of registering the name of a sheet discharge port, however, the printer setting application may be the one that registers a name of a distribution address corresponding to each sheet discharge port of a printer and, at the same time, also registers the number of group members sharing the sheet discharge port of that name in the printer in the same manner as in the first and the second embodiments or stores it in the host computer, so that the number of group members is utilized for display as a default value of the number of distribution copies 3001 of the UI shown in FIG. 35 used in the third embodiment at the time of printing.

[Fifth Embodiment]

Although, in the above-mentioned first embodiment, retrieval processing of a sheet discharge port in accordance with the sheet discharge mode of steps S603 through step S613 shown in FIG. 28 is performed by the analysis development task 1001 of FIG. 24, this may be configured to be performed by the page operation task 1002.

Printing processing procedures in case of the present embodiment will be hereinafter described with reference to FIGS. 28 and 29.

In the above-mentioned first embodiment, page tables 1100 are not prepared in step S602, but, in the present embodiment, page tables 1100 are prepared in advance in the number found by multiplying the number of the name of the sheet discharge port designated by a sheet discharge address by the number of copies designated by the sheet discharge address obtained from control information (attribute information) of printing data.

Here, only the attributes designated as control information (attribute information) of printing data are stored in the page tables 1100 (a character string representing a sheet discharge port name is stored in "the discrimination name" 1109 of the page tables 1100), and retrieval processing of step S603 onwards is performed for each page table prepared as described above.

Thus, retrieval processing of the mail box sheet discharge mode shown in FIG. 29 is performed in the procedures as hereinafter described.

When retrieval processing of the mail box sheet discharge mode is started, a sheet discharge port name ("a discrimination name" 1109) is first taken out from the page table 1100 in which the control information (attribute information) is stored in advance in step S701.

In step S702, whether a same name of sheet discharge port exists or not is determined by comparing the designated sheet discharge port name taken out in step S701 and the sheet discharge port name registered in each sheet discharge port (stored in the EEPROM 410).

If it is determined that a same name sheet discharge port exists in step S702, a sheet discharge port registered in the page of the page table currently referring to in its name is decided (designated) as a sheet discharge port of the designated printing data, (a numerical value representing a sheet discharge port is stored in the "sheet discharge port" 1111), and the retrieval processing of the mail box sheet discharge mode is finished.

Although determination processing on whether sheet discharge port names exist in the printing data is performed except in step S705 in the above-mentioned first embodiment, since the page tables 1100 are prepared by the number of sheet discharge port names designated in the printing data in advance to perform retrieval processing for each page table in the present embodiment, processing such as in step S705 is not necessary.

On the other hand, if it is determined that no same name of sheet discharge port exists in step S702, processing such as to decide (designate) a sheet discharge port for escape as a sheet discharge port of the designated printing data with respect to the currently referring to (to store a numerical value representing a sheet discharge port in the "sheet discharge port" 1111) is performed as retrieval processing at the time of an incorrect designation, and the retrieval processing of the mail box sheet discharge mode is finished.

Since a series of retrieval processing of step 9603 through step S613 including the retrieval processing S607 of the mail box sheet discharge mode as described above and processing thereafter prepare the number of page tables 1100 of the number calculated by multiplying the number of sheet discharge port names designated in the printing data in advance in step S602 by the number of copies designated by each sheet discharge address, the processing is repeated the number of times of the number of the page tables.

As described above, since a sheet discharge port name can be registered in the printer, and a user can perform sheet discharge port designation by a common name registered in the printer by the insertion of the host computer, it is unnecessary to perform a setting for each host computer and sorting sheet discharge operation of a printing job becomes easy.

In addition, since a user performs a printing instruction only once from the host computer and performs a single job transmission to the image recording apparatus, it is possible to output only a necessary page of the transmitted printing job to a sheet discharge bin of a user requiring the page, and a utilization form of a printer as well as a mail box for a user to forward printed documents to other users can be realized other than as a temporary storing place of printed documents outputted by a user until he/she picks them up as in the past.

Thus, in accordance with the present embodiment, an environment in which a utilization form such as a mail box can be implemented promptly as easily as possible without increasing a load applied to a network.

Configuration of a control processing program that can be read by the data processing apparatus and the image recording apparatus of the present invention will be hereinafter described with reference to a memory map shown in FIG. 36.

FIG. 36 is a view schematically illustrating a memory map of the storage medium storing various kinds of control processing programs that can be read out by the data processing apparatus and the image recording apparatus in accordance with the present invention Further, although not specifically shown, information for managing program groups stored in storage media, for example, version information, an author and the like may be stored, and information dependent on an OS and the like in the program reading side, for example, icons and the like for discriminately displaying a program may be stored.

Moreover, data dependent on various kinds of programs may be managed in a directory. In addition, if a program and data to be installed are compressed, a program depressing them and the like may be stored.

The functions shown in FIGS. 8, 9, 10, 13, 22A, 22B, 23, 28, 29, 30 and 31 in the present embodiment may be implemented by the host computer using a program to be installed from the outside. Then, in this case, the present invention is applied even in the case where information groups including programs are supplied to an output apparatus by storage media such as a CD-ROM, a flash memory, an FD and the like or from external storage media via a network.

In this way, it goes without saying that the objects of the present invention can be attained as well by supplying storage media recording program codes of software for realizing the functions of the embodiments previously mentioned to a system or an apparatus, and by the system or a computer (a CPU and an MPU) of the apparatus reading out to execute program codes stored in storage media.

In this case, a program code itself read out from the storage media realized a novel function of the present invention, and the storage media storing the program code constitutes the present invention.

As storage media for supplying program codes, for example, a floppy disc, a hard disc, an optical disc, a magneto optical disc, a CD-ROM, a CD-R, a magnetic tape, a non-volatile memory card, a ROM, an EEPROM, a silicon disc and the like may be used.

In addition, it goes without saying that the previously mentioned functions of the embodiments are realized not only by executing a program code read out by a computer, but also by processing that is actually performed in part or entirely an OS (operating system) and the like operating on the computer based on the instruction of the program code.

Moreover, it goes without saying that the previously mentioned functions of the embodiments are realized by processing that is actually performed in part or entirely by a CPU and the like provided in a function extension board or a function extension unit based on a instruction of a program code after the program code is read out from storage media and written in a memory provided in a function extension board inserted in a computer or a function extension unit connected to a computer.

In addition, the present invention may be applied to a system composed of a plurality of devices, or may be applied to an apparatus consisting of one device. Further, the present invention is naturally adaptable in a case in which the present invention is attained by supplying a program to the system or the apparatus. In this case, the system or the apparatus can enjoy effects of the present invention by reading out the storage media in which the program represented by software for attaining the present invention is stored to the system or the apparatus.

Moreover, by downloading a program represented by software for attaining the present invention from a database on a network by a communication program and reading it out, the system or the apparatus can enjoy effects of the present invention.

As described above, by registering in advance a discrimination name for each sheet discharge bin to the image recording apparatus 102 from a computer of an administrator or an operating unit of the image forming apparatus, and in a computer side for outputting a printing job, by requesting management information including the discrimination name of each sheet discharge port registered in the image recording apparatus 102, obtaining the management information, performing a display based on the obtained management information and selecting to designate each of a plurality of sheet discharge address from the displayed discrimination name by a predetermined unit of printing data and, at the same time, by designating each of the number of sheet discharge copies for each sheet discharge address designated by a predetermined unit of the printing data (for example, a unit of page, a unit of file, a unit of job, etc.), preparing printing job by including each designation of a plurality of sheet discharge address by a predetermined unit of printing data and each designation of the number of sheet discharge copies for each sheet discharge address designated by a predetermined unit of the printing data all in one printing job, transmitting the prepared printing job to the image recording apparatus 102, and controlling image recording apparatus 102 to execute operations based on the designated data included in the printing job, the name of a sheet discharge port can be registered in the image recording apparatus by a designation from the data processing apparatus, each user can perform a sheet discharge port designation by a common name registered in the image recording apparatus at the time of printing, setting for each data processing apparatus needs not to be performed by an instruction from the data processing apparatus, operation of a sorting sheet discharge of a printing job can be performed easily and, at the same time, a user can instruct the image recording apparatus to distribute the necessary number of copies of a necessary part of the printing data only to a sheet discharge bin of a user requiring a document by performing a printing instruction from the host computer only once and performing one job transmission to the image recording apparatus.

In addition, at the time of registering a bin name, since a printing requesting object computer instructs the image recording apparatus 102 to register a discrimination name for each sheet discharge bin and the number of members belonging the discrimination name respectively at a time, and obtains management information including information concerning a discrimination name registered in each sheet discharge bin and the number of members belonging to the discrimination name from the image recording apparatus 102 to perform a sheet discharge address designation, the number of copies for each sheet discharge port can be registered as management information in advance in the image recording apparatus and, at the time of printing, the number of distribution copies of a necessary part of printing data to a sheet discharge bin of a user requiring the printing data can be easily designated.

In addition, since character strings as discriminate names are employed, a desired character string is selected as a discrimination name of a sheet discharge port from candidates of a inputted character string and a plurality of character strings stored in a memory and registered in the image recording apparatus 102, for example, the name of a sheet discharge port can be easily registered in a remote image recording apparatus 102 from a host computer 101 for an administrator.

In addition, when a discrimination name registered in each sheet discharge port of the image recording apparatus is obtained from the image recording apparatus 102 side, since the discrimination name is displayed based on the information in the host computer 101 side, a plurality of sheet discharge addresses are selected from the displayed discrimination name and designated respectively by a predetermined unit of printing data and, at the same time, the number of sheet discharge copies for each sheet discharge address designated by a predetermined unit of the printing data are designated respectively and a printing job is prepared by including each designation of a plurality of sheet discharge address by a predetermined unit of printing data and each designation of the number of sheet discharge copies designated by a predetermined unit of the printing data all in one printing job, each user can perform a sheet discharge port designation by a common name registered in the image recording apparatus at the time of printing, setting for each data processing apparatus needs not to be performed by an instruction from the data processing apparatus, operation of a sorting sheet discharge of a printing job can be performed easily and, at the same time, a user can instruct the image recording apparatus to distribute the necessary number of copies of a necessary part of the printing data only to a sheet discharge bin of a user requiring the printing data by performing a printing instruction for the host computer only once and performing one job transmission to the image recording apparatus.

In addition, since a discrimination name registered in each sheet discharge port of the image recording apparatus is obtained and, at the same time, the number of members belonging to the discrimination name is obtained from the image recording apparatus, and based on these, the number of members belonging to the discrimination name of the sheet discharge port obtained by the obtaining means or an arbitrary number of copies is designated In the number of sheet discharge copies of each sheet discharge address selected and designated by a predetermined unit of the printing data, the number of distribution copies to a sheet discharge bin of a user requiring a necessary part of the printing data can be easily designated.

In addition, since a predetermined unit of the printing data includes a page unit of the printing data, the image recording apparatus can be instructed to distribute a necessary number of copies of a necessary page only of the printing data to a sheet discharge bin of a user requiring the printing data.

In addition, since the printing data includes a plurality of printing data prepared by identical or different applications, the image recording apparatus can be instructed to distribute only a necessary number of copies of a necessary page of the plurality of printing data prepared by the identical or different applications to a sheet discharge bin of a user requiring the printing data.

In addition, since information of a sheet discharge port having outputted a printing job to be notified from the image recording apparatus at the time of finishing the processing of the printing job is reported to a computer of a distributing user and a computer of an owner of a distribution address bin, each of user can easily recognize the sheet discharge port to which the printing job is discharged.

In addition, since the discrimination name is information for representing an owner using the sheet discharge port including a user name, a group name and a department name, each user can easily designate a sheet discharge port of the image recording apparatus by the name representing an owner in advance.

In addition, a necessary number of copies of only a necessary part of printing data can be distributed to a sheet discharge bin of a user requiring the printing data by one job transmission from the data processing apparatus, and a utilization form like a mail box for a user to forward printed documents to a plurality of users can be promptly implemented without increasing a load applied to a network as much as possible.

In addition, since a registered discrimination name for each of the sheet discharge ports and the number of members belonging to the discrimination name are notified to an external computer as a remote data processing apparatus depending on a request from the data processing apparatus, the number of copies for each sheet discharge port registered in the image recording apparatus can be notified to a user.

In addition, since a predetermined unit of the printing data includes a page unit of printing data, the image forming apparatus side can distribute a necessary number of copies of only a necessary page of the printing data to a sheet discharge bin of a user requiring the printing data by one job transmission from the data processing apparatus.

In addition, since the printing data includes a plurality of printing data prepared by identical or different applications, the image forming apparatus side can distribute a necessary number of copies of only a necessary part of printing data to a sheet discharge bin of a user requiring the printing data by one job transmission from the data processing apparatus.

In addition, if the state of each of the sheet discharge port is observed, the state of each of the sheet discharge port to be observed is stored, and an abnormality exists in the stored state of each sheet discharge port, by notifying the state of the sheet discharge port having an abnormality to the data processing apparatus and notifying information of the sheet discharge port having outputted the printing job to the data processing apparatus to a remote computer via a network at the time that the printing job is completed, the state of the sheet discharge port and the sheet discharge port to which the printing job is discharged can be easily notified to a user.

In addition, since a loading status, a discrimination name, a using status and the like of each sheet discharge port are stored and managed for each sheet discharge port, a loading status, a discrimination name, a using status and the like can be managed easily for each sheet discharge port.

As described above, in the present embodiment, the image recording apparatus 102 is controllably configured so that a plurality of documents consisting of a plurality of pages can be included in one printing job (a printing job for one communication) and, even if the plurality of documents are prepared by different sorts of application software respectively, the printing job is handled as one printing job and outputted to the image recording apparatus 102, and image forming processing and distribution processing of printed documents based on a instruction set in the host computer side are executed.

In addition, a method for designating a distribution of a printed document to each bin is configured so that a plurality of candidate distribution methods (distribution forms) that can be designated by a user, for example, to designate a distribution by one page unit such as to distribute a certain page of one document among a plurality of documents (here, one document corresponds to one file consisting of a plurality of pages) included in one printing job for a certain bin, to designate a distribution by one document unit such as to distribute all the pages included in one document among a plurality of documents included in one printing job for another bin, and to designate a distribution by one printing job unit such as to distribute all the documents among a plurality of documents included in one printing job, and so on, and a desired distribution method is selectable for each bin. In addition, when a distribution designation is performed in such a host computer, the host computer obtains, via a network, registration information concerning sheet discharge bins collectively managed with a memory in the image recording apparatus 102 (corresponding to an external storage apparatus when viewed from the host computer side) including information concerning the discrimination name of a bin and information concerning the number of group members belonging to the bin, and based on the acquired information, displays a screen for a user to perform a distribution address designation and have the user execute the distribution address designation, via the screen.

Therefore, in such a case in which a failure as in the past is prevented, and a user distributes his/her own printing data to a plurality of users, a system and an environment can be provided, in which the utilization form of the image recording apparatus is operationally managed, and desired distribution processing can be performed with high speed without increasing a load of a network by one job transmission under an environment in which the distribution of his/her own printing data to a plurality of users is possible without bothering the user and, at the same time, his/her own printing data can be distributed to a person requiring it by a necessary amount, and the image recording apparatus is shared by a plurality of users.

While the invention has been described with reference to the structures disclosed herein, it is not confined to the details set forth and this application is intended to cover such modifications or changes as may come within the purpose of the improvements or the scope of the following claims.

What is claimed is:

1. An image recording apparatus that can discharge a printing result of a printing job received from a data processing apparatus to a plurality of sheet discharge ports, said image recording apparatus comprising:

registering means for registering a discrimination name of each of the plurality of sheet discharge ports that is instructed to be registered by the data processing apparatus;

first notifying means for notifying the data processing apparatus of the discrimination name of each of the plurality of sheet discharge ports registered by said registering means in accordance with a request from the data processing apparatus;

preparing means for preparing page information for a plurality of discrimination names of a predetermined unit of printing data included in one printing job by the predetermined unit of printing data based on the notification of said first notifying means;

retrieving means for retrieving a sheet discharge port to which a discrimination name identical with a plurality of discrimination names of a predetermined unit of printing data included in the one printing job;

controlling means for instructing the discharge of the number of sheet discharge copies for each sheet discharge port retrieved by said retrieving means and each sheet discharge address designated by the predetermined unit of printing data with respect to each piece of page information prepared by said preparing means;

storing means for storing a state of each of the plurality of sheet discharge ports to be observed by observing the state of each of the plurality of sheet discharge ports;

second notifying means for notifying the data processing apparatus of a state of an abnormal sheet discharge port if an abnormality in the state of each sheet discharge port stored in said storing means exists; and third notifying means for notifying the data processing apparatus of information of the sheet discharge port to which the printing jot is outputted at the time of finishing processing of the printing job.

2. An image recording apparatus according to claim 1, wherein said registering means registers a discrimination name of each of the plurality of sheet discharge ports instructed to be registered by the data processing apparatus and a number of members belonging to the discrimination name, and said first notifying means notifies the data processing apparatus of the discrimination name for each of the sheet discharge ports registered by said registering means and the number of members belonging to the discrimination name in accordance with a request from the data processing apparatus.

3. An image recording apparatus according to claim 1, wherein the predetermined unit of printing data includes a page unit of printing data.

4. An image recording apparatus according to claim 1, wherein the printing data includes a plurality of printing data prepared by identical or different applications.

5. An image recording apparatus according to claim 1, wherein said storing means stores a loading status, a discrimination name, a using status and the like of each sheet discharge port for each of the plurality of sheet discharge ports.

6. An image recording apparatus according to claim 1, wherein the plurality of sheet discharge ports include a plurality of sheet discharge ports provided in an image recording apparatus main body and a plurality of sheet discharge port provided in an optional apparatus to be connected to the image recording apparatus main body.

7. An image recording apparatus according to claim 1, wherein the discrimination name is information for representing an owner using a sheet discharge port including a user name, a group name and a department name.

8. A controlling method of an image recording apparatus that can discharge a printing result of a printing job received from a data processing apparatus to a plurality of sheet discharge ports comprising the steps of:

registering a discrimination name of each of the sheet discharge ports that is instructed to be registered by the data processing apparatus;

notifying the data processing apparatus of the registered discrimination name of each of the plurality of sheet discharge ports in accordance with a request from the data processing apparatus;

preparing page information for a plurality of discrimination names of a predetermined unit of printing data included in one printing job by the predetermined unit of printing data based on the notification;

retrieving a sheet discharge port to which a discrimination name identical with a plurality of discrimination names of a predetermined unit of printing data included in the one printing job is registered;

instructing the discharge of a number of sheet discharge copies for each of the plurality of sheet discharge ports retrieved by said retrieving steps and each sheet discharge address designated by the predetermined unit of printing data with respect to each piece of the prepared page information;

storing a state of each of the sheet discharge ports to be observed by observing the state of each of the plurality of sheet discharge ports;

notifying the data processing apparatus of a state of an abnormal sheet discharge port if an abnormality in the state of each of the sheet discharge ports stored in the storing step exists; and notifying the data processing apparatus of information of a sheet discharge port to which the printing job is outputted at the time of finishing processing of the printing job.

9. A controlling method according to claim 8, wherein the registering means registers a discrimination name of each of the sheet discharge ports instructed to be registered by the data processing apparatus and the number of members belonging to the discrimination name, and the first notifying means step notifies the data processing apparatus of the discrimination name for each of the sheet discharge ports registered by the registering means and the number of members belonging to the discrimination name in accordance with a request from the data processing apparatus.

10. A controlling method according to claim 8, wherein the predetermined unit of printing data includes a page unit of printing data.

11. A controlling method according to claim 8, wherein the printing data includes a plurality of printing data prepared by identical or different applications.

12. A controlling method according to claim 8, wherein the storing means stores a loading status, a discrimination name, a using status and the like of each sheet discharge port for each sheet discharge port.

13. A controlling method according to claim 8, wherein the plurality of sheet discharge ports include a plurality of sheet discharge ports provided in an image recording apparatus main body and a plurality of sheet discharge port provided in an optional apparatus to be connected to an image recording apparatus main body.

14. A controlling method according to claim 8, wherein the discrimination name is information for representing an owner using the sheet discharge port including a user name, a group name and a department name.

15. A computer readable storage medium storing a program for causing an image recording apparatus that can discharge a printing result of a printing job received from a data processing apparatus to a plurality of sheet discharge ports to execute the steps of:

registering a discrimination name of each of the plurality of sheet discharge ports that is instructed to be registered by the data processing apparatus;

notifying said data processing apparatus of the registered discrimination name of each of the plurality of sheet discharge ports in accordance with a request from the data processing apparatus;

preparing page information for a plurality of discrimination names of a predetermined unit of printing data included in one printing job by the predetermined unit of printing data based on the notification;

retrieving a sheet discharge port to which a discrimination name identical with a plurality of discrimination names of a predetermined unit of printing data included in the one printing job is registered;

instructing the discharge of the number of sheet discharge copies for each of the plurality of sheet discharge ports retrieved by said retrieving step and each sheet discharge address designated by the predetermined unit of printing data with respect to each piece of the prepared page information;

storing a state of each of the plurality of sheet discharge ports to be observed by observing the state of each of the plurality of sheet discharge ports;

notifying the data processing apparatus of the state of an abnormal sheet discharge port if an abnormality in the state of each of the plurality of sheet discharge ports stored in the storing means step exists; and notifying the data processing apparatus of information of a sheet discharge port to which said printing job is outputted at the time of finishing processing of the printing job.

16. A data processing apparatus that can transmit a printing job to an image recording apparatus having a plurality of storing units or an image recording apparatus to which an optional apparatus having a plurality of storing units can be connected, said data apparatus comprising:

first transmitting means for transmitting first data for requesting management information including information indicating a discrimination name of each storing unit of said plurality of storing units managed by an external storage apparatus;

obtaining means for obtaining the management information from the external storage apparatus outputted in response to the transmission of the first data;

display controlling means for causing to display a screen that is prepared based on the management information obtained by the obtaining means for designating a distribution method of printing data to the plurality of storing units; and second transmitting means for transmitting second data including an instruction to cause the image recording apparatus to operate to distribute printing data to the plurality of storing units by a distribution method in accordance with an instruction from a user inputted via the screen.

17. A data processing apparatus according to claim 16, wherein the display controlling means causes to display a screen that can designate a desired distribution method out of a plurality of distribution method candidates, and said second transmitting means generates the second data including an instruction distinguishing the plurality of distribution methods from each other and transmits the data to the image recording apparatus.

18. A data processing apparatus according to claim 17, wherein the plurality of distribution methods include a first distribution method for distributing printing data by one page unit to respective distribution object storing units and a second distribution method for distributing printing data by one file unit to respective distribution object storing units, and said second transmitting means generates the second data including an instruction distinguishing the plurality of distribution method including the first distribution method and the second distribution method each other and transmits the data to the image recording apparatus.

19. A data processing apparatus according to claim 16, wherein said second transmitting means transmits printing data including a plurality of files as one printing job together with the second data collectively to the image recording apparatus.

20. A data processing apparatus according to claim 19, wherein the plurality of files are files respectively prepared by different sorts of application software.

21. A data processing apparatus according to claim 19, wherein the plurality of distribution methods include a first distribution method for distributing printing data by one page unit to respective distribution object storing units, a second distribution method for distributing printing data by one file unit to respective distribution object storing units, and a third distribution method for distributing printing data by one job unit consisting of printing data including a plurality of files to respective distribution object storing units, and said second transmitting means generates the second data including an instruction distinguishing the plurality of distribution methods including the first, second and third distribution methods each other and transmits the data to the image recording apparatus.

22. A data processing apparatus according to claim 16, wherein the second data includes data for specifying printing data to be distributed for each distribution object storing unit.

23. A data processing apparatus according to claim 22, wherein the image recording apparatus makes printing data to be distributed to each distribution object storing unit different based on the second data from said data processing apparatus.

24. A controlling method of a system having a data processing apparatus that can transmit printing job to an image recording apparatus including a plurality of storing units or an image recording apparatus to which an optional devices including a plurality of storing units can be connected comprising:

a first step for transmitting a first data for requesting management information including information indicating a discrimination name of each storing unit of the plurality of storing units managed by a remote external storage apparatus;

a second step of obtaining said management information from the external storage apparatus outputted in response to the transmission of the first data;

a third step of causing to display a screen to be generated based on the management information obtained by said second step for designating a distribution method of printing data to said plurality of storing units; and a fourth step of transmitting second data including an instruction to cause the image recording apparatus to distribute printing data to the plurality of storing units by a distribution method in accordance with an instruction from a user inputted via the screen to the image recording apparatus.

25. A controlling method according to claim 24, wherein said third step causes a display of screen that can designate a desired distribution method out of a plurality of distribution method candidates, and the fourth step generates the second data including an instruction distinguishing the plurality of distribution methods from each other and transmits the data to the image recording apparatus.

26. A controlling method according to claim 25, wherein the plurality of distribution methods include a first distribution method for distributing printing data by one page unit to respective distribution object storing units and a second distribution method for distributing printing data by one file unit to respective distribution object storing units, and the fourth step generates the second data including an instruction distinguishing the plurality of distribution method including the first distribution method and the second distribution method each other and transmits the data to the image recording apparatus.

27. A controlling method according to claim 24, wherein the fourth step transmits printing data including a plurality of files as one printing job together with the second data collectively to the image recording apparatus.

28. A controlling method according to claim 27, wherein the plurality of files are files respectively prepared by different sorts of application software.

29. A controlling method according to claim 27, wherein the plurality of distribution methods include a first distribution method for distributing printing data by one page unit to respective distribution object storing units, a second distribution method for distributing printing data by one file unit to respective distribution object storing units, and a third distribution method for distributing printing data by one job unit consisting of printing data including a plurality of files to respective distribution object storing units, and the second transmitting means generates the second data including an instruction distinguishing the plurality of distribution methods including the first, second and third distribution methods each other and transmits the data to the image recording apparatus.

30. A controlling method according to claim 24, wherein the second data includes data for specifying printing data to be distributed for each distribution object storing unit.

31. A controlling method according to claim 30, wherein the image recording apparatus makes printing data to be distributed to each distribution object storing unit different based on the second data from the data processing apparatus.

32. A computer readable storage medium storing a program for causing an data processing apparatus that can transmit a printing job to an image recording apparatus including a plurality of storing units or an image recording apparatus to which an optional apparatus including a plurality of storing units can be connected to execute the steps of:

a first step for transmitting a first data for requesting management information including information indicating a discrimination name of each storing unit of the plurality of storing units managed by a remote external storage apparatus;

a second step of obtaining said management information from the external storage apparatus outputted in response to the command data;

a third step of causing to display a screen to be generated based on the management information obtained by said second step for designating a distribution method of printing data to the plurality of storing units; and a fourth step of transmitting second data including an instruction to cause the image recording apparatus to distribute printing data to the plurality of storing units by a distribution method in accordance with an instruction from a user inputted via the screen to the image recording apparatus.

\* \* \* \* \*

UNITED STATES PATENT AND TRADEMARK OFFICE
CERTIFICATE OF CORRECTION

PATENT NO. : 6,914,687 B1
DATED : July 5, 2005
INVENTOR(S) : Yuichi Hosoda et al.

It is certified that error appears in the above-identified patent and that said Letters Patent is hereby corrected as shown below:

Title page,
Item [57], ABSTRACT,
Line 4, "requested" should read -- requesting --.

Column 2,
Line 53, "in-this" should read -- in this --.

Column 3,
Line 2, "occur" should read -- occurs --.

Column 4,
Line 35, "cross sectional" should read -- cross-sectional --.

Column 6,
Line 56, "an own" should read -- an --; and
Line 67, "port" should read -- port; --.

Column 7,
Line 46, "(now shown)" should read -- (not shown) --.

Column 9,
Lines 11 and 32, "(now shown)" should read -- (not shown) --.

Column 10,
Line 57, "use" should read -- user --.

Column 16,
Line 30, "described" should read -- be described --.

Column 17,
Line 36, "bun" should read -- bin --.

Column 18,
Line 60, "receives to analyze" should read -- receives and analyzes --.

Column 19,
Line 21, "a" (second occurrence) should read -- an --; and
Line 45, "Image" should read -- image --.

Column 21,
Line 30, "convert" should read -- converts --; and
Line 35, "a" should read -- an --.

UNITED STATES PATENT AND TRADEMARK OFFICE
CERTIFICATE OF CORRECTION

PATENT NO. : 6,914,687 B1
DATED : July 5, 2005
INVENTOR(S) : Yuichi Hosoda et al.

It is certified that error appears in the above-identified patent and that said Letters Patent is hereby corrected as shown below:

Column 23,
Line 57, "cross sectional" should read -- cross-sectional --.

Column 26,
Line 50, "performs" should read -- perform --.

Column 28,
Line 28, "is" should read -- are --; and
Line 63, "bid' should read -- bit --.

Column 29,
Line 30, "an" should read -- a --.

Column 31,
Line 28, "ROM 404," should read -- ROM 404. --.

Column 32,
Line 16, "operates" should read -- operate --; and
Line 32, "is" should be deleted.

Column 34,
Line 26, "the" (second occurrence) should read -- in --;
Line 54, "executes" should read -- execute --;
Line 56, "updates" should read -- update --; and
Line 58, "are" should read -- is --.

Column 35,
Line 3, "described" should read -- be described --; and
Lines 54, 57, 58 and 60, "job separate" should read -- separate job --.

Column 37,
Line 4, "an" should read -- a --.

Column 39,
Line 6, "so" should read -- to --.

Column 40,
Line 1, "designates" should read -- designate --; and
Line 65, "sate," should read -- state, --.

UNITED STATES PATENT AND TRADEMARK OFFICE
CERTIFICATE OF CORRECTION

PATENT NO. : 6,914,687 B1
DATED : July 5, 2005
INVENTOR(S) : Yuichi Hosoda et al.

It is certified that error appears in the above-identified patent and that said Letters Patent is hereby corrected as shown below:

Column 45,
Line 25, "a" (second occurrence) should read -- an --.

Column 49,
Line 44, "jot" should read -- job --.

Column 50,
Line 2, "include" should read -- includes --.

Column 51,
Line 2, "include" should read -- includes --; and
Line 4, "port" should read -- ports--.

Column 52,
Lines 16 and 35, "include" should read -- includes --;
Line 23, "method" should read -- methods --;
Lines 24 and 46, "each" should read -- from each --; and
Line 60, "an" (second occurrence) should be deleted.

Column 53,
Lines 22 and 40, "include" should read -- includes --;
Line 28, "method" should read -- methods --; and
Line 30, "each" should read -- from each --.

Column 54,
Line 8, "each" should read -- from each --.

Signed and Sealed this

Twenty-seventh Day of December, 2005

JON W. DUDAS
*Director of the United States Patent and Trademark Office*